US012791902B2

(12) United States Patent
Kodama et al.

(10) Patent No.: US 12,791,902 B2
(45) Date of Patent: Nov. 10, 2026

(54) METHOD FOR PRODUCING CHOLESTERIC LIQUID CRYSTAL LAYER, CHOLESTERIC LIQUID CRYSTAL LAYER, LIQUID CRYSTAL COMPOSITION, CURED PRODUCT, OPTICALLY ANISOTROPIC BODY, AND REFLECTIVE LAYER

(71) Applicant: FUJIFILM Corporation, Tokyo (JP)

(72) Inventors: Keisuke Kodama, Minamiashigara (JP); Shunya Katoh, Minamiashigara (JP); Mitsuyoshi Ichihashi, Minamiashigara (JP)

(73) Assignee: FUJIFILM Corporation, Tokyo (JP)

(*) Notice: Subject to any disclaimer, the term of this patent is extended or adjusted under 35 U.S.C. 154(b) by 753 days.

(21) Appl. No.: 18/151,988

(22) Filed: Jan. 9, 2023

(65) Prior Publication Data

US 2023/0161211 A1 May 25, 2023

Related U.S. Application Data

(63) Continuation of application No. 17/021,763, filed on Sep. 15, 2020, now Pat. No. 11,579,507, which is a (Continued)

(30) Foreign Application Priority Data

Mar. 23, 2018 (JP) ................................ 2018-057238

(51) Int. Cl.
*G02F 1/137* (2006.01)
*C09K 19/34* (2006.01)
(Continued)

(52) U.S. Cl.
CPC .......... *G02F 1/13718* (2013.01); *C09K 19/34* (2013.01); *C09K 19/3444* (2013.01); (Continued)

(58) Field of Classification Search
CPC ....................... G02F 2201/343; G02F 1/13718
See application file for complete search history.

(56) References Cited

U.S. PATENT DOCUMENTS

| | | | |
|---|---|---|---|
| 5,995,184 | A | 11/1999 | Chung et al. |
| 2003/0104144 | A1 | 6/2003 | Hammond-Smith et al. |

(Continued)

FOREIGN PATENT DOCUMENTS

| | | | |
|---|---|---|---|
| CN | 107111042 A | 8/2017 | |
| EP | 1 295 929 A2 | 3/2003 | |

(Continued)

OTHER PUBLICATIONS

English translation of WO2017030176. (Year: 2017).*

(Continued)

*Primary Examiner* — Mark F. Huff
*Assistant Examiner* — Anna Malloy
(74) *Attorney, Agent, or Firm* — Birch, Stewart, Kolasch & Birch, LLP

(57) ABSTRACT

A method for producing a cholesteric liquid crystal layer is a method that can produce a cholesteric liquid crystal layer whose reflection surface is not parallel to a substrate surface by a simple method. The method includes: a step 1 of forming a composition layer satisfying a condition 1, a condition 2, or a condition 3 on a substrate, using a liquid crystal composition including a liquid crystal compound; and a step 2 of subjecting the composition layer to a treatment for cholesterically aligning the liquid crystal compound in the composition layer to form a cholesteric liquid crystal layer.

5 Claims, 7 Drawing Sheets

Related U.S. Application Data continuation of application No. PCT/JP2019/011843, filed on Mar. 20, 2019.

(51) Int. Cl.
*C09K 19/52* (2006.01)
*G02F 1/1333* (2006.01)

(52) U.S. Cl.
CPC ........ *C09K 19/52* (2013.01); *G02F 1/133382* (2013.01); *C09K 2019/528* (2013.01); *G02F 2201/343* (2013.01)

(56) References Cited

U.S. PATENT DOCUMENTS

| | | | |
|---|---|---|---|
| 2005/0127326 A1 | 6/2005 | Ichihashi | |
| 2006/0222781 A1 | 10/2006 | Umeya et al. | |
| 2006/0257586 A1* | 11/2006 | Umeya | C09K 19/02 428/1.3 |
| 2007/0139589 A1 | 6/2007 | Roosendaal et al. | |
| 2012/0242918 A1* | 9/2012 | Valyukh | G02F 1/13718 349/33 |
| 2013/0093992 A1 | 4/2013 | Takahashi et al. | |
| 2017/0299785 A1 | 10/2017 | Saitoh et al. | |
| 2019/0033634 A1 | 1/2019 | Katoh et al. | |

FOREIGN PATENT DOCUMENTS

| | | | | |
|---|---|---|---|---|
| JP | 2000-105315 | A | 4/2000 | |
| JP | 2002-080851 | A | 3/2002 | |
| JP | 2002-328229 | A | 11/2002 | |
| JP | 2002-338575 | A | 11/2002 | |
| JP | 2003-82352 | A | 3/2003 | |
| JP | 2006-284862 | A | 10/2006 | |
| JP | 2006-317858 | A | 11/2006 | |
| JP | 2007-504484 | A | 3/2007 | |
| JP | 2007-206205 | A | 8/2007 | |
| JP | 2008-26730 | A | 2/2008 | |
| JP | 2008-250187 | A | 10/2008 | |
| JP | 2009-265130 | A | 11/2009 | |
| JP | 2009-300698 | A | 12/2009 | |
| JP | 2019-79064 | A | 5/2019 | |
| KR | 10-2017-0086648 | A | 7/2017 | |
| WO | WO 2005/019379 | A1 | 3/2005 | |
| WO | WO 2016/111341 | A1 | 7/2016 | |
| WO | WO-2017030176 | A1 * | 2/2017 | G02B 27/01 |
| WO | WO 2017/169696 | A1 | 10/2017 | |
| WO | WO 2018/003359 | A1 | 1/2018 | |

OTHER PUBLICATIONS

Chinese Notice of Divisional Application for corresponding Chinese Application No. 201980020992.5, dated May 7, 2022, with a partial English translation.

Chinese Office Action and Search Report for corresponding Chinese Application No. 201980020992.5, dated Oct. 27, 2021, with English translation.

Extended European Search Report for corresponding European Application No. 19771163.3, dated Apr. 30, 2021.

International Preliminary Report on Patentability and Written Opinion of the International Searching Authority (Forms PCT/IPEA/409, PCT/IPEA/416 and PCT/ISA/237) for corresponding International Application No. PCT/JP2019/011843, dated Jun. 11, 2020, with an English translation.

International Search Report (Form PCT/ISA/210) for corresponding International Application No. PCT/JP2019/011843, dated Jun. 18, 2019, with English translation.

Japanese Office Action for corresponding Japanese Application No. 2020-507891, dated Sep. 21, 2021, with an English translation.

Japanese Office Action for corresponding Japanese Application No. 2022-029634, dated Aug. 1, 2023, with English translation.

Japanese Office Action for corresponding Japanese Application No. 2022-029634, dated Apr. 4, 2023, with English translation.

* cited by examiner

METHOD FOR PRODUCING CHOLESTERIC LIQUID CRYSTAL LAYER, CHOLESTERIC LIQUID CRYSTAL LAYER, LIQUID CRYSTAL COMPOSITION, CURED PRODUCT, OPTICALLY ANISOTROPIC BODY, AND REFLECTIVE LAYER

CROSS-REFERENCE TO RELATED APPLICATIONS

This application is a Continuation of copending application Ser. No. 17/021,763, filed Sep. 15, 2020, which is a Continuation of PCT International Application No. PCT/JP2019/011843 filed on Mar. 20, 2019, which claims priority under 35 U.S.C. § 119(a) to Japanese Patent Application No. 2018-057238 filed on Mar. 23, 2018. Each of the above applications is hereby expressly incorporated by reference, in its entirety, into the present application.

BACKGROUND OF THE INVENTION

1. Field of the Invention

The present invention relates to a method for producing a cholesteric liquid crystal layer, a cholesteric liquid crystal layer, a liquid crystal composition, a cured product, an optically anisotropic body, and a reflective layer.

2. Description of the Related Art

A layer in which a cholesteric liquid crystalline phase is fixed is known as a layer having properties of selectively reflecting either dextrorotatory circularly polarized light or levorotatory circularly polarized light in a specific wavelength range. Therefore, such a layer in which the cholesteric liquid crystalline phase is fixed has been developed for various applications, and for example, it is used as a projected image display member (for example, a reflection element) such as a projection screen (JP2006-317656A).

JP2006-317656A discloses an "anisotropic optical element having anisotropic optical properties with respect to a normal direction of an element plane, comprising a molecularly aligned cholesteric liquid crystal layer consisting of polymerizable liquid crystals showing cholesteric regularity and formed to have a flat layer plane, characterized in that a helical axis main direction defined as an average of helical axis directions of liquid crystal domains in the cholesteric liquid crystal layer is tilted by a predetermined angle with respect to the normal direction of the layer plane".

JP2006-317656A discloses, as a method for producing the anisotropic optical element, a procedure in which the temperature of a coating film including a liquid crystal compound and heated to a temperature equal to or higher than a first phase transition temperature (that is, a temperature at which the liquid crystal compound exhibits an isotropic phase) is lowered to a temperature equal to or lower than the first phase transition temperature in a state where a gas is blown to the coating film from a predetermined direction. The above-mentioned procedure results in a transition of the liquid crystal compound in the coating film from an isotropic phase to a cholesteric liquid crystalline phase, and an alignment such that the helical axis main direction of the liquid crystal domain in the coating film is tilted by a predetermined angle with respect to the normal direction of the film plane.

SUMMARY OF THE INVENTION

The present inventors produced and studied an element having a substrate and a cholesteric liquid crystal layer (reflection film) arranged on the substrate with reference to the production method described in JP2006-317656A, and then found that it is extremely difficult to adjust an angle of a liquid crystal domain in a coating film with respect to a normal direction of a film plane in a helical axis main direction. In other words, the present inventors found that, in the cholesteric liquid crystal layer obtained by the production method of JP2006-317656A, it is difficult to adjust the angle of a reflection surface derived from the cholesteric liquid crystalline phase with respect to the substrate surface, and anisotropic reflection properties (reflection anisotropy) cannot be obtained.

Therefore, there has been a demand for a method capable of easily producing a cholesteric liquid crystal layer whose reflection surface is not parallel to the substrate surface (particularly, a cholesteric liquid crystal layer having excellent reflection anisotropy).

Therefore, an object of the present invention is to provide a method for producing a cholesteric liquid crystal layer, which can produce a cholesteric liquid crystal layer whose reflection surface is not parallel to the substrate surface by a simple method.

Another object of the present invention is to provide a cholesteric liquid crystal layer, and an optically anisotropic body and a reflective layer, each of which includes the cholesteric liquid crystal layer.

Another object of the present invention is to provide a liquid crystal composition that enables the formation of the cholesteric liquid crystal layer, as well as a cured product, an optically anisotropic body, and a reflective layer, each of which is formed using the liquid crystal composition.

As a result of intensive studies to achieve the foregoing objects, the present inventors have found that the foregoing objects can be achieved by carrying out a step of forming a composition layer satisfying a condition 1 which will be described later (a composition layer including a tilt-aligned liquid crystal compound), a composition layer satisfying a condition 2 which will be described later (a composition layer including a hybrid-aligned liquid crystal compound), or a composition layer satisfying a condition 3 which will be described later (a composition layer including a vertically aligned liquid crystal compound) using a liquid crystal composition having a predetermined composition and then subjecting the liquid crystal compound in the composition layer to cholesteric alignment. The present invention has been completed based on these findings.

That is, it has been found that the foregoing objects can be achieved by the following configuration.

[1] A method for producing a cholesteric liquid crystal layer, comprising:

a step 1 of forming a composition layer satisfying the following condition 1, the following condition 2, or the following condition 3 on a substrate, using a liquid crystal composition including a liquid crystal compound; and a step 2 of subjecting the composition layer to a treatment for cholesterically aligning the liquid crystal compound of the composition layer to form a cholesteric liquid crystal layer:

condition 1: at least a part of the liquid crystal compound in the composition layer is tilt-aligned with respect to a substrate surface;

condition 2: the liquid crystal compound is aligned such that a tilt angle of the liquid crystal compound in the composition layer continuously changes along a thickness direction;

condition 3: at least a part of the liquid crystal compound in the composition layer is vertically aligned with respect to the substrate surface.

[2] The method for producing a cholesteric liquid crystal layer according to [1], in which the step 1 is a step of forming a composition layer satisfying the condition 1 or the condition 2 on a substrate using a liquid crystal composition including a liquid crystal compound.

[3] The method for producing a cholesteric liquid crystal layer according to [1] or [2], in which a molecular axis of the liquid crystal compound is not parallel to the substrate surface on at least one of a substrate-side surface of the composition layer or a surface of the composition layer opposite to the substrate.

[4] The method for producing a cholesteric liquid crystal layer according to any one of [1] to [3], in which the liquid crystal composition includes two or more chiral agents, at least one of the chiral agents is any chiral agent selected from the group consisting of a chiral agent X having a helical twisting power changed depending on irradiation with light and a chiral agent Y having a helical twisting power changed depending on a change of temperature, in a case where the liquid crystal composition includes the chiral agent X, the treatment for cholesterically aligning the liquid crystal compound in the step 2 is a light irradiation treatment, and in a case where the liquid crystal composition includes the chiral agent Y, the treatment for cholesterically aligning the liquid crystal compound in the step 2 is a cooling treatment or a heating treatment.

[5] The method for producing a cholesteric liquid crystal layer according to any one of [1] to [3], in which the liquid crystal composition includes one chiral agent, the chiral agent is a chiral agent X having a helical twisting power changed depending on irradiation with light or a chiral agent Y having a helical twisting power changed depending on a change of temperature, in a case where the liquid crystal composition includes the chiral agent X, the treatment for cholesterically aligning the liquid crystal compound in the step 2 is a light irradiation treatment, and in a case where the liquid crystal composition includes the chiral agent Y, the treatment for cholesterically aligning the liquid crystal compound in the step 2 is a cooling treatment or a heating treatment.

[6] The method for producing a cholesteric liquid crystal layer according to [4], in which, in the composition layer of the step 1, an absolute value of a weighted average helical twisting power of the chiral agent is 0.0 to 1.5 $\mu m^{-1}$.

[7] The method for producing a cholesteric liquid crystal layer according to [6], in which the absolute value of the weighted average helical twisting power is 0.0 to 0.5 $\mu m^{-1}$.

[8] The method for producing a cholesteric liquid crystal layer according to any one of [1] to [7], in which the liquid crystal composition further includes a fluorine-based surfactant.

[9] The method for producing a cholesteric liquid crystal layer according to any one of [1] to [8], further comprising:

a step 3 of carrying out a curing treatment for fixing a cholesteric alignment state during the step 2 to form a cholesteric liquid crystal layer in which the cholesteric alignment state is fixed, or a curing treatment for fixing a cholesteric alignment state after the step 2 to form a cholesteric liquid crystal layer in which the cholesteric alignment state is fixed, in which the liquid crystal composition includes a polymerizable liquid crystal compound.

[10] The method for producing a cholesteric liquid crystal layer according to [9], in which the curing treatment is a light irradiation treatment.

[11] The method for producing a cholesteric liquid crystal layer according to any one of [2] to [10], in which the liquid crystal composition further includes an ionic surfactant, and a content of the ionic surfactant is 0.3 parts by mass or more with respect to 100 parts by mass of the liquid crystal compound.

[12] The method for producing a cholesteric liquid crystal layer according to [11], in which the ionic surfactant is a pyridinium compound represented by General Formula (1) which will be described later.

[13] A cholesteric liquid crystal layer having a pair of main planes, which is formed using a liquid crystal compound, in which an arrangement direction of bright portions and dark portions derived from a cholesteric liquid crystalline phase observed under a scanning electron microscope in a cross section perpendicular to the main plane is tilted with respect to the main plane, and an incident direction in which a phase difference is smallest in a case where light is incident on the main plane is not perpendicular to the main plane and is not parallel to the arrangement direction.

[14] The cholesteric liquid crystal layer according to [13], in which an angle formed by the incident direction that minimizes the phase difference and the arrangement direction is 3° or more.

[15] An optically anisotropic body comprising:

the cholesteric liquid crystal layer according to [13] or [14].

[16] A reflective layer comprising:

the cholesteric liquid crystal layer according to [13] or [14].

[17] A liquid crystal composition comprising:

a liquid crystal compound; and two or more chiral agents, in which at least one of the chiral agents is any chiral agent selected from the group consisting of a chiral agent having a helical twisting power changed depending on irradiation with light and a chiral agent having a helical twisting power changed depending on a change of temperature, an absolute value of a weighted average helical twisting power of the chiral agent is 0.0 to 1.5 $\mu m^{-1}$, and the absolute value of the weighted average helical twisting power is 10.0 $\mu m^{-1}$ or more in a case where a light irradiation treatment, a cooling treatment, or a heating treatment is carried out on the composition layer formed of the liquid crystal composition.

[18] The liquid crystal composition according to [17], further comprising:

an ionic surfactant, in which a content of the ionic surfactant is 0.3 parts by mass or more with respect to 100 parts by mass of the liquid crystal compound.

[19] The liquid crystal composition according to [18], in which the ionic surfactant is a pyridinium compound represented by General Formula (1) which will be described later.

[20] The liquid crystal composition according to any one of [17] to [19], further comprising:

a fluorine-based surfactant.

[21] The liquid crystal composition according to any one of [17] to [20], in which the liquid crystal compound is a polymerizable liquid crystal compound.

[22] A cured product obtained by curing the liquid crystal composition according to [21].

[23] An optically anisotropic body obtained by curing the liquid crystal composition according to [21].

[24] A reflective layer obtained by curing the liquid crystal composition according to [21].

According to the present invention, it is possible to provide a method for producing a cholesteric liquid crystal layer, which can produce a cholesteric liquid crystal layer whose reflection surface is not parallel to the substrate surface by a simple method.

Further, according to the present invention, it is possible to provide a cholesteric liquid crystal layer, and an optically anisotropic body and a reflective layer, each of which includes the cholesteric liquid crystal layer.

Further, according to the present invention, it is possible to provide a liquid crystal composition that enables the formation of the cholesteric liquid crystal layer, as well as a cured product, an optically anisotropic body, and a reflective layer, each of which is formed using the liquid crystal composition.

DESCRIPTION OF THE PREFERRED EMBODIMENTS

Figure 1:
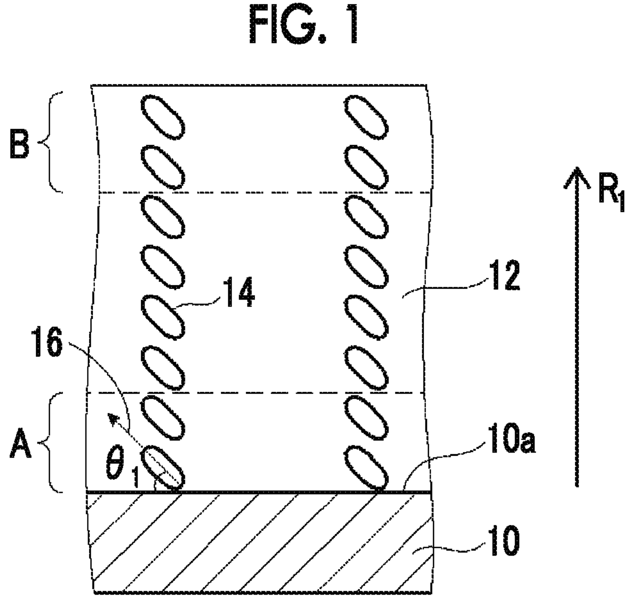
FIG. 1 is a schematic cross-sectional diagram for describing an example of an embodiment of a composition layer that satisfies a condition 1 in a step 1.

Hereinafter, the present invention will be described in detail. In the present specification, the numerical range expressed by using "to" means a range including numerical values described before and after "to" as a lower limit value and an upper limit value, respectively.

Further, in the present specification, the term "(meth) acrylate" is a notation expressing both acrylate and methacrylate, the term "(meth)acryloyl group" is a notation expressing both acryloyl group and methacryloyl group, and the term "(meth)acrylic" is a notation expressing both acrylic and methacrylic.

[Method for Producing Cholesteric Liquid Crystal Layer]

The method for producing a cholesteric liquid crystal layer according to the embodiment of the present invention includes a step 1 of forming a composition layer satisfying the following condition 1, the following condition 2, or the following condition 3 on a substrate, using a liquid crystal composition including a liquid crystal compound; and a step 2 of subjecting the composition layer to a treatment for cholesterically aligning the liquid crystal compound in the composition layer to form a cholesteric liquid crystal layer.

Condition 1: at least a part of the liquid crystal compound in the composition layer is tilt-aligned with respect to a substrate surface;

Condition 2: the liquid crystal compound is aligned such that a tilt angle of the liquid crystal compound in the composition layer continuously changes along a thickness direction;

Condition 3: at least a part of the liquid crystal compound in the composition layer is vertically aligned with respect to the substrate surface.

According to the method for producing a cholesteric liquid crystal layer according to the embodiment of the present invention, a cholesteric liquid crystal layer whose reflection surface is not parallel to the substrate surface can be easily obtained. In particular, in a case where the composition layer obtained in the step 1 is a composition layer satisfying the above condition 1 or the above condition 2, it is possible to form a cholesteric liquid crystal layer having excellent reflection anisotropy. The term "not parallel" as used herein is intended to mean that the angle formed by the reflection surface and the substrate surface is not 0°. The angle formed by the reflection surface and the substrate surface is preferably 1° or more, more preferably 3° or more, and still more preferably 5° or more. In addition, the upper limit of the angle formed by the reflection surface and the substrate surface is not particularly limited, but is, for example, 90° or less, preferably 80° or less, and more preferably 70° or less.

In addition, the present inventors have found, as one of the methods for achieving the method for producing a cholesteric liquid crystal layer, a method of using a liquid crystal composition including a chiral agent X having a helical twisting power changed depending on irradiation with light, or a chiral agent Y having a helical twisting power changed depending on a change of temperature, as shown in the section of Examples which will be described later.

Hereinafter, action mechanisms of the step 1 and the step 2 of the method for producing a cholesteric liquid crystal layer according to the embodiment of the present invention will be described with reference to specific examples. In the following description, the method for producing a cholesteric liquid crystal layer using a liquid crystal composition including at least a liquid crystal compound and a chiral agent X having a helical twisting power changed depending on irradiation with light, or a chiral agent Y having a helical twisting power changed depending on a change of temperature will be described as an example.

[Action Mechanism of Step 1]

First, FIG. 1 shows a schematic cross-sectional diagram of the composition layer obtained in the step 1. The composition layer shown in FIG. 1 is an example of an embodiment of the composition layer satisfying the above condition 1. It should be noted that, in the following, an aspect in which the liquid crystal compound is a rod-like liquid crystal compound will be described as an example. That is, a liquid crystal compound 14 in FIG. 1 is a rod-like liquid crystal compound.

As shown in FIG. 1, the liquid crystal compound 14 in a composition layer 12 arranged on a substrate 10 is tilt-aligned with respect to a substrate surface 10*a*. In other words, in the composition layer 12, the liquid crystal compound 14 is aligned in a fixed direction (uniaxial direction) such that a molecular axis 16 derived from the liquid crystal compound 14 forms a predetermined angle $\theta_1$ with respect to the substrate surface 10*a*.

In the present specification, in a case where the liquid crystal compound 14 is a rod-like liquid crystal compound, the molecular axis 16 of the liquid crystal compound 14 is intended to be a molecular long axis of the rod-like liquid crystal compound. On the other hand, in a case where the liquid crystal compound 14 is a disk-like liquid crystal compound, the molecular axis 16 of the liquid crystal compound 14 is intended to be an axis parallel to the normal direction of the disk-like liquid crystal compound to the disc plane.

FIG. 1 shows an embodiment in which the liquid crystal compound 14 is aligned over the entire area of the composition layer 12 in a thickness direction $R_1$ such that the molecular axis 16 derived from the liquid crystal compound 14 forms a predetermined angle $\theta_1$ with respect to the substrate surface 10*a*, but the composition layer satisfying the condition 1 obtained in the step 1 may be sufficient such that a part of the liquid crystal compound is tilt-aligned; and it is preferable that, in at least one of the substrate 10-*side* surface of the composition layer 12 (corresponding to region A in FIG. 1) or the surface of the composition layer 12 opposite to the substrate 10 (corresponding to region B in FIG. 1), the liquid crystal compound 14 is aligned such that the molecular axis 16 derived from the liquid crystal compound 14 forms a predetermined angle $\theta_1$ with respect to the substrate surface 10*a*, and it is more preferable that the liquid crystal compound 14 is tilt-aligned on the substrate 10-*side* surface of the composition layer 12 such that the molecular axis 16 derived from the liquid crystal compound 14 forms a predetermined angle $\theta_1$ with respect to the substrate surface 10*a*. In at least one of the region A or the region B, in a case where the liquid crystal compound 14 is aligned such that the molecular axis 16 derived from the liquid crystal compound 14 forms a predetermined angle $\theta_1$ with respect to the substrate surface 10*a*, and then in a case where the liquid crystal compound 14 is brought into a cholesteric liquid crystalline phase state in the subsequent step 2, the cholesteric alignment and the tilt of the molecular axis 16 of the liquid crystal compound 14 in the other region can be induced by an alignment regulating force based on the aligned liquid crystal compound 14 in the region A and/or the region B.

In addition, although not shown, the composition layer satisfying the above-mentioned condition 2 corresponds to the composition layer 12 shown in FIG. 1 in which the liquid crystal compound 14 is hybrid-aligned with respect to the substrate surface 10*a*. That is, the composition layer satisfying the above-mentioned condition 2 corresponds to an aspect in which, in the composition layer 12 shown in FIG. 1, an angle $\theta_2$ (tilt angle $\theta_2$) formed by the molecular axis of the liquid crystal compound 14 and the substrate surface 10*a* continuously changes in a thickness direction.

The angles $\theta_1$ and $\theta_2$ are not particularly limited unless they are 0° in the entire composition layer. In other words, it does not prevent that the angles $\theta_1$ and $\theta_2$ are 0° in a partial region of the composition layer. The angles $\theta_1$ and $\theta_2$ are, for example, 0 to 90°. Above all, the angles $\theta_1$ and $\theta_2$ are preferably 10 to 90° and more preferably 20 to 80° on the substrate-side surface of the composition layer. In addition, the angles $\theta_1$ and $\theta_2$ are preferably 0 to 50° and more preferably 0 to 30° on the surface of the composition layer opposite to the substrate.

In addition, although not shown, the composition layer satisfying the above-mentioned condition 3 corresponds to the composition layer 12 shown in FIG. 1 in which the molecular axis of the liquid crystal compound 14 is vertically aligned with respect to the substrate surface 10*a*. In other words, in a case where the liquid crystal compound 14 is a rod-like liquid crystal compound, the composition layer satisfying the above-mentioned condition 3 corresponds to an aspect in which the angle $\theta_1$ is 90° in the above description of FIG. 1. In addition, in a case where the liquid crystal compound 14 is a disk-like liquid crystal compound, the composition layer satisfying the above-mentioned condition 3 corresponds to one in which the disc plane of the liquid crystal compound 14 is aligned parallel to the substrate surface 10*a*.

The composition layer obtained by the step 1 is preferably a composition layer satisfying the condition 1 or the condition 2 and more preferably a composition layer satisfying the condition 2 in that the cholesteric liquid crystal layer is more excellent in reflection anisotropy.

[Action Mechanism of Step 2]

Figure 2:
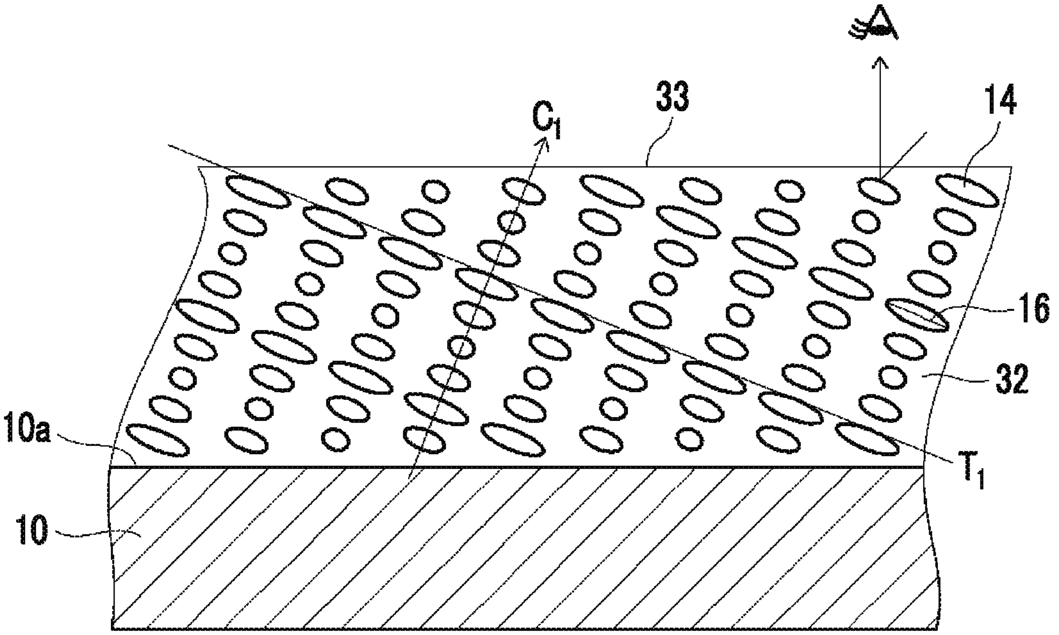
FIG. 2 is a schematic cross-sectional diagram of a cholesteric liquid crystalline phase formed in a step 2.

After obtaining the composition layer satisfying the condition 1, the condition 2, or the condition 3 by the step 1, the liquid crystal compound in the composition layer is cholesterically aligned in the step 2 (in other words, the liquid crystal compound is brought into a cholesteric liquid crystalline phase) to form a cholesteric liquid crystal layer. FIG. 2 shows a schematic cross-sectional diagram of the cholesteric liquid crystal layer obtained through the step 1 and the step 2. In FIG. 2, the cholesteric liquid crystal layer obtained under the condition 1 and the condition 2 in the step 1 is taken as an example.

As shown in FIG. 2, in a cholesteric liquid crystal layer 32, the liquid crystal compound 14 is aligned with its molecular axis 16 tilted with respect to the substrate surface 10*a*. As shown in FIG. 2, in the cholesteric liquid crystal layer 32, a helical axis $C_1$ derived from the cholesteric liquid crystalline phase is tilted at a predetermined angle with respect to the substrate surface 10*a*, since the molecular axis 16 has the above-mentioned alignment. In addition, a reflection surface $T_1$ of the cholesteric liquid crystal layer 32 (a plane where a liquid crystal compound having the same azimuthal angle is present) is tilted in a substantially constant direction with respect to the substrate surface 10*a*. The "liquid crystal compound having the same azimuthal angle" refers to a liquid crystal compound in which the alignment directions of the molecular axes are substantially the same in a case of being projected on the substrate surface 10*a*. The definition of the molecular axis is as described above.

Figure 5:
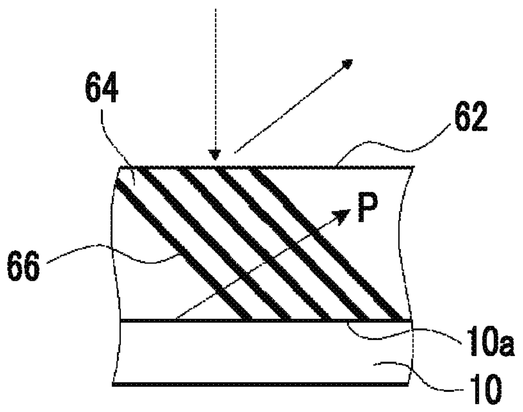
FIG. 5 is a schematic diagram in a case where a cross section of a cholesteric liquid crystal layer produced by a production method of the present invention is observed by SEM.

In a case where the cross section of the cholesteric liquid crystal layer 32 is observed under a scanning electron microscope (SEM), a striped pattern is observed in which an arrangement direction P in which bright portions 64 and dark portions 66 are alternately arranged as shown in FIG. 5 is tilted at a predetermined angle with respect to the substrate surface 10*a*. The reflection surface $T_1$ is substantially orthogonal to the arrangement direction P. Two repetitions of the bright portions 64 and the dark portions 66 (two bright portions and three dark portions) in FIG. 5 correspond to one helical pitch (one helical winding).

Figure 3:
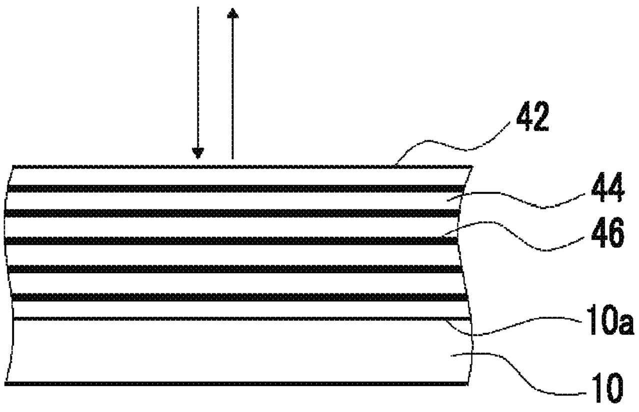
FIG. 3 is a schematic diagram in a case where a cross section of a cholesteric liquid crystal layer produced without going through the step 1 is observed under a scanning electron microscope (SEM).

Here, FIG. 3 shows a schematic cross-sectional diagram in a case where a cholesteric liquid crystal layer obtained by subjecting a liquid crystal compound having a planar alignment (the angle $\theta_1$ in FIG. 1 corresponds to an alignment state of 0° in the entire composition layer) to a cholesteric alignment treatment is arranged on a substrate. As shown in FIG. 3, a striped pattern of bright portions 44 and dark portions 46 is usually observed in a case where a cross section of the cholesteric liquid crystal layer 42 arranged on the substrate 10 is observed by SEM. That is, a layered structure in which the bright portions 44 and the dark portions 46 are alternately laminated in parallel to the substrate surface 10*a* is observed in the cross section of the cholesteric liquid crystal layer 42.

Figure 4:
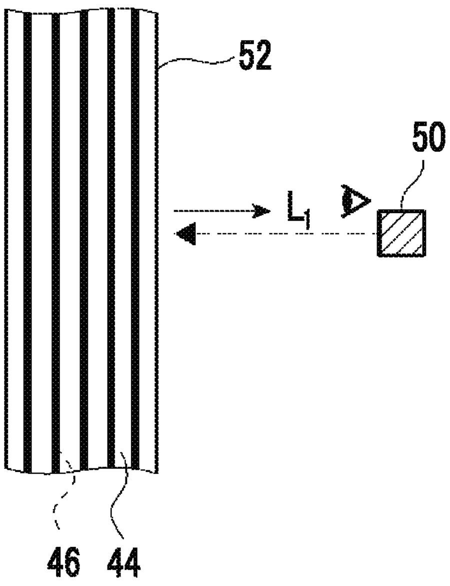
FIG. 4 is a schematic diagram describing an operation in a case where the cholesteric liquid crystal layer shown in FIG. 3 is applied to a projection screen.

Generally, as shown in FIG. 3, in the cholesteric liquid crystal layer 42 formed without going through the step 1, the striped pattern (layered structure) of the bright portions 44 and the dark portions 46 is formed so as to be parallel to the substrate surface 10*a*. Since the cholesteric liquid crystalline phase is specularly reflective, for example, in a case where light is incident on the cholesteric liquid crystal layer 42 in a normal direction, the light is reflected in the normal direction (see the arrow in FIG. 3). For this reason, as shown in FIG. 4, in a case where the cholesteric liquid crystal layer 42 is applied to a projection screen or the like, in order for an observer in front of a projection screen 52 to observe cholesteric reflected light $L_1$ of the image light projected from a light source (projector) 50 onto the projection screen 52 with good visibility, it is necessary to install the light source 50 in the vicinity of the observer.

On the other hand, in the cholesteric liquid crystal layer obtained through the step 1 and the step 2, the reflection surface of the cholesteric liquid crystalline phase is not parallel to the substrate surface.

In particular, in a case where the composition layer obtained in the step 1 is a composition layer satisfying the condition 1 or the condition 2 and is a cholesteric liquid crystal layer obtained through the subsequent step 2, the reflection surface of the cholesteric liquid crystalline phase is tilted with respect to the substrate surface (see FIG. 5. Although not shown, in a case where the composition layer obtained in the step 1 is a composition layer satisfying the condition 3, the reflection surface is parallel to the normal direction of the substrate surface). As shown in FIG. 5, in a case where a cross section of the cholesteric liquid crystal layer 62 arranged on the substrate 10 is observed by SEM, a striped pattern is observed in which an arrangement direction P in which bright portions 64 and dark portions 66 are alternately arranged is tilted at a predetermined angle with respect to the substrate surface 10*a*. That is, since the cholesteric liquid crystal layer 62 has reflected light anisotropy, for example, in a case where light is incident on the cholesteric liquid crystal layer 62 in a normal direction, the light is reflected in a direction different from the normal direction (see the arrow in FIG. 5).

Figure 6:
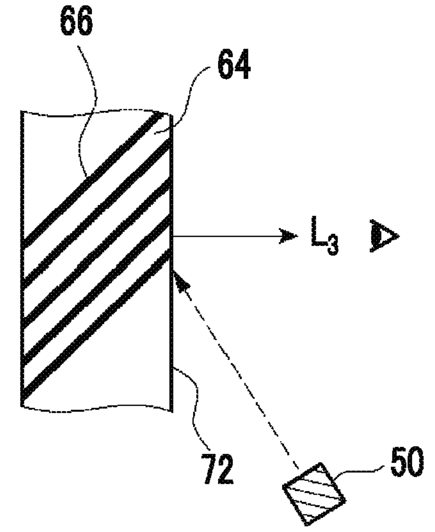
FIG. 6 is a schematic diagram describing an operation in a case where the cholesteric liquid crystal layer shown in FIG. 5 is applied to a projection screen.

As a result, in a case where the cholesteric liquid crystal layer 62 is applied to a projection screen, an installation position of the light source 50 is not limited to a specific position. For example, as shown in FIG. 6, even in a case where the light source 50 is installed below a projection screen 72, an observer in front of the projection screen 72 can observe the cholesteric reflected light $L_3$ in a case where the projection screen 72 is arranged such that the arrangement direction P of the bright portions 64 and the dark portions 66 in the cholesteric liquid crystal layer 62 is downward.

[Action Mechanism of Liquid Crystal Composition]

As described above, the present inventors have found, as one of the methods for achieving the method for producing a cholesteric liquid crystal layer, a method of using a liquid crystal composition including a chiral agent X having a helical twisting power (HTP) changed depending on irradiation with light, or a chiral agent Y having a helical twisting power changed depending on a change of temperature.

The helical twisting power (HTP) of the chiral agent is a factor indicating the helical alignment ability expressed by Expression (1A).

HTP=1/(length of helical pitch (unit: μm)×concentration of chiral agent in liquid crystal composition (% by mass))[$\mu m^{-1}$] Expression (1A)

The length of the helical pitch refers to a length of pitch P (=helical period) of the helical structure of the cholesteric liquid crystalline phase and can be measured by the method described on page 196 of the Liquid Crystal Handbook (published by Maruzen Co., Ltd.).

In addition, the value of HTP is influenced not only by the type of chiral agent but also by the type of liquid crystal compound contained in the composition. Therefore, for example, in a case where a composition including a predetermined chiral agent X and a liquid crystal compound A and a composition including a predetermined chiral agent X and a liquid crystal compound B different from the liquid crystal compound A are prepared, and HTPs of both compositions are measured at the same temperature, the values of HTPs thus measured may be different therebetween.

In addition, the helical twisting power (HTP) of the chiral agent is also expressed as Expression (1B).

HTP=(average refractive index of liquid crystal compound)/{(concentration of chiral agent in liquid crystal composition (% by mass))×(central reflection wavelength (nm))}[$\mu m^{-1}$] Expression (1B):

In a case where the liquid phase composition includes two or more types of chiral agents, the "concentration of chiral agent in liquid crystal composition" in Expressions (1A) and (1B) corresponds to the sum of the concentrations of all the chiral agents.

<Action Mechanism of Liquid Crystal Composition Including Chiral Agent X>

Hereinafter, first, a method for forming a cholesteric liquid crystal layer using a liquid crystal composition including a chiral agent X will be described.

In a case where a cholesteric liquid crystal layer is formed using a liquid crystal composition including a chiral agent X, a composition layer satisfying the condition 1, the condition 2, or the condition 3 is formed in the step 1, and then the composition layer is subjected to a light irradiation treatment in the step 2, whereby the liquid crystal compound in the composition layer is cholesterically aligned. That is, in the above step 2, the liquid crystal compound in the composition layer is cholesterically aligned by changing the helical twisting power of the chiral agent X in the composition layer by the light irradiation treatment.

Here, in a case where the liquid crystal compound in the composition layer is aligned into a cholesteric liquid crystalline phase state, the helical twisting power that induces the helix of the liquid crystal compound is considered to roughly correspond to the weighted average helical twisting power of the chiral agents included in the composition layer. The weighted average helical twisting power here is represented by Expression (1C), for example, in a case where two types of chiral agents (chiral agent A and chiral agent B) are used in combination.

Weighted average helical twisting power ($\mu m^{-1}$)=(helical twisting power of chiral agent A ($\mu m^{-1}$)×concentration of chiral agent A in liquid crystal composition (% by mass)+helical twisting power of chiral agent B) ($\mu m^{-1}$)×concentration of chiral agent B in liquid crystal composition (% by mass))/(concentration of chiral agent A in liquid crystal composition (% by mass)+concentration of chiral agent B in liquid crystal composition (% by mass)) Expression (1C)

However, in Expression (1C), in a case where the helical direction of the chiral agent is right-handed, the helical twisting power has a positive value. In addition, in a case where the helical direction of the chiral agent is left-handed, the helical twisting power has a negative value. That is, for example, in a case of a chiral agent having a helical twisting power of 10 $\mu m^{-1}$, the helical twisting power is expressed as 10 $\mu m^{-1}$ in a case where the helical direction of the helix induced by the chiral agent is right-handed. On the other hand, in a case where the helical direction of the helix induced by the chiral agent is left-handed, the helical twisting power is expressed as −10 $\mu m^{-1}$.

The weighted average helical twisting power ($\mu m^{-1}$) obtained by Expression (1C) can also be calculated from Expression (1A) and Expression (1B).

Hereinafter, for example, the weighted average helical twisting power in a case where the composition layer includes the chiral agent A and the chiral agent B having the following characteristics will be described.

Figure 7:
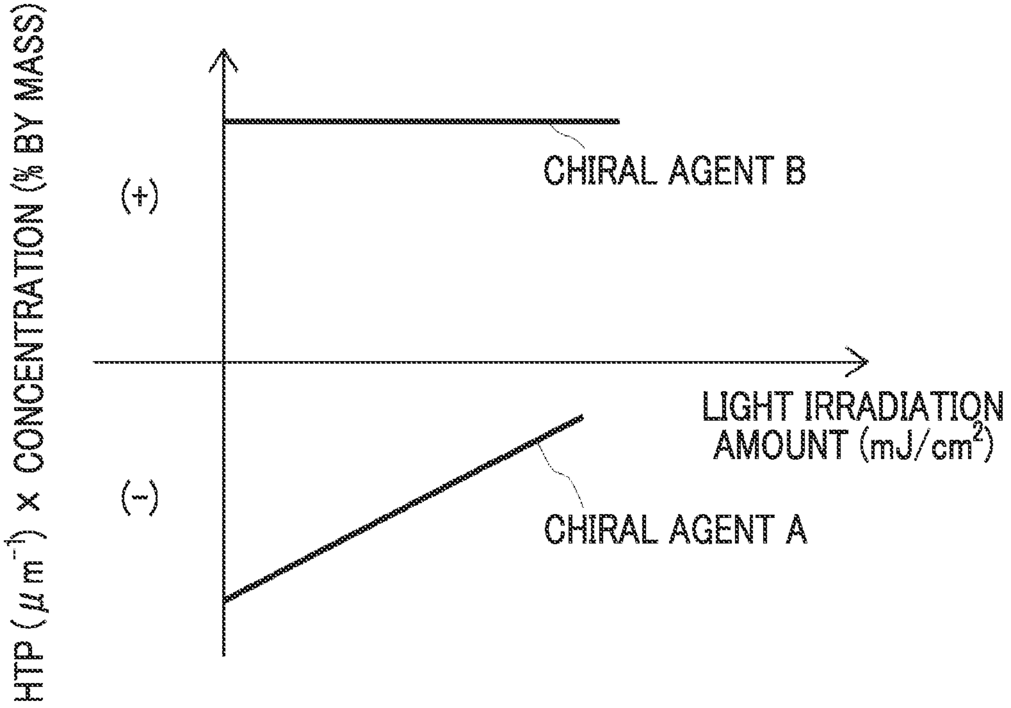
FIG. 7 is a schematic diagram of a graph plotting a relationship between a helical twisting power (HTP) ($\mu m^{-1}$)×a concentration (% by mass) and a light irradiation amount ($mJ/cm^2$) for each of chiral agent A and chiral agent B.

As shown in FIG. 7, the chiral agent A is a chiral agent that corresponds to the chiral agent X, has a left-handed (−) helical twisting power, and reduces the helical twisting power depending on irradiation with light.

In addition, as shown in FIG. 7, the chiral agent B is a chiral agent which has a right-handed (+) helical twisting power opposite to that of the chiral agent A, and has a helical twisting power that is not changed depending on irradiation with light. Here, "helical twisting power of chiral agent A ($\mu m^{-1}$)×concentration of chiral agent A (% by mass)" and "helical twisting power of chiral agent B ($\mu m^{-1}$)×concentration of chiral agent B (% by mass)" at the time of no light irradiation treatment are equal. In addition, in FIG. 7, with regard to the "helical twisting power of chiral agent ($\mu m^{-1}$)×concentration (% by mass) of chiral agent" on the vertical axis, the more the value thereof deviates from zero, the larger the helical twisting power becomes.

In a case where the composition layer includes the chiral agent A and the chiral agent B, the helical twisting power that induces the helix of the liquid crystal compound matches the weighted average helical twisting power of the chiral agent A and the chiral agent B. As a result, in a system in which the chiral agent A and the chiral agent B are used in combination, as shown in FIG. 8, it is considered that a larger light irradiation amount leads to an increase in helical twisting power that induces the helix of the liquid crystal compound in the direction (+) of the helix induced by the chiral agent B (which corresponds to chiral agent Y).

Figure 8:
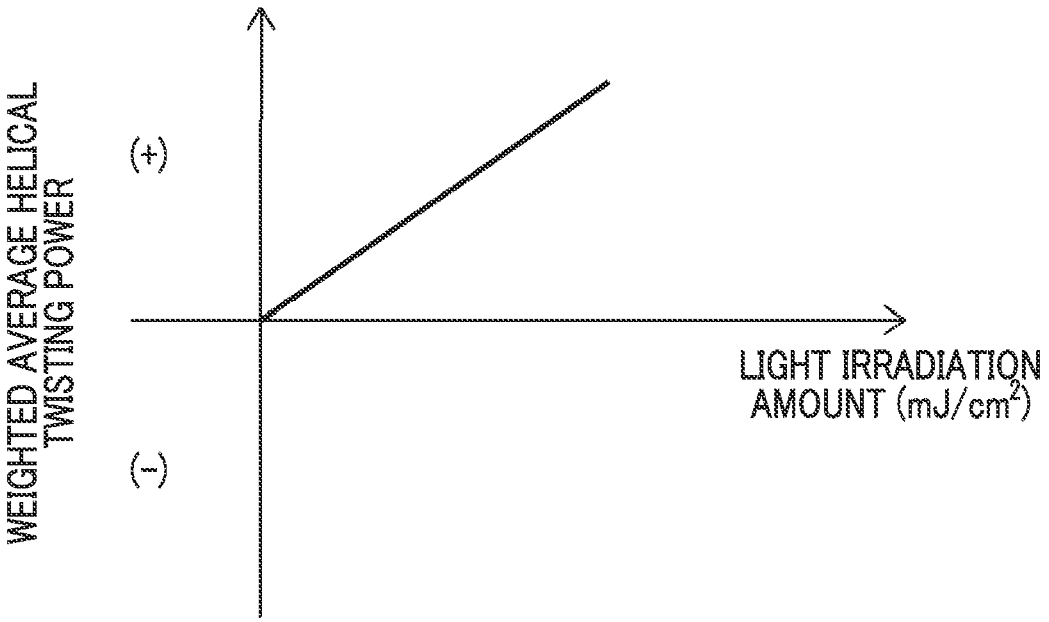
FIG. 8 is a schematic diagram of a graph plotting the relationship between a weighted average helical twisting power ($\mu m^{-1}$) and a light irradiation amount ($mJ/cm^2$) in a system in which chiral agent A and chiral agent B are used in combination.

In the method for producing a cholesteric liquid crystal layer of the present embodiment, the absolute value of the weighted average helical twisting power of the chiral agent in the composition layer formed in the step 1 is not particularly limited, but from the viewpoint of easy formation of the composition layer, it is, for example, preferably 0.0 to 1.9 $\mu m^{-1}$, more preferably 0.0 to 1.5 $\mu m^{-1}$, still more preferably 0.0 to 1.0 $\mu m^{-1}$, particularly preferably 0.0 to 0.5 $\mu m^{-1}$, and most preferably zero (see FIG. 8). On the other hand, in the light irradiation treatment of the step 2, the absolute value of the weighted average helical twisting power of the chiral agent in the composition layer is not particularly limited as long as the liquid crystal compound can be cholesterically aligned, but it is preferably 10.0 $\mu m^{-1}$ or more, more preferably 10.0 to 200.0 $\mu m^{-1}$, and still more preferably 20.0 to 200.0 $\mu m^{-1}$.

That is, in the step 1, the helical twisting power of the chiral agent X in the composition layer is offset to almost zero, and therefore the liquid crystal compound in the composition layer can be aligned into tilt alignment (see FIG. 1), hybrid alignment, or vertical alignment. Next, the light irradiation treatment in the step 2 is used as a trigger to change the helical twisting power of the chiral agent X such that the weighted average helical twisting power of the chiral agent in the composition layer is increased either in the right-handed direction (+) or in the left-handed direction (−), whereby a cholesteric liquid crystal layer in which the reflection surface of the cholesteric liquid crystalline phase is not parallel to the substrate surface can be obtained. In particular, in a case where the composition layer obtained by the step 1 is a composition layer satisfying the condition 1 or the condition 2, a cholesteric liquid crystal layer in which the reflection surface of the cholesteric liquid crystalline phase is tilted with respect to the substrate surface is obtained as shown in FIG. 5.

<Action Mechanism of Liquid Crystal Composition Including Chiral Agent Y>

Next, a method for forming a cholesteric liquid crystal layer using a liquid crystal composition including a chiral agent Y will be described.

In a case where a cholesteric liquid crystal layer is formed using a liquid crystal composition including a chiral agent Y, a composition layer satisfying the condition 1, the condition 2, or the condition 3 is formed in the step 1, and then the composition layer is subjected to a cooling treatment or a heating treatment in the step 2, whereby the liquid crystal compound in the composition layer is cholesterically aligned. That is, in the above step 2, the liquid crystal compound in the composition layer is cholesterically aligned by changing the helical twisting power of the chiral agent Y in the composition layer by the cooling treatment or the heating treatment.

As described above, in a case where the liquid crystal compound in the composition layer is aligned into a cholesteric liquid crystalline phase state, the helical twisting power that induces the helix of the liquid crystal compound is considered to roughly correspond to the weighted average helical twisting power of the chiral agents included in the composition layer. The weighted average helical twisting power here is as described above.

Hereinafter, the action mechanism of the chiral agent Y will be described by taking an embodiment in which the liquid crystal compound in the composition layer is cholesterically aligned by carrying out the cooling treatment in the step 2 as an example.

First, in the following, for example, the weighted average helical twisting power in a case where the composition layer includes the chiral agent A and the chiral agent B having the following characteristics will be described.

Figure 9:
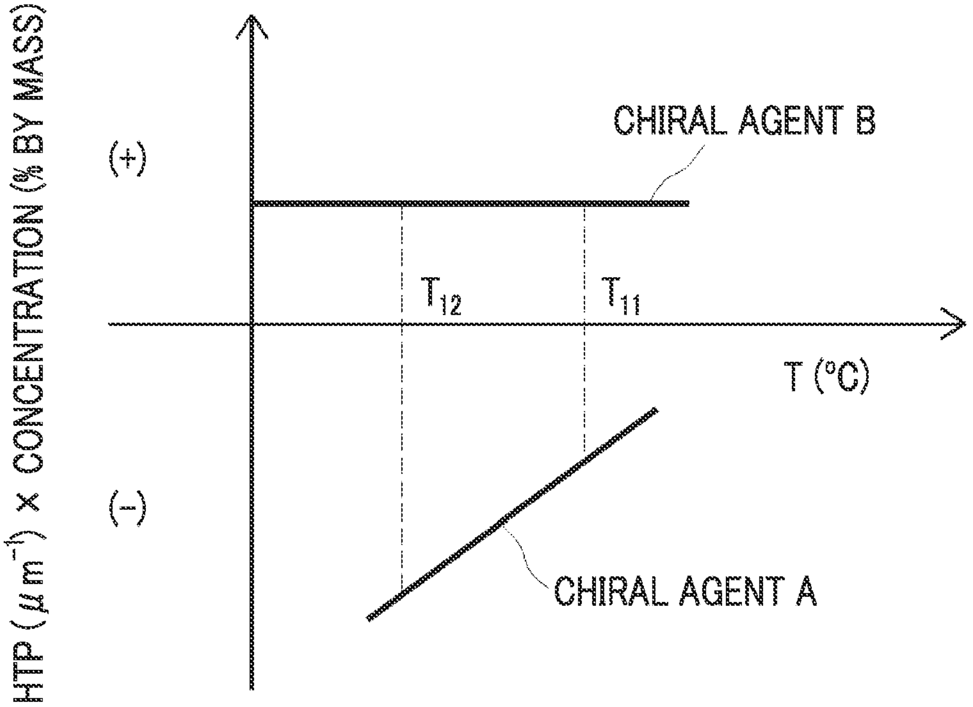
FIG. 9 is a schematic diagram of a graph plotting a relationship between a HTP ($\mu m^{-1}$)×a concentration (% by mass) and a temperature (°C) for each of chiral agent A and chiral agent B.

As shown in FIG. 9, the chiral agent A corresponds to the chiral agent Y and is a chiral agent which has a left-handed (−) helical twisting power at a temperature $T_{11}$ at which an alignment treatment of the liquid crystal compound for forming the composition layer satisfying the condition 1, the condition 2, or the condition 3 is carried out in the step 1 and at a temperature $T_{12}$ at which the cooling treatment is carried out in the step 2 and whose left-handed (−) helical twisting power is increased as the temperature becomes lower. In addition, as shown in FIG. 9, the chiral agent B is a chiral agent which has a right-handed (+) helical twisting power opposite to that of the chiral agent A, and has a helical twisting power that is not changed depending on a change of temperature. Here, "helical twisting power of chiral agent A ($\mu m^{-1}$)×concentration of chiral agent A (% by mass)" and "helical twisting power of chiral agent B ($\mu m^{-1}$)×concentration of chiral agent B (% by mass)" at the temperature $T_{11}$ are equal.

In a case where the composition layer includes the chiral agent A and the chiral agent B, the helical twisting power that induces the helix of the liquid crystal compound matches the weighted average helical twisting power of the chiral agent A and the chiral agent B. As a result, in a system in which the chiral agent A and the chiral agent B are used in combination, as shown in FIG. 10, it is considered that a lower temperature region leads to an increase in helical twisting power that induces the helix of the liquid crystal compound in the direction (−) of the helix induced by the chiral agent A (which corresponds to chiral agent Y).

In the method for producing a cholesteric liquid crystal layer of the present embodiment, the absolute value of the weighted average helical twisting power of the chiral agent in the composition layer is not particularly limited, but in a case of forming a composition layer satisfying the condition 1, the condition 2, or the condition 3 of the step 1 (that is, in a case of the present embodiment, at the temperature $T_{11}$ at which an alignment treatment of a liquid crystal compound for forming a composition layer satisfying the condition 1, the condition 2, or the condition 3 is carried out), it is, for example, preferably 0.0 to 1.9 $\mu m^{-1}$, more preferably 0.0 to 1.5 $\mu m^{-1}$, still more preferably 0.0 to 1.0 $\mu m^{-1}$, particularly preferably 0.0 to 0.5 $\mu m^{-1}$, and most preferably zero, from the viewpoint of easy formation of the composition layer.

Figure 10:
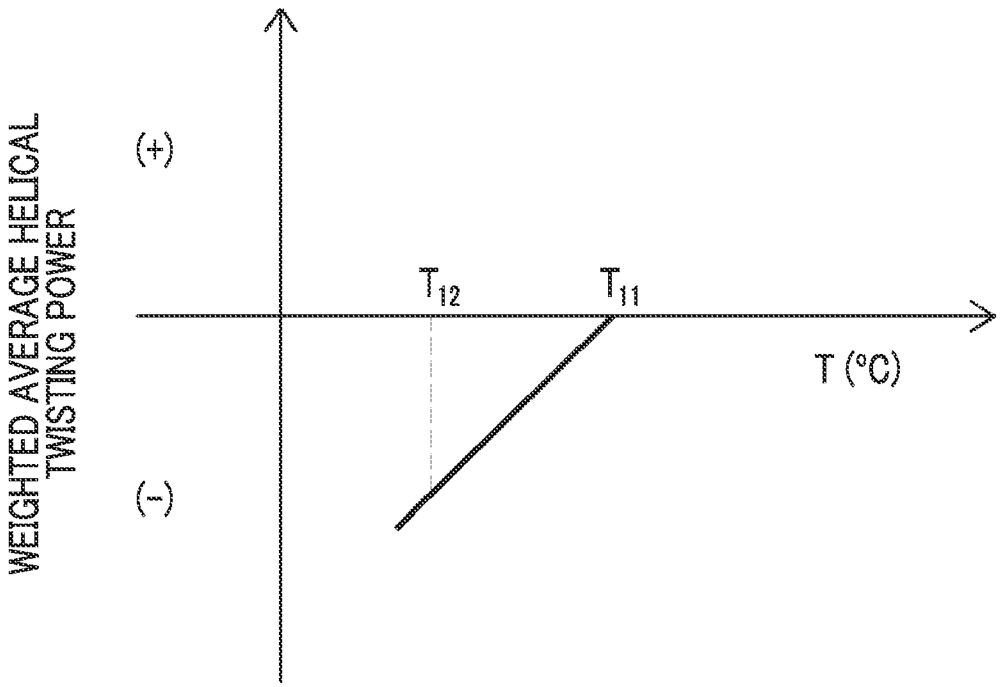
FIG. 10 is a schematic diagram of a graph plotting the relationship between a weighted average helical twisting power ($\mu m^{-1}$) and a temperature (°C) in a system in which chiral agent A and chiral agent B are used in combination.

On the other hand, at the temperature $T_{12}$ at which the cooling treatment in the step 2 is carried out, the absolute value of the weighted average helical twisting power of the chiral agent in the composition layer is not particularly limited as long as the liquid crystal compound can be cholesterically aligned, but it is preferably 10.0 $\mu m^{-1}$ or more, more preferably 10.0 to 200.0 $\mu m^{-1}$, and still more preferably 20.0 to 200.0 $\mu m^{-1}$ (see FIG. 10).

That is, at the temperature $T_{11}$, the helical twisting power of the chiral agent Y is offset to almost zero, and therefore the liquid crystal compound can be brought into tilt alignment (see FIG. 1), hybrid alignment, or vertical alignment. Next, the cooling treatment or the heating treatment (temperature change to temperature $T_{12}$) in the step 2 is used as a trigger to increase the helical twisting power of the chiral agent Y such that the weighted average helical twisting power of the chiral agent in the composition layer is increased either in the right-handed direction (+) or in the left-handed direction (−), whereby a cholesteric liquid crystal layer in which the reflection surface of the cholesteric liquid crystalline phase is not parallel to the substrate surface can be obtained. In particular, in a case where the composition layer obtained by the step 1 is a composition layer satisfying the condition 1 or the condition 2, a cholesteric liquid crystal layer in which the reflection surface of the cholesteric liquid crystalline phase is tilted with respect to the substrate surface is obtained as shown in FIG. 5.

Figure 11:
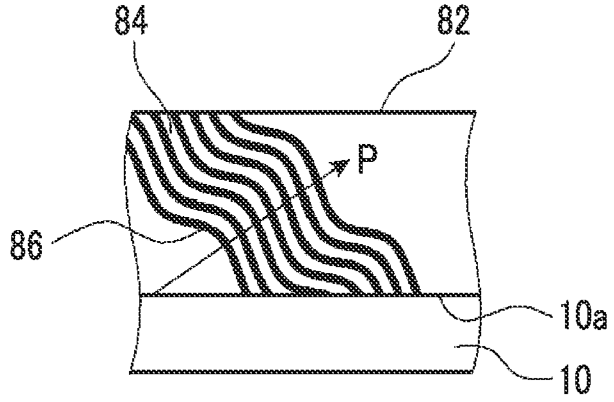
FIG. 11 is a schematic diagram in a case where a cross section of a cholesteric liquid crystal layer produced by the production method of the present invention is observed by SEM.

As shown in FIG. 11, the cholesteric liquid crystal layer formed by the method for producing a cholesteric liquid crystal layer according to the embodiment of the present invention using the liquid crystal composition including the chiral agent X or the liquid crystal composition including the chiral agent Y may have a configuration in which the arrangement direction P of the bright portions 84 and the dark portions 86 is not parallel to the substrate surface 10*a*, and the bright portions 84 and the dark portions 86 have a wave-like structure (undulation structure). That is, since the bright portions 84 and the dark portions 86 have a wave-like structure, the normal line of the reflection surface is slightly tilted. In a case where light is incident on a cholesteric liquid crystal layer 82 having such a wave-like structure (concavo-convex structure), a part of the incidence ray is reflected in an oblique direction and therefore excellent diffuse reflectivity (particularly wide-angle reflectivity) is also achieved.

Hereinafter, each step of the method for producing a cholesteric liquid crystal layer according to the embodiment of the present invention will be described in detail. In the following, a method for producing a cholesteric liquid crystal layer using a liquid crystal composition including a chiral agent X and a method for producing a cholesteric liquid crystal layer using a liquid crystal composition including a chiral agent Y will be separately described in detail.

[Method for Producing Cholesteric Liquid Crystal Layer Using Liquid Crystal Composition Including Chiral Agent X]

Hereinafter, a method for producing a cholesteric liquid crystal layer using a liquid crystal composition including a chiral agent X (hereinafter, also referred to as "production method X") will be described.

The production method X includes at least the following step 1A and step 2A.

Step 1A: a step of forming a composition layer satisfying the following condition 1, the following condition 2, or the following condition 3 on a substrate, using a liquid crystal composition including a chiral agent X and a liquid crystal compound Step 2A: a step of subjecting the composition layer to a light irradiation treatment to result in cholesteric alignment of the liquid crystal compound in the composition layer, thereby forming a cholesteric liquid crystal layer Condition 1: at least a part of the liquid crystal compound in the composition layer is tilt-aligned with respect to a substrate surface Condition 2: the liquid crystal compound is aligned such that a tilt angle of the liquid crystal compound in the composition layer continuously changes along a thickness direction;

Condition 3: at least a part of the liquid crystal compound in the composition layer is vertically aligned with respect to the substrate surface.

In addition, in a case where the liquid crystal compound has a polymerizable group, in the production method X, it is preferable to carry out a curing treatment on the composition layer, as will be described later.

Hereinafter, the materials used in each step and the procedure of each step will be described in detail.

<Step 1A>

The step 1A is a step of forming a composition layer satisfying the above condition 1, the above condition 2, or the above condition 3 on a substrate, using a liquid crystal composition including a chiral agent X and a liquid crystal compound (hereinafter, also referred to as "composition X").

Hereinafter, first, the substrate and the composition X used in the present step will be described in detail, and then the procedure of the step will be described in detail.

(Substrate)

The substrate is a plate that supports a layer of the composition which will be described later. Among others, a transparent substrate is preferable. The transparent substrate is intended to refer to a substrate having a visible light transmittance of 60% or more and preferably has a visible light transmittance of 80% or more and more preferably 90% or more.

The material constituting the substrate is not particularly limited, and examples thereof include a cellulose-based polymer, a polycarbonate-based polymer, a polyester-based polymer, a (meth)acrylic polymer, a styrene-based polymer, a polyolefin-based polymer, a vinyl chloride-based polymer, an amide-based polymer, an imide-based polymer, a sulfone-based polymer, a polyether sulfone-based polymer, and a polyether ether ketone-based polymer.

The substrate may contain various additives such as an ultraviolet (UV) absorber, a matting agent fine particle, a plasticizer, a deterioration inhibitor, and a release agent.

In addition, the substrate preferably has low birefringence in the visible light region. For example, the phase difference at a wavelength of 550 nm of the substrate is preferably 50 nm or less and more preferably 20 nm or less.

The thickness of the substrate is not particularly limited, but it is preferably 10 to 200 μm and more preferably 20 to 100 μm from the viewpoint of thinning and handleability.

The thickness is intended to refer to an average thickness, and is obtained by measuring thicknesses at any five places of the substrate and arithmetically averaging the measured values. Regarding the method of measuring the thickness, the same applies to the thickness of the cholesteric liquid crystal layer which will be described later.

In addition, in order to obtain a composition layer satisfying the above condition 1, the above condition 2, or the above condition 3, it is preferable that the substrate has a rubbing alignment film having a pretilt angle or an alignment film containing a uniaxially aligned or hybrid-aligned liquid crystal compound on the surface of the substrate.

(Composition X)

The composition X includes a liquid crystal compound and a chiral agent X having a helical twisting power changed depending on irradiation with light. Hereinafter, each component will be described.

As described above, the absolute value of the weighted average helical twisting power of the chiral agent in the composition layer obtained in the step 1A is, for example, preferably 0.0 to 1.9 $\mu m^{-1}$, more preferably 0.0 to 1.5 $\mu m^{-1}$, still more preferably 0.0 to 1.0 $\mu m^{-1}$, particularly preferably 0.0 to 0.5 $\mu m^{-1}$, and most preferably zero, from the viewpoint of easy formation of the composition layer. Therefore, in a case where the chiral agent X has a helical twisting power exceeding the above-mentioned predetermined range in a state of no light irradiation treatment, it is preferable that the composition X includes a chiral agent that induces a helix in a direction opposite to that of the chiral agent X (hereinafter, also referred to as "chiral agent XA"), and the helical twisting power of the chiral agent X is offset to almost zero in the step 1A (that is, the weighted average helical twisting power of the chiral agent in the composition layer obtained in the step 1A is set to the above predetermined range). It is more preferable that the chiral agent XA is a compound that does not change the helical twisting power by the light irradiation treatment.

In addition, in a case where the liquid crystal composition includes a plurality of chiral agents X as the chiral agent and then in a case where the weighted average helical twisting power of the plurality of chiral agents X is a helical twisting power outside the above-mentioned predetermined range in a state of no light irradiation treatment, "another chiral agent XA that induces a helix in a direction opposite to that of the chiral agent X" is intended to mean a chiral agent that induces a helix in a direction opposite to that of the weighted average helical twisting power of the plurality of chiral agents X.

In a case where the chiral agent X alone has no helical twisting power in a state of no light irradiation treatment and has a property of increasing a helical twisting power depending on irradiation with light, the chiral agent XA may not be used in combination therewith.

«Liquid Crystal Compound»

The type of the liquid crystal compound is not particularly limited.

Generally, liquid crystal compounds can be classified into a rod-like type (rod-like liquid crystal compound) and a disk-like type (discotic liquid crystal compound, disk-like liquid crystal compound) depending on the shape thereof. Further, the rod-like type and the disk-like type are each classified into a low molecular weight type and a high molecular weight type. The high molecular weight generally refers to having a polymerization degree of 100 or more (Polymer Physics-Phase Transition Dynamics, Masao Doi, page 2, Iwanami Shoten, 1992). Any liquid crystal compound can be used in the present invention. In addition, two or more liquid crystal compounds may be used in combination.

The liquid crystal compound may have a polymerizable group. The type of the polymerizable group is not particularly limited, and a functional group capable of addition polymerization reaction is preferable, and a polymerizable ethylenically unsaturated group or a cyclic polymerizable group is more preferable. More specifically, the polymerizable group is preferably a (meth)acryloyl group, a vinyl group, a styryl group, an allyl group, an epoxy group, or an oxetane group, and more preferably a (meth)acryloyl group.

A liquid crystal compound represented by Formula (I) is suitably used as the liquid crystal compound.

$$Q^1—Sp^1—[A—L]_m—Sp^2—Q^2 \quad (I)$$

In the formula,

A represents a phenylene group which may have a substituent or a trans-1,4-cyclohexylene group which may have a substituent, at least one of A's represents a trans-1,4-cyclohexylene group which may have a substituent, L represents a single bond or a linking group selected from the group consisting of $—CH_2O—$, $—OCH_2—$, $—(CH_2)_2OC(=O)—$, $—C(=O)O(CH_2)_2—$, —C(=O)O—, —OC(=O)—, —OC(=O)O—, —CH=N—N=CH—, —CH=CH—, —NHC(=O)—, —C(=O)NH—, —CH=N—, —N=CH—, —CH=CH—C(=O)O—, and —OC(=O)—CH=CH—, m represents an integer of 3 to 12, $Sp^1$ and $Sp^2$ each independently represent a single bond or a linking group selected from the group consisting of a linear or branched alkylene group having 1 to 20 carbon atoms and a group where one or two or more $—CH_2—$ in a linear or branched alkylene group having 1 to 20 carbon atoms is substituted with —O—, —S—, —NH—, $—N(CH_3)—$, —C(=O)—, —OC(=O)—, or —C(=O)O—, and $Q^1$ and $Q^2$ each independently represent a hydrogen atom or a polymerizable group selected from the group consisting of groups represented by Formula (Q-1) to Formula (Q-5), provided that one of $Q^1$ and $Q^2$ represents a polymerizable group.

(Q-1)

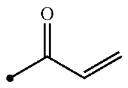

(Q-2)

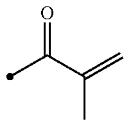

(Q-3)

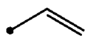

(Q-4)

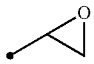

(Q-5)

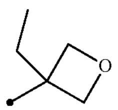

A is a phenylene group which may have a substituent or a trans-1,4-cyclohexylene group which may have a substituent. In the present specification, the phenylene group is preferably a 1,4-phenylene group.

At least one of A's is a trans-1,4-cyclohexylene group which may have a substituent.

m pieces of A's may be the same as or different from each other.

m represents an integer of 3 to 12, preferably an integer of 3 to 9, more preferably an integer of 3 to 7, and still more preferably an integer of 3 to 5.

The substituent which the phenylene group and the trans-1,4-cyclohexylene group in Formula (I) may have is not particularly limited, and examples thereof include substituents selected from the group consisting of an alkyl group, a cycloalkyl group, an alkoxy group, an alkyl ether group, an amide group, an amino group, a halogen atom, and a group formed by combining two or more of these substituents. In addition, examples of the substituent include substituents represented by $—C(=O)—X^3\text{-}Sp^3\text{-}Q^3$ which will be described later. The phenylene group and the trans-1,4-cyclohexylene group may have 1 to 4 substituents. In a case of having two or more substituents, the two or more substituents may be the same as or different from each other.

In the present specification, the alkyl group may be either linear or branched. The number of carbon atoms in the alkyl group is preferably 1 to 30, more preferably 1 to 10, and still more preferably 1 to 6. Examples of the alkyl group include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a 1,1-dimethylpropyl group, an n-hexyl group, an isohexyl group, a heptyl group, an octyl group, a nonyl group, a decyl group, an undecyl group, and a dodecyl group. The explanation of the alkyl group in the alkoxy group is also the same as the explanation on the foregoing alkyl group. In addition, in the present specification, specific examples of the alkylene group in a case of being referred to as an alkylene group include divalent groups obtained by removing one hydrogen atom from each of the foregoing examples of the alkyl group. Examples of the halogen atom include a fluorine atom, a chlorine atom, a bromine atom, and an iodine atom.

In the present specification, the number of carbon atoms in the cycloalkyl group is preferably 3 or more and more preferably 5 or more and is preferably 20 or less, more preferably 10 or less, still more preferably 8 or less, and particularly preferably 6 or less. Examples of the cycloalkyl group include a cyclopropyl group, a cyclobutyl group, a cyclopentyl group, a cyclohexyl group, a cycloheptyl group, and a cyclooctyl group.

The substituent which the phenylene group and the trans-1,4-cyclohexylene group may have is preferably a substituent selected from the group consisting of an alkyl group, an alkoxy group, and $—C(=O)—X^3\text{-}Sp^3\text{-}Q^3$. Here, $X^3$ represents a single bond, —O—, —S—, or $—N(Sp^4\text{-}Q^4)—$ or represents a nitrogen atom forming a ring structure together with $Q^3$ and $Sp^3$. $Sp^3$ and $Sp^4$ each independently represent a single bond or a linking group selected from the group consisting of a linear or branched alkylene group having 1 to 20 carbon atoms and a group where one or two or more $—CH_2—$ in a linear or branched alkylene group having 1 to 20 carbon atoms is substituted with —O—, —S—, —NH—, $—N(CH_3)—$, —C(=O)—, —OC(=O)—, or —C(=O)O—.

$Q^3$ and $Q^4$ each independently represent a hydrogen atom, a cycloalkyl group, a group where one or two or more $—CH_2—$ in a cycloalkyl group is substituted with —O—, —S—, —NH—, $—N(CH_3)—$, —C(=O)—, —OC(=O)—, or —C(=O)O—, or any polymerizable group selected from the group consisting of groups represented by Formula (Q-1) to Formula (Q-5).

Specific examples of the group where one or two or more $—CH_2—$ in a cycloalkyl group is substituted with —O—, —S—, —NH—, $—N(CH_3)—$, —C(═O)—, —OC(═O)—, or —C(═O)O— include a tetrahydrofuranyl group, a pyrrolidinyl group, an imidazolidinyl group, a pyrazolidinyl group, a piperidyl group, a piperazinyl group, and a morpholinyl group. Among them, a tetrahydrofuranyl group is preferable, and a 2-tetrahydrofuranyl group is more preferable.

In Formula (I), L represents a single bond or a linking group selected from the group consisting of $—CH_2O—$, $—OCH_2—$, $—(CH_2)_2OC(═O)—$, $—C(═O)O(CH_2)_2—$, —C(═O)O—, —OC(═O)—, —OC(═O)O—, —CH═CH—C(═O)O—, and —OC(═O)—CH═CH—. L is preferably —C(═O)O— or —OC(═O)—. m pieces of L's may be the same as or different from each other.

$Sp^1$ and $Sp^2$ each independently represent a single bond or a linking group selected from the group consisting of a linear or branched alkylene group having 1 to 20 carbon atoms and a group where one or two or more $—CH_2—$ in a linear or branched alkylene group having 1 to 20 carbon atoms is substituted with —O—, —S—, —NH—, $—N(CH_3)—$, —C(═O)—, —OC(═O)—, or —C(═O)O—. $Sp^1$ and $Sp^2$ -continued (Q-5)

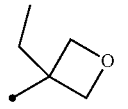

The polymerizable group is preferably an acryloyl group (Formula (Q-1)) or a methacryloyl group (Formula (Q-2)).

Specific examples of the liquid crystal compound include a liquid crystal compound represented by Formula (I-11), a liquid crystal compound represented by Formula (I-21), and a liquid crystal compound represented by Formula (I-31). In addition to the foregoing compounds, known compounds such as a compound represented by Formula (I) in JP2013-112631A, a compound represented by Formula (I) in JP2010-070543A, a compound represented by Formula (I) in JP2008-291218A, a compound represented by Formula (I) in JP4725516B, a compound represented by Formula (II) in JP2013-087109A, a compound described in paragraph 0043 of JP2007-176927A, a compound represented by Formula (1-1) in JP2009-286885A, a compound represented by Formula (I) in WO2014/010325A, a compound represented by Formula (1) in JP2016-081035A, and a compound represented by Formulae (2-1) and (2-2) in JP2016-121339A can be mentioned.

A liquid crystal compound represented by Formula (I-11)

(I-11)

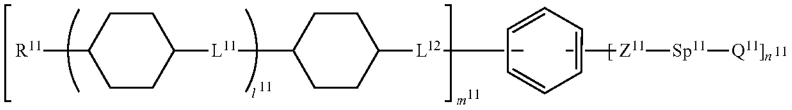

are each independently preferably a linking group formed by combining one or two or more groups selected from the group consisting of a linear alkylene group having 1 to 10 carbon atoms to which a linking group selected from the group consisting of —O—, —OC(═O)—, and —C(═O)O— is bonded to both terminals thereof, —OC(═O)—, —C(═O)O—, —O—, and a linear alkylene group having 1 to 10 carbon atoms, and more preferably a linear alkylene group having 1 to 10 carbon atoms to which —O— is bonded to both terminals thereof.

$Q^1$ and $Q^2$ each independently represent a hydrogen atom or a polymerizable group selected from the group consisting of groups represented by Formula (Q-1) to Formula (Q-5). However, either $Q^1$ or $Q^2$ represents a polymerizable group.

(Q-1)

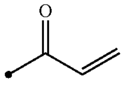

(Q-2)

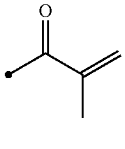

(Q-3)

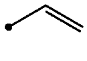

(Q-4)

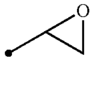

In the formula, $R^{11}$ represents a hydrogen atom, a linear or branched alkyl group having 1 to 12 carbon atoms, or $—Z^{12}\text{-}Sp^{12}\text{-}Q^{12}$, $L^{11}$ represents a single bond, —C(═O)O—, or —O(C═O)—, $L^{12}$ represents —C(═O)O—, —OC(═O)—, or $—CONR^2—$ $R^2$ represents a hydrogen atom or an alkyl group having 1 to 3 carbon atoms, $Z^{11}$ and $Z^{12}$ each independently represent a single bond, —O—, —NH—, $—N(CH_3)—$, —S—, —C(═O)O—, —OC(═O)—, —OC(═O)O—, or $—C(═O)NR^{12}—$, $R^{12}$ represents a hydrogen atom or $Sp^{12}\text{-}Q^{12}$, $Sp^{11}$ and $Sp^{12}$ each independently represent a single bond, a linear or branched alkylene group having 1 to 12 carbon atoms which may be substituted with $Q^{11}$, or a linking group obtained by substituting one or more $—CH_2—$ in a linear or branched alkylene group having 1 to 12 carbon atoms which may be substituted with $Q^{11}$ with —O—, —S—, —NH—, $—N(Q^{11})—$, or —C(═O)—, $Q^{11}$ represents a hydrogen atom, a cycloalkyl group, a group where one or more $—CH_2—$ in a cycloalkyl group is substituted with —O—, —S—, —NH—, $—N(CH_3)—$, —C(═O)—, —OC(═O)—, or —C(═O)O—, or a polymerizable group selected from the group consisting of groups represented by Formula (Q-1) to Formula (Q-5), $Q^{12}$ represents a hydrogen atom or a polymerizable group selected from the group consisting of groups represented by Formula (Q-1) to Formula (Q-5), $l^{11}$ represents an integer of 0 to 2, $m^{11}$ represents an integer of 1 or 2, $n^{11}$ represents an integer of 1 to 3, and a plurality of $R^{11}$'s, a plurality of $L^{11}$'s, a plurality of $L^{11}$'s, a plurality of $l^{11}$'s, a plurality of $Z^{11}$'s, a plurality of $Sp^{11}$'s, and a plurality of $Q^{11}$'s may be respectively the same as or different from each other.

In addition, the liquid crystal compound represented by Formula (I-11) contains at least one $—Z^{12}\text{-}Sp^{12}\text{-}Q^{12}$ in which $Q^{12}$ is a polymerizable group selected from the group consisting of groups represented by Formula (Q-1) to Formula (Q-5), as $R^{11}$.

In addition, in the liquid crystal compound represented by Formula (I-11), preferred is $—Z^{11}Sp^{11}\text{-}Q^{11}$ in which $Z^{11}$ is —C(═O)O— or $—C(═O)NR^{12}—$ and $Q^{11}$ is a polymerizable group selected from the group consisting of groups represented by Formula (Q-1) to Formula (Q-5). In addition, in the liquid crystal compound represented by Formula (I-11), $R^{11}$ is preferably $—Z^{12}\text{-}Sp^{12}\text{-}Q^{12}$ in which $Z^{12}$ is —C(═O)O— or $—C(═O)NR^{12}—$, and $Q^{12}$ is a polymerizable group selected from the group consisting of groups represented by Formula (Q-1) to Formula (Q-5).

Any 1,4-cyclohexylene group contained in the liquid crystal compound represented by Formula (I-11) is a trans-1,4-cyclohexylene group.

A suitable aspect of the liquid crystal compound represented by Formula (I-11) may be, for example, a compound in which $L^{11}$ is a single bond, $l^{11}$ is 1-(a dicyclohexyl group), and $Q^{11}$ is a polymerizable group selected from the group consisting of groups represented by Formula (Q-1) to Formula (Q-5).

Another suitable aspect of the liquid crystal compound represented by Formula (I-11) may be, for example, a compound in which $m^{11}$ is 2, $l^{11}$ is 0, and two $R^{11}$'s each represent $—Z^{12}\text{-}Sp^{12}\text{-}Q^{12}$, and $Q^{12}$ is a polymerizable group selected from the group consisting of groups represented by Formula (Q-1) to Formula (Q-5).

The liquid crystal compound represented by Formula (I-21)

(I-21)

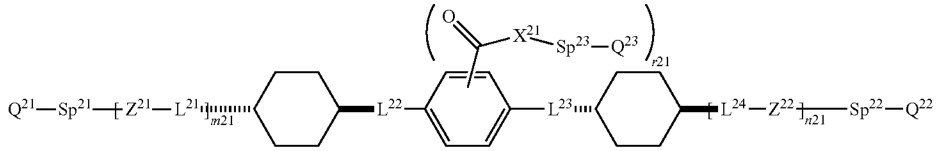

In the formula, $Z^{21}$ and $Z^{22}$ each independently represent a trans-1,4-cyclohexylene group which may have a substituent or a phenylene group which may have a substituent, the above substituents are each independently 1 to 4 substituents selected from the group consisting of $—CO—X^{21}\text{-}Sp^{23}\text{-}Q^{23}$, an alkyl group, and an alkoxy group, m21 represents an integer of 1 or 2, and n21 represents an integer of 0 or 1, in a case where m21 represents 2, n21 represents 0, in a case where m21 represents 2, two $Z^{21}$'s may be the same or different, at least one of $Z^{21}$ or $Z^{22}$ is a phenylene group which may have a substituent, $L^{21}$, $L^{22}$, $L^{23}$, and $L^{24}$ each independently represent a single bond or a linking group selected from the group consisting of $—CH_2O—$, $—OCH_2—$, $—(CH_2)_2OC(═O)—$, $—C(═O)O(CH_2)_2—$, —C(═O)O—, —OC(═O)—, —OC(═O)O—, —CH═CH—C(═O)O—, and —OC(═O)—CH═CH—, $X^{21}$ represents —O—, —S—, or $—N(Sp^{25}\text{-}Q^{25})\text{-}$ or represents a nitrogen atom forming a ring structure together with $Q^{23}$ and $Sp^{23}$, $r^{21}$ represents an integer of 1 to 4, $Sp^{21}$, $Sp^{22}$, $Sp^{23}$, and $Sp^{25}$ each independently represent a single bond or a linking group selected from the group consisting of a linear or branched alkylene group having 1 to 20 carbon atoms and a group where one or two or more $—CH_2—$ in a linear or branched alkylene group having 1 to 20 carbon atoms is substituted with —O—, —S—, —NH—, $—N(CH_3)—$, —C(═O)—, —OC(═O)—, or —C(═O)O—, $Q^{21}$ and $Q^{22}$ each independently represent a polymerizable group selected from the group consisting of groups represented by Formula (Q-1) to Formula (Q-5), $Q^{23}$ represents a hydrogen atom, a cycloalkyl group, a group where one or two or more $—CH_2—$ in a cycloalkyl group is substituted with —O—, —S—, —NH—, $—N(CH_3)—$, —C(═O)—, —OC(═O)—, or —C(═O)O—, any one polymerizable group selected from the group consisting of groups represented by Formula (Q-1) to Formula (Q-5), or a single bond in a case where $X^{21}$ is a nitrogen atom forming a ring structure together with $Q^{23}$ and $Sp^{23}$, and $Q^{25}$ represents a hydrogen atom, a cycloalkyl group, a group where one or two or more $—CH_2—$ in a cycloalkyl group is substituted with —O—, —S—, —NH—, $—N(CH_3)—$, —C(=O)—, —OC(=O)—, or —C(=O)O—, or any one polymerizable group selected from the group consisting of groups represented by Formula (Q-1) to Formula (Q-5), provided that in a case where $Sp^{25}$ is a single bond, $Q^{25}$ is not a hydrogen atom.

It is also preferred that the liquid crystal compound represented by Formula (I-21) has a structure in which a 1,4-phenylene group and a trans-1,4-cyclohexylene group are alternately present. For example, preferred is a structure in which m21 is 2, n21 is 0, and $Z^{21}$ is a trans-1,4-cyclohexylene group which may have a substituent or an arylene group which may have a substituent, each of which from the $Q^{21}$ side, or a structure in which m21 is 1, n21 is 1, $Z^{21}$ is an arylene group which may have a substituent, and $Z^{22}$ is an arylene group which may have a substituent.

A liquid crystal compound represented by Formula (I-31);

$Q^{31}$ and $Q^{32}$ each independently represent a polymerizable group selected from the group consisting of groups represented by Formula (Q-1) to Formula (Q-5), and $Q^{33}$ and $Q^{34}$ each independently represent a hydrogen atom, a cycloalkyl group, a group where one or two or more $—CH_2—$ in a cycloalkyl group is substituted with —O—, —S—, —NH—, $—N(CH_3)—$, —C(=O)—, —OC(=O)—, or —C(=O)O—, or any one polymerizable group selected from the group consisting of groups represented by Formula (Q-1) to Formula (Q-5), provided that $Q^{33}$ may represent a single bond in a case of forming a ring structure together with $X^{31}$ and $Sp^{33}$, and $Q^{34}$ is not a hydrogen atom in a case where $Sp^{34}$ is a single bond.

As the liquid crystal compound represented by Formula (I-31), particularly preferable compounds include a compound in which $Z^{32}$ is a phenylene group and a compound in which m32 is 0.

It is also preferred that the compound represented by Formula (I) has a partial structure represented by Formula (II).

(I-31)

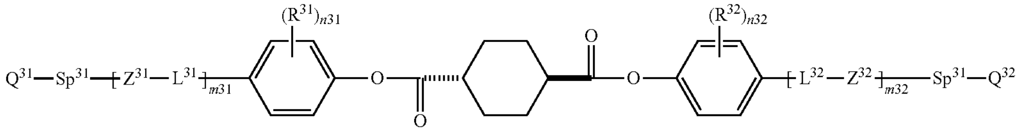

In the formula, $R^{31}$ and $R^{32}$ each independently represent an alkyl group, an alkoxy group, and a group selected from the group consisting of $—C(=O)—X^{31}-Sp^{33}-Q^{33}$, n31 and n32 each independently represent an integer of 0 to 4, $X^{31}$ represents a single bond, —O—, —S—, or $—N(Sp^{34}-Q^{34})-$ or represents a nitrogen atom forming a ring structure together with $Q^{33}$ and $Sp^{33}$, $Z^{31}$ represents a phenylene group which may have a substituent, $Z^{32}$ represents a trans-1,4-cyclohexylene group which may have a substituent or a phenylene group which may have a substituent, the above substituents are each independently 1 to 4 substituents selected from the group consisting of an alkyl group, an alkoxy group, and $—C(=O)—X^{31}-Sp^{33}-Q^{33}$, m31 represents an integer of 1 or 2, and m32 represents an integer of 0 to 2, in a case where m31 and m32 represent 2, two $Z^{31}$'s and $Z^{32}$'s may be the same or different, $L^{31}$ and $L^{32}$ each independently represent a single bond or a linking group selected from the group consisting of $—CH_2O—$, $—OCH_2—$, $—(CH_2)_2OC(=O)—$, $—C(=O)O(CH_2)_2—$, —C(=O)O—, —OC(=O)—, —OC(=O)O—, —CH=CH—C(=O)O—, and —OC(=O)—CH=CH—, $Sp^{31}$, $Sp^{32}$, $Sp^{33}$, and $Sp^{34}$ each independently represent a single bond or a linking group selected from the group consisting of a linear or branched alkylene group having 1 to 20 carbon atoms and a group where one or two or more $—CH_2—$ in a linear or branched alkylene group having 1 to 20 carbon atoms is substituted with —O—, —S—, —NH—, $—N(CH_3)—$, —C(=O)—, —OC(=O)—, or —C(=O)O—, (II)

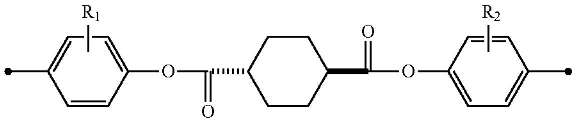

In Formula (II), black circles indicate the bonding positions with other moieties of Formula (I). It is sufficient that the partial structure represented by Formula (II) is included as a part of the partial structure represented by Formula (III) in Formula (I).

(III)

$$—[A—L]_m—$$

In the formula, $R^1$ and $R^2$ are each independently a group selected from the group consisting of a hydrogen atom, an alkyl group, an alkoxy group, and a group represented by $—C(=O)—X^3-Sp^3-Q^3$. Here, $X^3$ represents a single bond, —O—, —S—, or $—N(Sp^4-Q^4)-$ or represents a nitrogen atom forming a ring structure together with $Q^3$ and $Sp^3$. $X^3$ is preferably a single bond or —O—. $R^1$ and $R^2$ are preferably $—C(=O)—X^3-Sp^3-Q^3$. In addition, it is also preferred that $R^1$ and $R^2$ are the same. The bonding position of each of $R^1$ and $R^2$ to the phenylene group is not particularly limited.

$Sp^3$ and $Sp^4$ each independently represent a single bond or a linking group selected from the group consisting of a linear or branched alkylene group having 1 to 20 carbon atoms and a group where one or two or more $—CH_2—$ in a linear or branched alkylene group having 1 to 20 carbon atoms is substituted with —O—, —S—, —NH—, —$N(CH_3)$—, —C(=O)—, —OC(=O)—, or —C(=O)O—. $Sp^3$ and $Sp^4$ are each independently preferably a linear or branched alkylene group having 1 to 10 carbon atoms, more preferably a linear alkylene group having 1 to 5 carbon atoms, and still more preferably a linear alkylene group having 1 to 3 carbon atoms.

$Q^3$ and $Q^4$ each independently represent a hydrogen atom, a cycloalkyl group, a group where one or two or more —$CH_2$— in a cycloalkyl group is substituted with —O—, —S—, —NH—, —$N(CH_3)$—, —C(=O)—, —OC(=O)—, or —C(=O)O—, or any one polymerizable group selected from the group consisting of groups represented by Formula (Q-1) to Formula (Q-5).

It is also preferred that the compound represented by Formula (I) has, for example, a structure represented by Formula (II-2).

(11-2)

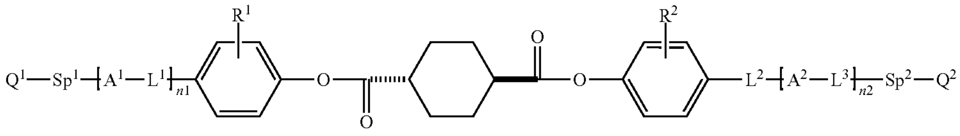

In the formula, $A^1$ and $A^2$ each independently represent a phenylene group which may have a substituent or a trans-1,4-cyclohexylene group which may have a substituent, and the above substituents are each independently 1 to 4 substituents selected from the group consisting of an alkyl group, an alkoxy group, and —C(=O)—$X^3$-$Sp^3$-$Q^3$, $L^1$, $L^2$, and $L^3$ each represent a single bond or a linking group selected from the group consisting of —$CH_2O$—, —$OCH_2$—, —$(CH_2)_2OC(=O)$—, —$C(=O)O(CH_2)_2$—, —C(=O)O—, —OC(=O)—, —OC(=O)O—, —CH=CH—C(=O)O—, and —OC(=O)—CH=CH—, and n1 and n2 each independently represent an integer of 0 to 9, and n1+n2 is 9 or less.

Each of $Q^1$, $Q^2$, $Sp^1$, and $Sp^2$ has the same definition as that of each group in Formula (I). Each of $X^3$, $Sp^3$, $Q^3$, $R^1$, and $R^2$ has the same definition as that of each group in Formula (II).

As the liquid crystal compound for use in the present invention, a compound represented by Formula (IV) and described in JP2014-198814A, in particular, a polymerizable liquid crystal compound having one (meth)acrylate group represented by Formula (IV) is also suitably used.

Formula (IV)

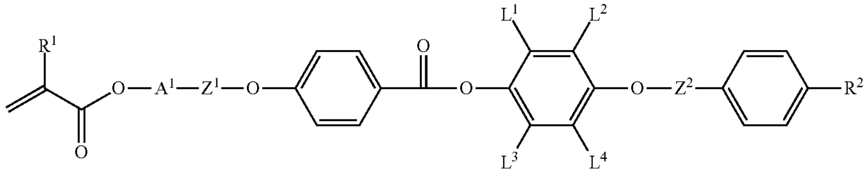

In Formula (IV), $A^1$ represents an alkylene group having 2 to 18 carbon atoms, in which one $CH_2$ or two or more non-adjacent $CH_2$'s in the alkylene group may be substituted with —O—;

$Z^1$ represents —C(═O)—, —O—C(═O)—, or a single bond;

$Z^2$ represents —C(═O)— or —C(═O)—CH═CH—;

$R^1$ represents a hydrogen atom or a methyl group;

$R^2$ represents a hydrogen atom, a halogen atom, a linear alkyl group having 1 to 4 carbon atoms, a methoxy group, an ethoxy group, a phenyl group which may have a substituent, a vinyl group, a formyl group, a nitro group, a cyano group, an acetyl group, an acetoxy group, an N-acetylamide group, an acryloylamino group, an N,N-dimethylamino group, a maleimide group, a methacryloylamino group, an allyloxy group, an allyloxycarbamoyl group, an N-alkyloxycarbamoyl group in which the alkyl group has 1 to 4 carbon atoms, an N-(2-methacryloyloxyethyl)carbamoyloxy group, an N-(2-acryloyloxyethyl)carbamoyloxy group, or a structure represented by Formula (IV-2); and $L^1$, $L^2$, $L^3$, and $L^4$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, and at least one of $L^1$, $L^2$, $L^3$, or $L^4$ represents a group other than a hydrogen atom.

$$-Z^5\text{-T-Sp-P} \qquad \text{Formula (IV-2)}$$

In Formula (IV-2), P represents an acryloyl group, a methacryl group, or a hydrogen atom, and $Z^5$ represents a single bond, —C(═O)O—, —OC(═O)—, —C(═O)NR$^1$— (where $R^1$ represents a hydrogen atom or a methyl group), —NR$^1$C(═O)—, —C(═O)S—, or —SC(═O)—, T represents 1,4-phenylene, and Sp represents a divalent aliphatic group having 1 to 12 carbon atoms which may have a substituent, in which one $CH_2$ or two or more non-adjacent $CH_2$'s in the aliphatic group may be substituted with —O—, —S—, —OC(═O)—, —C(═O)O—, or —OC(═O)O—.

The compound represented by Formula (IV) is preferably a compound represented by Formula (V).

Formula (V)

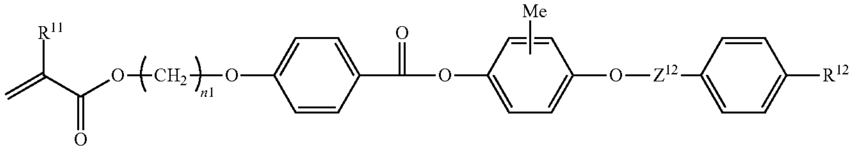

In Formula (V), n1 represents an integer of 3 to 6;

$R^{11}$ represents a hydrogen atom or a methyl group;

$Z^{12}$ represents —C(═O)— or —C(═O)—CH═CH—; and $R^{12}$ represents a hydrogen atom, a linear alkyl group having 1 to 4 carbon atoms, a methoxy group, an ethoxy group, a phenyl group, an acryloylamino group, a methacryloylamino group, an allyloxy group, or a structure represented by Formula (IV-3).

$$-Z^{51}\text{-T-Sp-P} \qquad \text{Formula (IV-3)}$$

In Formula (IV-3), P represents an acryloyl group or a methacryl group;

$Z^{51}$ represents —C(═O)O— or —OC(═O)—; T represents 1,4-phenylene; and

Sp represents a divalent aliphatic group having 2 to 6 carbon atoms which may have a substituent. One $CH_2$ or two or more non-adjacent $CH_2$'s in this aliphatic group may be substituted with —O—, —OC(═O)—, —C(═O)O—, or —OC(═O)O—.

n1 represents an integer of 3 to 6, preferably 3 or 4.

$Z^{12}$ represents —C(═O)— or —C(═O)—CH═CH— and preferably represents —C(═O)—.

$R^{12}$ is a hydrogen atom, a linear alkyl group having 1 to 4 carbon atoms, a methoxy group, an ethoxy group, a phenyl group, an acryloylamino group, a methacryloylamino group, an allyloxy group, or a group represented by Formula (IV-3), preferably represents a methyl group, an ethyl group, a propyl group, a methoxy group, an ethoxy group, a phenyl group, an acryloylamino group, a methacryloylamino group, or a group represented by Formula (IV-3), and more preferably represents a methyl group, an ethyl group, a methoxy group, an ethoxy group, a phenyl group, an acryloylamino group, a methacryloylamino group, or a structure represented by Formula (IV-3).

As the liquid crystal compound for use in the present invention, a compound represented by Formula (VI) and described in JP2014-198814A, in particular, a liquid crystal compound having no (meth)acrylate group represented by Formula (VI) is also suitably used.

Formula (VI)

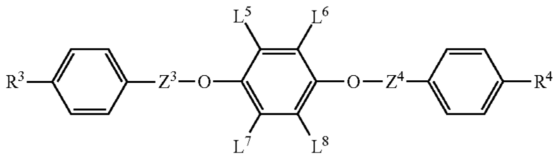

In Formula (VI), $Z^3$ represents —C(═O)— or —CH═CH—C(═O)—;

$Z^4$ represents —C(═O)— or —C(═O)—CH═CH—;

$R^3$ and $R^4$ each independently represent a hydrogen atom, a halogen atom, a linear alkyl group having 1 to 4 carbon atoms, a methoxy group, an ethoxy group, an aromatic ring which may have a substituent, a cyclohexyl group, a vinyl group, a formyl group, a nitro group, a cyano group, an acetyl group, an acetoxy group, an acryloylamino group, an N,N-dimethylamino group, a maleimide group, a methacryloylamino group, an allyloxy group, an allyloxycarbamoyl group, an N-alkyloxycarbamoyl group in which the alkyl group has 1 to 4 carbon atoms, an N-(2-methacryloyloxyethyl)carbamoyloxy group, an N-(2-acryloyloxyethyl) carbamoyloxy group, or a structure represented by Formula (VI-2); and $L^5$, $L^6$, $L^7$, and $L^8$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, and at least one of $L^5$, $L^6$, $L^7$, or $L^8$ represents a group other than a hydrogen atom.

$$—Z^5\text{-T-Sp-P} \qquad \text{Formula (VI-2)}$$

In Formula (VI-2), P represents an acryloyl group, a methacryl group, or a hydrogen atom, $Z^5$ represents —C(═O)O—, —OC(═O)—, —C(═O)$NR^1$— (where $R^1$ represents a hydrogen atom or a methyl group), —$NR^1$C(═O)—, —C(═O)S—, or —SC(═O)—, T represents 1,4-phenylene, and Sp represents a divalent aliphatic group having 1 to 12 carbon atoms which may have a substituent. However, one $CH_2$ or two or more non-adjacent $CH_2$'s in group, a methoxy group, an ethoxy group, a phenyl group, an acryloylamino group, a methacryloylamino group, or a structure represented by Formula (IV-3), and more preferably represents a methyl group, an ethyl group, a methoxy group, an ethoxy group, a phenyl group, an acryloylamino group, a methacryloylamino group, or a structure represented by Formula (IV-3).

As the liquid crystal compound for use in the present invention, a compound represented by Formula (VIII) and described in JP2014-198814A, in particular, a polymerizable liquid crystal compound having two (meth)acrylate groups represented by Formula (VIII) is also suitably used.

Formula (VIII)

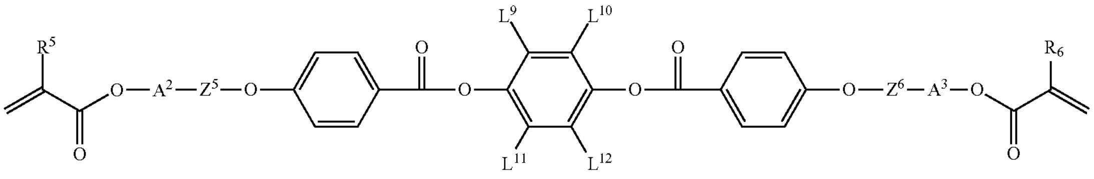

this aliphatic group may be substituted with —O—, —S—, —OC(═O)—, —C(═O)O—, or —OC(═O)O—.

The compound represented by Formula (VI) is preferably a compound represented by Formula (VII).

Formula (VII)

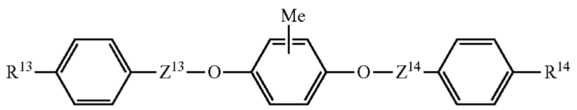

In Formula (VII), $Z^{13}$ represents —C(═O)— or —C(═O)—CH═CH—;

$Z^{14}$ represents —C(═O)— or —CH═CH—C(═O)—; and $R^{13}$ and $R^{14}$ each independently represent a hydrogen atom, a linear alkyl group having 1 to 4 carbon atoms, In Formula (VIII), $A^2$ and $A^3$ each independently represent an alkylene group having 2 to 18 carbon atoms, and one $CH_2$ or two or more non-adjacent $CH_2$'s in the alkylene group may be substituted with —O—;

$Z^5$ represents —C(═O)—, —OC(═O)—, or a single bond;

$Z^6$ represents —C(═O)—, —C(═O)O—, or a single bond;

$R^5$ and $R^6$ each independently represent a hydrogen atom or a methyl group; and $L^9$, $L^{10}$, $L^{11}$, and $L^{12}$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, and at least one of $L^9$, $L^{10}$, $L^{11}$, or $L^{12}$ represents a group other than a hydrogen atom.

The compound represented by Formula (VIII) is preferably a compound represented by Formula (IX).

Formula (IX)

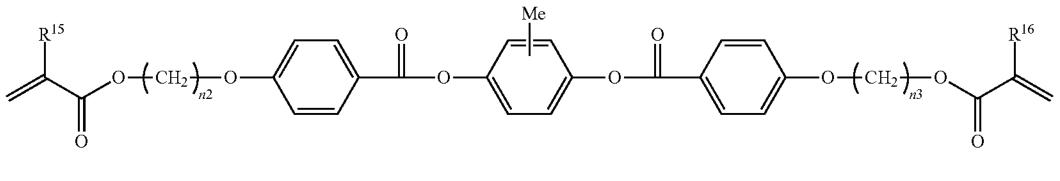

a methoxy group, an ethoxy group, a phenyl group, an acryloylamino group, a methacryloylamino group, an allyloxy group, or a structure represented by Formula (IV-3).

$Z^{13}$ represents —C(═O)— or —C(═O)—CH═CH— and is preferably —C(═O)—.

$R^{13}$ and $R^{14}$ each independently represent a hydrogen atom, a linear alkyl group having 1 to 4 carbon atoms, a methoxy group, an ethoxy group, a phenyl group, an acryloylamino group, a methacryloylamino group, an allyloxy group, or a structure represented by Formula (IV-3), preferably represents a methyl group, an ethyl group, a propyl In Formula (IX), n2 and n3 each independently represent an integer of 3 to 6; and $R^{15}$ and $R^{16}$ each independently represent a hydrogen atom or a methyl group.

In Formula (IX), it is preferred that n2 and n3 each independently represent an integer of 3 to 6, and n2 and n3 are 4.

In Formula (IX), it is preferred that $R^{15}$ and $R^{16}$ each independently represent a hydrogen atom or a methyl group, and $R^{15}$ and $R^{16}$ each represent a hydrogen atom.

Such liquid crystal compounds can be produced by a known method.

In order to obtain a composition layer satisfying the above condition 1 and the above condition 2, it is preferable to use a liquid crystal compound having a large pretilt angle at the interface.

«Chiral Agent X Having Helical Twisting Power Changed Depending on Irradiation with Light»

The chiral agent X is a compound that induces a helix of a liquid crystal compound, and is not particularly limited as long as it is a chiral agent having a helical twisting power (HTP) changed depending on irradiation with light.

In addition, the chiral agent X may be liquid crystalline or non-liquid crystalline. The chiral agent X generally contains an asymmetric carbon atom. However, an axial asymmetric compound or planar asymmetric compound not containing an asymmetric carbon atom can also be used as the chiral agent X. The chiral agent X may have a polymerizable group.

The chiral agent X may be, for example, a so-called photoreactive chiral agent. The photoreactive chiral agent is a compound which has a chiral moiety and a photoreactive moiety that undergoes a structural change upon irradiation with light, and greatly changes the twisting power of the liquid crystal compound in accordance with the light irradiation amount, for example.

Examples of the photoreactive moiety that undergoes a structural change upon irradiation with light include photochromic compounds (written by Kingo Uchida and Masahiro Irie, Chemical Industry, Vol. 64, p. 640, 1999, and written by Kingo Uchida and Masahiro Irie, Fine Chemical, Vol. 28(9), p. 15, 1999). In addition, the structural change means decomposition, addition, isomerization, dimerization, or the like caused upon irradiation with light to the photoreactive moiety, and the structural change may be irreversible. In addition, the chiral moiety corresponds to an asymmetric carbon described in Chemistry of Liquid Crystal, No. 22, Hiroyuki Nohira, Chemistry Review, p. 73, 1994.

Examples of the photoreactive chiral agent include photoreactive chiral agents described in paragraphs 0044 to 0047 of JP2001-159709A, optically active compounds described in paragraphs 0019 to 0043 of JP2002-179669A, optically active compounds described in paragraphs 0020 to 0044 of JP2002-179633A, optically active compounds described in paragraphs 0016 to 0040 of JP2002-179670A, optically active compounds described in paragraphs 0017 to 0050 of JP2002-179668A, optically active compounds described in paragraphs 0018 to 0044 of JP2002-180051A, optically active compounds described in paragraphs 0016 to 0055 of JP2002-338575A, and optically active compounds in paragraphs 0020 to 0049 of JP2002-179682A.

Above all, a compound having at least one photoisomerization moiety is preferable as the chiral agent X. From the viewpoint that absorption of visible light is small, photoisomerization easily occurs, and the helical twisting power difference before and after light irradiation is large, the photoisomerization moiety is preferably a cinnamoyl moiety, a chalcone moiety, an azobenzene moiety, a stilbene moiety, or a coumarin moiety, and more preferably a cinnamoyl moiety or a chalcone moiety. In addition, the photoisomerization moiety corresponds to the above-mentioned photoreactive moiety that undergoes a structural change upon irradiation with light.

In addition, from the viewpoint that the helical twisting power difference before and after light irradiation is large, the chiral agent X is preferably an isosorbide-based optically active compound, an isomannide-based optical compound, or a binaphthol-based optically active compound. That is, the chiral agent X preferably has an isosorbide skeleton, an isomannide skeleton, or a binaphthol skeleton as the chiral moiety. Above all, from the viewpoint of a larger helical twisting power difference before and after light irradiation, the chiral agent X is more preferably an isosorbide-based optically active compound or a binaphthol-based optically active compound, and still more preferably an isosorbide-based optically active compound.

Since the helical pitch of the cholesteric liquid crystalline phase depends on the type of the chiral agent X and the addition concentration thereof, a desired pitch can be obtained by adjusting these factors.

The chiral agent X may be used alone or in combination of two or more thereof.

The total content of the chiral agent in the composition X (the total content of all chiral agents in the composition X) is preferably 2.0% by mass or more and more preferably 3.0% by mass or more with respect to the total mass of the liquid crystal compound. In addition, from the viewpoint of suppressing the haze of the cholesteric liquid crystal layer, the upper limit of the total content of the chiral agent in the composition X is preferably 15.0% by mass or less and more preferably 12.0% by mass or less with respect to the total mass of the liquid crystal compound.

«Optional Components»

The composition X may include components other than the liquid crystal compound and the chiral agent X.

«Chiral Agent XA»

The chiral agent XA is preferably a chiral agent which is a compound that induces a helix of a liquid crystal compound and has a helical twisting power (HTP) that is not changed depending on irradiation with light.

In addition, the chiral agent XA may be liquid crystalline or non-liquid crystalline. The chiral agent XA generally contains an asymmetric carbon atom. However, an axial asymmetric compound or planar asymmetric compound not containing an asymmetric carbon atom can also be used as the chiral agent XA. The chiral agent XA may have a polymerizable group.

A known chiral agent can be used as the chiral agent XA.

In a case where the liquid crystal composition includes one type of the chiral agent X alone and the chiral agent X has a helical twisting power exceeding a predetermined range (for example, 0.0 to 1.9 $\mu m^{-1}$) in a state of no light irradiation treatment, the chiral agent XA is preferably a chiral agent that induces a helix in a direction opposite to that of the above-mentioned chiral agent X. That is, for example, in a case where the helix induced by the chiral agent X is right-handed, the helix induced by the chiral agent XA is left-handed.

In addition, in a case where the liquid crystal composition includes a plurality of chiral agents X as the chiral agent and then the weighted average helical twisting power thereof exceeds the above-mentioned predetermined range in a state of no light irradiation treatment, the chiral agent XA is preferably a chiral agent that induces a helix in a direction opposite to that of the above-mentioned weighted average helical twisting power.

«Polymerization Initiator»

The composition X may include a polymerization initiator. In particular, in a case where the liquid crystal compound has a polymerizable group, the composition X preferably includes a polymerization initiator.

The polymerization initiator is preferably a photopolymerization initiator capable of initiating a polymerization reaction upon irradiation with ultraviolet rays. Examples of the photopolymerization initiator include α-carbonyl compounds (as described in U.S. Pat. Nos. 2,367,661A and 2,367,670A), acyloin ethers (as described in U.S. Pat. No. 2,448,828A), α-hydrocarbon-substituted aromatic acyloin compounds (as described in U.S. Pat. No. 2,722,512A), polynuclear quinone compounds (as described in U.S. Pat. Nos. 3,046,127A and 2,951,758A), combinations of triarylimidazole dimer and p-aminophenyl ketone (as described in U.S. Pat. No. 3,549,367A), acridine and phenazine compounds (as described in JP1985-105667A (JP-S60-105667A) and U.S. Pat. No. 4,239,850A), and oxadiazole compounds (as described in U.S. Pat. No. 4,212,970A).

The content of the polymerization initiator in the composition X (the total amount of polymerization initiators in a case where a plurality of polymerization initiators are included) is not particularly limited, but it is preferably 0.1% to 20% by mass and more preferably 1.0% to 8.0% by mass with respect to the total mass of the liquid crystal compound.

«Surfactant»

Figure 13:
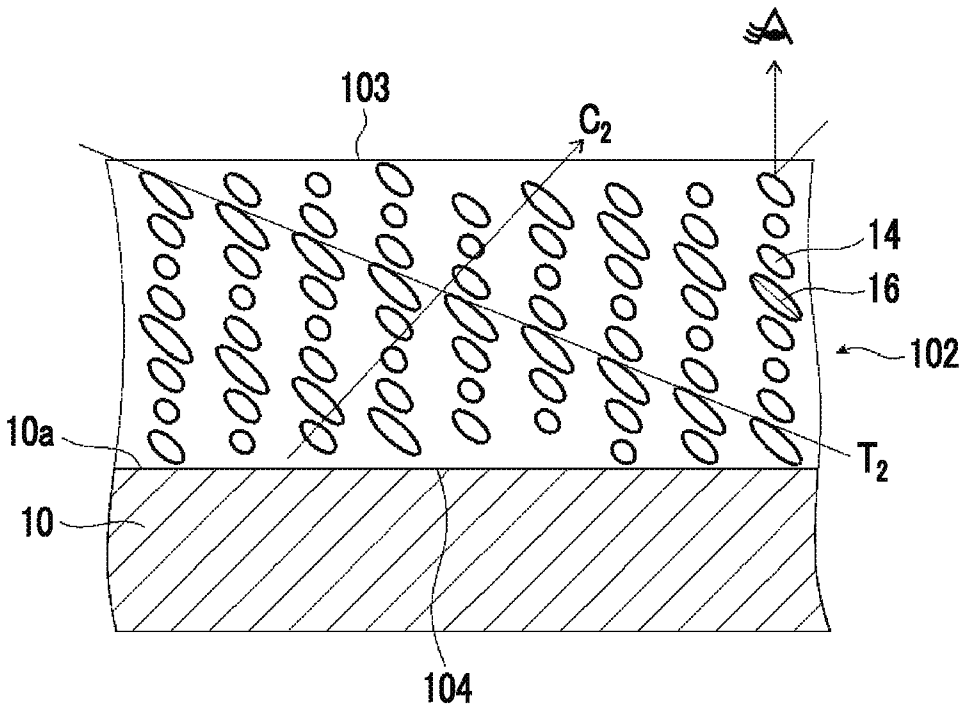
FIG. 13 is a schematic cross-sectional diagram of a cholesteric liquid crystalline phase of a cholesteric liquid crystal layer 102.
Figure 14:
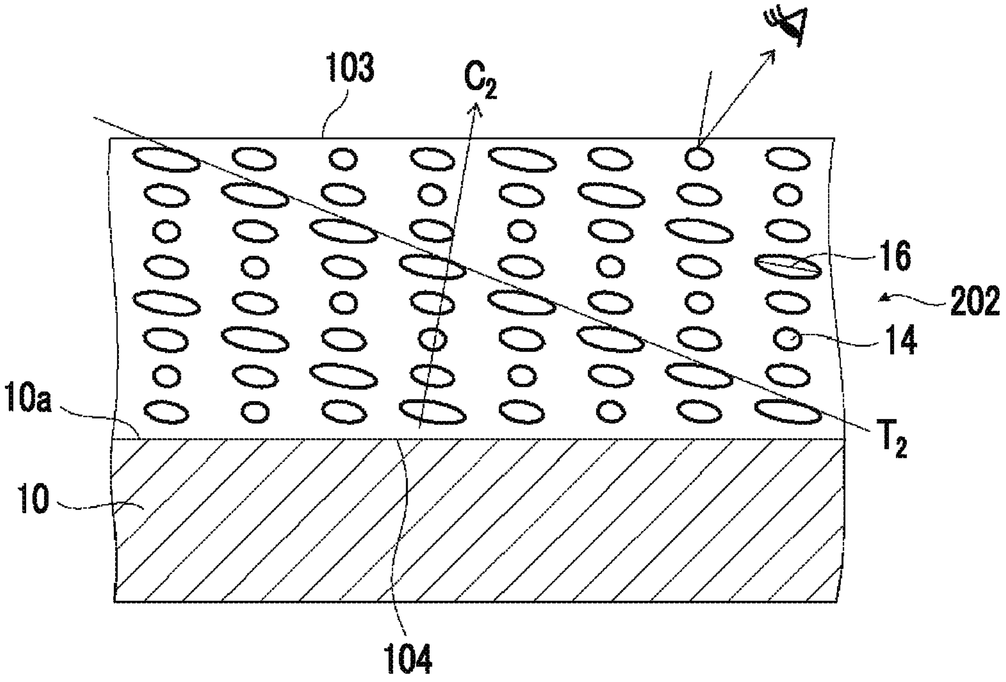
FIG. 14 is a schematic cross-sectional diagram of the cholesteric liquid crystalline phase of a cholesteric liquid crystal layer 202.

The composition X preferably includes a surfactant that can be unevenly distributed on the substrate-side surface of the composition layer and/or the surface of the composition layer opposite to the substrate. In a case where the composition X includes a surfactant, a composition layer satisfying the above condition 1, the above condition 2, or the above condition 3 is easily obtained, and therefore stable or rapid formation of a cholesteric liquid crystalline phase is possible. In addition, it is easy to obtain a cholesteric liquid crystal layer having a high reflectance and a wide reflection band and capable of giving transmitted light having a high circular polarization degree with respect to an incidence ray from an oblique direction, which is shown in FIG. 13 and FIG. 14 described later.

The surfactant is not particularly limited, and examples thereof include a fluorine-based surfactant, a boronic acid compound, and an ionic surfactant.

The fluorine-based surfactant is not particularly limited, and examples thereof include a perfluoroalkyl compound (for example, a perfluoroalkyl compound described in JP4592225B and JP5774518B, and a trade name "FTERGENT" (manufactured by Neos Company Limited)), and a polymer having a perfluoroalkyl group (preferably having 1 to 10 carbon atoms) in the side chain (for example, a polymers with 2-(perfluorohexyl)ethyl acrylate as a monomer).

The boronic acid compound is not particularly limited, and examples thereof include the boronic acid compounds described in JP2013-054201A.

The ionic surfactant is not particularly limited and is preferably a cationic surfactant and more preferably a pyridinium compound. For example, the compounds described in JP2006-113500A, JP2012-208397A, and the like can be used as the pyridinium compound.

Among these, the pyridinium compound is preferably a pyridinium compound represented by General Formula (1).

(1)

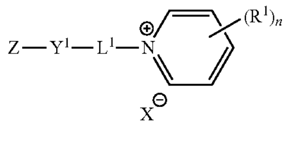

In the formula, $R^1$ represents an amino group or a substituted amino group having 1 to 20 carbon atoms. X represents an anion. $L^1$ represents a divalent linking group. $Y^1$ represents a divalent linking group containing a 5- or 6-membered ring. Z represents an alkyl group having 1 to 12 carbon atoms, an alkoxy group having 2 to 12 carbon atoms, or an alkoxycarbonyl group having 2 to 12 carbon atoms. n represents 0 or 1.

The substituted amino group represented by $R^1$ is represented by General Formula (2).

$$*\text{—}N(R^{11})(R^{12}) \qquad \text{General formula (2):}$$

In General Formula (2), $R^{11}$ and $R^{12}$ each independently represent a hydrogen atom or a substituent. However, at least one of $R^{11}$ or $R^{12}$ is a substituent, and a total number of carbon atoms in the substituted amino group represented by General Formula (2) is 1 to 20. * represents a bonding position.

The substituent represented by $R^{11}$ and $R^{12}$ is preferably an alkyl group, an alkenyl group, or an alkynyl group, each of which may have a substituent. $R^{11}$ and $R^{12}$ may be bonded to each other to form a ring. The ring contains a nitrogen atom specified in the formula and is preferably a 5-membered ring or 6-membered ring.

$R^{11}$ and $R^{12}$ are each independently preferably a hydrogen atom or an alkyl group having 1 to 6 carbon atoms and more preferably a hydrogen atom or an alkyl group having 1 to 3 carbon atoms.

The anion represented by X is not particularly limited, and examples thereof include a halogen ion (for example, a fluorine ion, a chlorine ion, a bromine ion, or an iodine ion), a sulfonate ion (for example, a methanesulfonate ion, a trifluoromethanesulfonate ion, a methylsulfate ion, a vinylsulfonate ion, an allylsulfonate ion, a p-toluenesulfonate ion, a p-chlorobenzenesulfonate ion, a p-vinylbenzenesulfonate ion, a 1,3-benzenedisulfonate ion, a 1,5-naphthalenedisulfonate ion, or a 2,6-naphthalenedisulfonate ion), a sulfate ion, a carbonate ion, a nitrate ion, a thiocyanate ion, a perchlorate ion, a tetrafluoroborate ion, a picrate ion, an acetate ion, a benzoate ion, a p-vinyl benzoate ion, a formate ion, a trifluoroacetate ion, a phosphate ion (for example, hexafluorophosphate ion), and a hydroxide ion. Of these, a halogen ion, a sulfonate ion, or a hydroxide ion is preferable.

The divalent linking group represented by $L^1$ is not particularly limited and may be, for example, a divalent linking group having 1 to 20 carbon atoms and consisting of one or more selected from the group consisting of an alkylene group, —O—, —S—, —CO—, —$SO_2$—, —NRa- (where Ra represents a hydrogen atom or an alkyl group having 1 to 5 carbon atoms), an alkenylene group, an alkynylene group, and an arylene group.

The divalent linking group represented by $L^1$ is preferably -AL- or —O-AL-. In addition, AL represents an alkylene group. Above all, the divalent linking group represented by $L^1$ is more preferably -AL- having 1 to 10 carbon atoms or —O-AL- having 1 to 10 carbon atoms, and still more preferably -AL- having 1 to 5 carbon atoms or —O-AL- having 1 to 5 carbon atoms.

The divalent linking group containing a 5- or 6-membered ring represented by $Y^1$ is not particularly limited. The 5- or 6-membered ring is preferably an aliphatic ring, an aromatic ring, or a heterocyclic ring. The 5-membered ring or 6-membered ring may be fused with another 5-membered ring or 6-membered ring.

Examples of the aliphatic ring include a cyclohexane ring, a cyclohexene ring, and a cyclohexadiene ring.

The aromatic ring is preferably a benzene ring.

The hetero atom contained in the heterocyclic ring is not particularly limited and is preferably a nitrogen atom, an oxygen atom, or a sulfur atom.

Examples of the heterocyclic ring include a furan ring, a thiophene ring, a pyrrole ring, a pyrroline ring, a pyrrolidine ring, an oxazole ring, an isoxazole ring, a thiazole ring, an isothiazole ring, an imidazole ring, an imidazoline ring, an imidazolidine ring, a pyrazole ring, a pyrazoline ring, a pyrazolidine ring, a triazole ring, a furazan ring, a tetrazole ring, a pyran ring, a dioxane ring, a dithiane ring, a thiin ring, a pyridine ring, a piperidine ring, an oxazine ring, a morpholine ring, a thiazine ring, a pyridazine ring, a pyrimidine ring, a pyrazine ring, a piperazine ring, and a triazine ring, among which a 6-membered heterocyclic ring is preferable.

In addition, the 5- or 6-membered ring in $Y^1$ may further have a substituent. Examples of the substituent include a halogen atom, cyano, an alkyl group having 1 to 12 carbon atoms, and an alkoxy group having 1 to 12 carbon atoms.

In addition, the divalent linking group containing a 5- or 6-membered ring represented by $Y^1$ may contain one or a combination of two or more selected from the group consisting of, for example, —O—, —S—, —CO—, —$SO_2$—, —NRa- (where Ra represents a hydrogen atom or an alkyl group having 1 to 5 carbon atoms), —CH═CH—, —CH═N—, —N═CH—, and —N═N—.

The alkyl group having 1 to 12 carbon atoms represented by Z is not particularly limited and is preferably an alkyl group having 6 to 12 carbon atoms.

The alkoxy group having 2 to 12 carbon atoms represented by Z is not particularly limited and is preferably an alkoxy group having 6 to 12 carbon atoms.

The alkoxycarbonyl group having 2 to 12 carbon atoms represented by Z is not particularly limited and is preferably an alkoxycarbonyl group having 6 to 12 carbon atoms.

The alkyl group having 1 to 12 carbon atoms, the alkoxy group having 2 to 12 carbon atoms, and the alkoxycarbonyl group having 2 to 12 carbon atoms, each of which is represented by Z, may further have a substituent. Examples of the substituent include a halogen atom (a fluorine atom, a chlorine atom, a bromine atom, or an iodine atom), a cyano group, and a nitro group.

The pyridinium compound represented by General Formula (1) is preferably a pyridinium compound represented by General Formula (3).

(3)

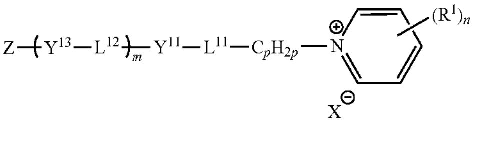

In General Formula (3), $R^1$, Z, X, and n have the same definition as $R^1$, Z, X, and n in General Formula (1), and suitable aspects thereof are also the same.

p represents an integer of 1 to 10, preferably 1 or 2. In addition, —$C_pH_{2p}$— in General Formula (3) means a chain-like alkylene group which may have a branched structure. —$C_pH_{2p}$— is preferably linear.

m represents 1 or 2. In a case where m is 2, a plurality of $L^{12}$'s and a plurality of $Y^{13}$'s may be the same as or different from each other.

$L^{11}$ is preferably a single bond, —O—, —O-AL-O—, —O-AL-O—CO—, —O-AL-CO—O—, —CO—O-AL-O—, —CO—O-AL-O—CO—, —CO—O-AL-CO—O—, —O—CO-AL-O—, —O—CO-AL-O—CO—, or —O—CO-AL-CO—O—, more preferably a single bond or —O—, and most preferably —O—. In addition, AL represents an alkylene group having 1 to 10 carbon atoms.

$L^{12}$ represents a single bond, —O—, —O—CO—, —CO—O—, —C≡C—, —CH═CH—, —CH═N—, —N═CH—, or —N═N—.

$Y^{11}$ and $Y^{13}$ each independently represent a 6-membered ring which may have a substituent, and examples thereof include the same as the 6-membered ring which may have a substituent represented by $Y^1$.

It is preferable to include an ionic surfactant (preferably a cationic surfactant) as the surfactant.

In the composition X, the content of the ionic surfactant is preferably 0.01 parts by mass or more and more preferably 0.3 parts by mass or more with respect to 100 parts by mass of the liquid crystal compound. The upper limit value thereof is, for example, 8.0 parts by mass or less.

The ionic surfactant can control the tilt angle of the liquid crystal compound at the substrate-side interface, in the composition layer formed in the step 1A.

In a case where the composition X includes, as the surfactant, an ionic surfactant having a predetermined content or more with respect to the content of the liquid crystal compound (more preferably, in a case where a fluorine-based surfactant described later is further included as the surfactant), it is easy to obtain a cholesteric liquid crystal layer having a high reflectance and a wide reflection band and capable of giving transmitted light having a high circular polarization degree with respect to an incidence ray from an oblique direction, which is shown in FIG. 13 and FIG. 14 described later.

In addition, the composition X preferably includes a fluorine-based surfactant.

In the composition X, the content of the fluorine-based surfactant is preferably 0.001 parts by mass or more and more preferably 0.01 parts by mass or more with respect to 100 parts by mass of the liquid crystal compound. The upper limit value thereof is, for example, preferably 2.0 parts by mass or less and more preferably 0.8 parts by mass or less. The fluorine-based surfactant can control the tilt angle of the liquid crystal compound on the surface of the composition layer opposite to the substrate, in the composition layer formed in the step 1A.

In addition, in a case where the composition X includes the ionic surfactant and the fluorine-based surfactant described above, the obtained cholesteric liquid crystal layer also has an advantage that the haze is small.

The content of the surfactant in the composition X (the total amount of surfactants in a case where a plurality of surfactants are included) is not particularly limited, but it is preferably 0.01% to 10% by mass, more preferably 0.01% to 5.0% by mass, and still more preferably 0.01% to 2.0% by mass with respect to the total mass of the liquid crystal compound.

«Solvent»

The composition X may include a solvent.

The solvent may be, for example, water or an organic solvent. Examples of the organic solvent include amides such as N,N-dimethylformamide; sulfoxides such as dimethylsulfoxide; heterocyclic compounds such as pyridine; hydrocarbons such as benzene and hexane; alkyl halides such as chloroform and dichloromethane; esters such as methyl acetate, butyl acetate, and propylene glycol monoethyl ether acetate; ketones such as acetone, methyl ethyl ketone, cyclohexanone, and cyclopentanone; ethers such as tetrahydrofuran and 1,2-dimethoxyethane; and 1,4-butanediol diacetate. These solvents may be used alone or in combination of two or more thereof.

«Other Additives»

The composition X may include one or two or more other additives such as an antioxidant, an ultraviolet absorber, a sensitizer, a stabilizer, a plasticizer, a chain transfer agent, a polymerization inhibitor, an antifoaming agent, a leveling agent, a thickener, a flame retardant, a surface-active substance, a dispersant, and a color material such as a dye and a pigment.

It is preferable that one or more of the compounds constituting the composition X are compounds having a plurality of polymerizable groups (polyfunctional compound). Further, the total content of the compounds having a plurality of polymerizable groups in the composition X is preferably 80% by mass or more with respect to the total solid content in the composition X. The solid content is a component that forms the cholesteric liquid crystal layer and does not include a solvent.

By making 80% by mass or more of the total solid content in the composition X a compound having a plurality of polymerizable groups, it is preferable in that the structure of the cholesteric liquid crystalline phase can be firmly fixed and durability can be imparted.

The compound having a plurality of polymerizable groups is a compound having two or more immobilizable groups in one molecule. In the present invention, the polyfunctional compound included in the composition X may or may not have liquid crystallinity.

(Procedure of Step 1A)

The step 1A preferably includes the following step 1A-1 and the following step 1A-2.

Step 1A-1: a step of bringing the composition X into contact with the substrate to form a coating film on the substrate Step 1A-2: a step of heating the coating film to form a composition layer satisfying the above condition 1, the above condition 2, or the above condition 3

«Process 1A-1: Coating Film Forming Step»

In the step 1A-1, the composition X described above is first applied onto a substrate. The application method is not particularly limited, and examples thereof include a wire bar coating method, an extrusion coating method, a direct gravure coating method, a reverse gravure coating method, and a die-coating method. Prior to application of the composition X, a known rubbing treatment may be applied to the substrate.

If necessary, a treatment for drying the coating film applied onto the substrate may be carried out after application of the composition X. By carrying out the drying treatment, the solvent can be removed from the coating film.

The film thickness of the coating film is not particularly limited, but is preferably 0.1 to 20 more preferably 0.2 to 15 and still more preferably 0.5 to 10 μm from the viewpoint of more excellent reflection anisotropy and haze of the cholesteric liquid crystal layer.

«Step 1A-2: Composition Layer Forming Step»

The liquid crystal phase transition temperature of the composition X is preferably in a range of 10 °C to 250 °C and more preferably in a range of 10 °C to 150 °C, from the viewpoint of manufacturing suitability.

As to preferred heating conditions, it is preferable to heat the composition layer at 40 °C to 100 °C. (preferably 60 °C to 100 °C) for 0.5 to 5 minutes (preferably 0.5 to 2 minutes).

In a case of heating the composition layer, it is preferable not to heat the composition layer to a temperature at which the liquid crystal compound becomes an isotropic phase (Iso). In a case where the composition layer is heated above the temperature at which the liquid crystal compound becomes an isotropic phase, the number of defects in the tilt-aligned liquid crystal phase or the hybrid-aligned liquid crystal phase increases, which is not preferable.

A composition layer satisfying the above condition 1, the above condition 2, or the above condition 3 can be obtained by the step 1A-2.

In order to make the liquid crystal compound tilt-aligned (see FIG. 1), hybrid-aligned, or vertically aligned, it is effective to give a pretilt angle to the interface, and specifically, the following method can be mentioned.

(1) A substrate on which a rubbing alignment film having a pretilt angle or an alignment film containing a uniaxially aligned or hybrid-aligned liquid crystal compound is arranged on the surface is used.

(2) A surfactant capable of controlling the alignment of the liquid crystal compound by being unevenly distributed in the composition X at the air interface and/or the substrate interface (for example, the above-mentioned ionic surfactant and the above-mentioned fluorine-based surfactant) is added.

(3) A liquid crystalline compound having a large pretilt angle at the interface is added to the composition X as the liquid crystal compound.

<Step 2A>

The step 2A is a step in which the composition layer obtained in the step 1 is subjected to a light irradiation treatment to change the helical twisting power of the chiral agent X, and the liquid crystal compound in the composition layer is cholesterically aligned to form a cholesteric liquid crystal layer.

By dividing a light irradiation region into a plurality of domains and adjusting a light irradiation amount for each domain, a region having a different helical pitch (a region having a different selective reflection wavelength) can be formed.

The irradiation intensity of the light irradiation in the step 2A is not particularly limited and can be appropriately determined based on the helical twisting power of the chiral agent X. In general, the irradiation intensity of light irradiation in the step 2A is preferably about 0.1 to 200 $mW/cm^2$. In addition, the time for light irradiation is not particularly limited, but may be appropriately determined from the viewpoint of both sufficient strength and productivity of the layer to be obtained.

In addition, the temperature of the composition layer at the time of light irradiation is, for example, 0 °C to 100 °C, and preferably 10 °C to 60 °C.

The light used for the light irradiation is not particularly limited as long as it is an actinic ray or radiation that changes the helical twisting power of the chiral agent X, which refers to, for example, an emission line spectrum of a mercury lamp, far ultraviolet rays represented by an excimer laser, extreme ultraviolet rays (EUV light), X-rays, ultraviolet rays, and electron beams (EB). Of these, ultraviolet rays are preferable.

Here, in the method for producing a cholesteric liquid crystal layer according to the embodiment of the present invention, in a case where the composition layer is exposed to wind, the surface state of the cholesteric liquid crystal layer to be formed may be uneven. Considering this point, in the method for producing a cholesteric liquid crystal layer according to the embodiment of the present invention, it is preferable that the wind speed of the environment to which the composition layer is exposed is low in all steps of step 1A and step 2A. Specifically, in the method for producing a cholesteric liquid crystal layer according to the embodiment of the present invention, the wind speed of the environment to which the composition layer is exposed is preferably 1 m/s or less in all steps of step 1A and step 2A.

<Curing Treatment>

In addition, in a case where the liquid crystal compound has a polymerizable group, it is preferable to carry out a curing treatment on the composition layer. Examples of the procedure for carrying out the curing treatment on the composition layer include the following (1) and (2).

There is further included a step 3 of (1) carrying out a curing treatment for fixing a cholesteric alignment state during the step 2 to form a cholesteric liquid crystal layer in which the cholesteric alignment state is fixed (that is, the curing treatment is carried out simultaneously with the step 2), or (2) carrying out a curing treatment for fixing a cholesteric alignment state after the step 2 to form a cholesteric liquid crystal layer in which the cholesteric alignment state is fixed.

That is, the cholesteric liquid crystal layer obtained by carrying out the curing treatment corresponds to a layer formed by fixing the cholesteric liquid crystalline phase.

Here, as the state where the cholesteric liquid crystalline phase is "fixed", the most typical and preferred aspect is a state in which the alignment of the liquid crystal compound brought into a cholesteric liquid crystalline phase is retained. The state where the liquid crystalline phase is "fixed" is not limited thereto, and specifically, it refers to a state in which, in a temperature range of usually 0 °C to 50 °C and in a temperature range of −30 °C to 70 °C under more severe conditions, this layer has no fluidity and can keep a fixed alignment state stably without causing changes in alignment state due to external field or external force. In the present invention, as will be described later, it is preferable to fix the alignment state of a cholesteric liquid crystalline phase by a curing reaction proceeding upon irradiation with ultraviolet rays.

In the layer obtained by fixing a cholesteric liquid crystalline phase, it is sufficient that the optical properties of the cholesteric liquid crystalline phase are retained in the layer, and finally the composition in the layer no longer needs to show liquid crystallinity.

The method of the curing treatment is not particularly limited, and examples thereof include a photo curing treatment and a thermal curing treatment. Among them, a light irradiation treatment is preferable, and an ultraviolet irradiation treatment is more preferable. In addition, as described above, the liquid crystal compound is preferably a liquid crystal compound having a polymerizable group. In a case where the liquid crystal compound has a polymerizable group, the curing treatment is preferably a polymerization reaction upon irradiation with light (particularly ultraviolet irradiation), and more preferably a radical polymerization reaction upon irradiation with light (particularly ultraviolet irradiation).

For ultraviolet irradiation, a light source such as an ultraviolet lamp is used.

The irradiation energy amount of ultraviolet rays is not particularly limited, but it is generally preferably about 100 to 800 $mJ/cm^2$. The irradiation time of the ultraviolet rays is not particularly limited, but it may be determined as appropriate from the viewpoint of both sufficient strength and productivity of the obtained layer.

[Method for Producing Cholesteric Liquid Crystal Layer Using Liquid Crystal Composition Including Chiral Agent Y]

Hereinafter, a method for producing a cholesteric liquid crystal layer using a liquid crystal composition including a chiral agent Y (hereinafter, also referred to as "production method Y") will be described.

The production method Y includes at least the following step 1B and step 2B.

Step 1B: a step of forming a composition layer satisfying the following condition 1, the following condition 2, or the following condition 3 on a substrate, using a liquid crystal composition including a chiral agent Y and a liquid crystal compound Step 2B: a step of subjecting the composition layer to a cooling treatment or a heating treatment to result in cholesteric alignment of the liquid crystal compound in the composition layer, thereby forming a cholesteric liquid crystal layer Condition 1: at least a part of the liquid crystal compound in the composition layer is tilt-aligned with respect to a substrate surface Condition 2: the liquid crystal compound is aligned such that a tilt angle of the liquid crystal compound in the composition layer continuously changes along a thickness direction;

Condition 3: at least a part of the liquid crystal compound in the composition layer is vertically aligned with respect to the substrate surface.

In addition, in a case where the liquid crystal compound has a polymerizable group, in the production method Y, it is preferable to carry out a curing treatment on the composition layer, as will be described later.

Hereinafter, the materials used in each step and the procedure of each step will be described in detail.

<Step 1B>

The step 1B is a step of forming a composition layer satisfying the above condition 1, the above condition 2, or the above condition 3 on a substrate, using a liquid crystal composition including a chiral agent Y and a liquid crystal compound (hereinafter, also referred to as "composition Y").

The step 1B has the same step procedure as that of the step 1A described above except that the composition Y is used in place of the composition X, and thus the description thereof will be omitted.

(Composition Y)

The composition Y includes a liquid crystal compound and a chiral agent Y having a helical twisting power changed depending on a change of temperature. Hereinafter, each component will be described.

As described above, the absolute value of the weighted average helical twisting power of the chiral agent in the composition layer is, for example, preferably 0.0 to 1.9 $\mu m^{-1}$, more preferably 0.0 to 1.5 $\mu m^{-1}$, still more preferably 0.0 to 1.0 $\mu m^{-1}$, particularly preferably 0.0 to 0.5 $\mu m^{-1}$, and most preferably zero, from the viewpoint of easy formation of the composition layer at the temperature $T_{11}$ at which an alignment treatment of a liquid crystal compound for forming a composition layer satisfying the above condition 1, the above condition 2, or the above condition 3 in the step 1B is carried out. Therefore, in a case where the chiral agent Y has a helical twisting power exceeding the above-mentioned predetermined range at the temperature $T_{11}$, it is preferable that the composition Y includes a chiral agent that induces a helix in a direction opposite to that of the chiral agent Y (hereinafter, also referred to as "chiral agent YA") at the temperature $T_{11}$, and the helical twisting power of the chiral agent Y is offset to almost zero in the step 1B (that is, the weighted average helical twisting power of the chiral agent in the composition layer is set to the above predetermined range). In addition, it is preferable that the chiral agent YA does not change the helical twisting power depending on a change of temperature.

In addition, in a case where the liquid crystal composition includes a plurality of chiral agents Y as the chiral agent and then in a case where the weighted average helical twisting power of the plurality of chiral agents Y is a helical twisting power outside the above-mentioned predetermined range at the temperature $T_{11}$, "another chiral agent YA that induces a helix in a direction opposite to that of the chiral agent Y" is intended to mean a chiral agent that induces a helix in a direction opposite to that of the weighted average helical twisting power of the plurality of chiral agents Y.

In a case where the chiral agent Y alone has no helical twisting power at the temperature $T_{11}$ and has a property of increasing a helical twisting power depending on a change of temperature, the chiral agent YA may not be used in combination therewith.

Hereinafter, various materials included in the composition Y will be described. Of the materials included in the composition Y, the components other than the chiral agent are the same as the materials included in the composition X, and thus the description thereof will be omitted.

«Chiral Agent Y Having Helical Twisting Power Changed Depending on Cooling or Heating»

The chiral agent Y is a compound that induces a helix of a liquid crystal compound, and is not particularly limited as long as it is a chiral agent having a helical twisting power increased depending on cooling or heating. The term "cooling or heating" as used herein means a cooling treatment or heating treatment which is carried out in the step 2B. In addition, the upper limit of the cooling or heating temperature is usually about ±150 °C. (in other words, a chiral agent having a helical twisting power increased depending on cooling or heating within ±150 °C is preferable). Above all, a chiral agent having a helical twisting power increased depending on cooling is preferable.

The chiral agent Y may be liquid crystalline or non-liquid crystalline. The chiral agent can be selected from various known chiral agents (for example, chiral agents described in Liquid Crystal Device Handbook, Chap. 3, Item 4-3, Chiral Agents for Twisted Nematic (TN) and Super Twisted Nematic (STN), p. 199, edited by the $142^{nd}$ Committee of the Japan Society for the Promotion of Science, 1989). The chiral agent Y generally contains an asymmetric carbon atom. However, an axial asymmetric compound or planar asymmetric compound not containing an asymmetric carbon atom can also be used as the chiral agent Y. Examples of the axial asymmetric compound or planar asymmetric compound include binaphthyl, helicene, paracyclophane, and derivatives thereof. The chiral agent Y may have a polymerizable group.

Above all, from the viewpoint that the difference in the helical twisting power after a change of temperature is large, the chiral agent Y is preferably an isosorbide-based optically active compound, an isomannide-based optically active compound, or a binaphthol-based optically active compound, and more preferably a binaphthol-based optically active compound.

The total content of the chiral agent in the composition Y (the total content of all chiral agents in the composition Y) is preferably 2.0% by mass or more and more preferably 3.0% by mass or more with respect to the total mass of the liquid crystal compound. In addition, from the viewpoint of suppressing the haze of the cholesteric liquid crystal layer, the upper limit of the total content of the chiral agent in the composition Y is preferably 15.0% by mass or less and more preferably 12.0% by mass or less with respect to the total mass of the liquid crystal compound.

A smaller amount of the chiral agent Y used is preferred because it tends not to affect the liquid crystallinity. Therefore, the chiral agent Y is preferably a compound having a strong twisting power in order that the compound could achieve twisted alignment of a desired helical pitch even in a case where the amount thereof used is small.

«Chiral Agent YA»

The chiral agent YA is preferably a chiral agent which is a compound that induces a helix of a liquid crystal compound and has a helical twisting power (HTP) which is not changed depending on a change of temperature.

In addition, the chiral agent YA may be liquid crystalline or non-liquid crystalline. The chiral agent YA generally contains an asymmetric carbon atom. However, an axial asymmetric compound or planar asymmetric compound not containing an asymmetric carbon atom can also be used as the chiral agent YA. The chiral agent YA may have a polymerizable group.

A known chiral agent can be used as the chiral agent YA.

In a case where the liquid crystal composition includes one type of the chiral agent Y alone and the chiral agent Y has a helical twisting power exceeding a predetermined range (for example, 0.0 to 1.9 $\mu m^{-1}$) at the temperature $T_{11}$, the chiral agent YA is preferably a chiral agent that induces a helix in a direction opposite to that of the above-mentioned chiral agent Y. That is, for example, in a case where the helix induced by the chiral agent Y is right-handed, the helix induced by the chiral agent YA is left-handed.

In addition, in a case where the liquid crystal composition includes a plurality of chiral agents Y as the chiral agent and then the weighted average helical twisting power of the plurality of chiral agents Y exceeds the above-mentioned predetermined range at the temperature $T_{11}$, the chiral agent YA is preferably a chiral agent that induces a helix in a direction opposite to that of the above-mentioned weighted average helical twisting power.

<Step 2B>

The step 2B is a step in which the composition layer obtained in the step 1 is subjected to a cooling treatment or a heating treatment to change the helical twisting power of the chiral agent Y, and the liquid crystal compound in the composition layer is cholesterically aligned to form a cholesteric liquid crystal layer. Above all, it is preferable to cool the composition layer in the present step.

In a case where the composition layer is cooled, it is preferable to cool the composition layer such that the temperature of the composition layer is lowered by 30 °C or more, from the viewpoint that the reflection anisotropy of the cholesteric liquid crystal layer is more excellent. Above all, from the viewpoint that the above effect is more excellent, it is preferable to cool the composition layer such that the temperature of the composition layer is lowered by 40 °C or more, and it is more preferable to cool the composition layer such that the temperature of the composition layer is lowered by 50 °C or more. The upper limit value of the reduced temperature range of the cooling treatment is not particularly limited, but is usually about 150 °C.

In addition, in other words, the cooling treatment is intended to cool the composition layer such that the temperature of the composition layer becomes T-30 °C or lower, in a case where the temperature of the composition layer satisfying the above condition 1, the above condition 2, or the above condition 3 obtained in the step 1 before cooling of the composition layer is T°C. (that is, $T_{12} \leq T_{11} - 30$ °C in a case of an aspect shown in FIG. 10).

The cooling method is not particularly limited and may be, for example, a method in which a substrate on which the composition layer is arranged is allowed to stand in an atmosphere of a predetermined temperature.

Although there is no limitation on the cooling rate in the cooling treatment, it is preferable to set the cooling rate to a certain rate from the viewpoint that the reflection anisotropy of the cholesteric liquid crystal layer is more excellent.

Specifically, the maximum value of the cooling rate in the cooling treatment is preferably 1 °C or more per second, more preferably 2 °C or more per second, and still more preferably 3 °C or more per second. The upper limit of the cooling rate is not particularly limited and is often 10 °C or less per second.

Here, in the method for producing a cholesteric liquid crystal layer according to the embodiment of the present invention, in a case where the composition layer is exposed to wind, the surface state of the cholesteric liquid crystal layer to be formed may be uneven. Considering this point, in the method for producing a cholesteric liquid crystal layer according to the embodiment of the present invention, it is preferable that the wind speed of the environment to which the composition layer is exposed is low in all steps of step 1B and step 2B. Specifically, in the method for producing a cholesteric liquid crystal layer according to the embodiment of the present invention, the wind speed of the environment to which the composition layer is exposed is preferably 1 m/s or less in all steps of step 1B and step 2B.

In a case where the composition layer is heated, the upper limit value of the increased temperature range of the heating treatment is not particularly limited, but is usually about 150 °C.

<Curing Treatment>

In addition, in a case where the liquid crystal compound has a polymerizable group, it is preferable to carry out a curing treatment on the composition layer. The procedure for carrying out the curing treatment on the composition layer is the same as in the method described in the production method X, and a suitable aspect thereof is also the same.

[Cholesteric Liquid Crystal Layer]

Hereinafter, the cholesteric liquid crystal layer obtained by the production method of the present invention will be described. The cholesteric liquid crystal layer obtained by the production method of the present invention is preferably used as a reflective layer.

The cholesteric liquid crystal layer obtained by the production method of the present invention is a layer in which the reflection surface of the cholesteric liquid crystalline phase (cholesteric liquid crystal structure) is not parallel to the substrate surface. In a case where a cross section of such a cholesteric liquid crystal layer is observed by SEM, a striped pattern is observed in which an arrangement direction in which bright portions and dark portions are alternately arranged is not parallel to the substrate surface.

In addition, the cholesteric liquid crystal layer is preferably a layer formed by fixing a cholesteric liquid crystalline phase.

In addition, the cholesteric liquid crystal layer obtained by the production method of the present invention is adjusted such that the tilt angle of the liquid crystal compound present on the substrate-side surface becomes large, which enables to obtain a cholesteric liquid crystal layer having a high reflectance and a wide reflection band and capable of giving transmitted light having a high circular polarization degree with respect to an incidence ray from an oblique direction.

The method of increasing the tilt angle of the liquid crystal compound present on the substrate-side surface may be, for example, a method of adding a predetermined amount of an ionic surfactant to the liquid crystal composition in the production method of the present invention, among which a method of adding a predetermined amount of an ionic surfactant and a fluorine-based surfactant to the liquid crystal composition is preferable. The ionic surfactant and the fluorine-based surfactant are as described above.

In addition, examples of the method of increasing the tilt angle of the liquid crystal compound present on the substrate-side surface include a method of using a liquid crystal compound exhibiting a high pretilt angle on the substrate interface side and a method of using a substrate on the surface of which a rubbing alignment film having a pretilt angle or an alignment film containing a uniaxially aligned or hybrid-aligned liquid crystal compound is arranged, in addition to the above-mentioned methods.

That is, according to one aspect of the production method of the present invention, it is possible to form a cholesteric liquid crystal layer having a high reflectance and a wide reflection band and capable of giving transmitted light having a high circular polarization degree with respect to an incidence ray from an oblique direction. According to the above configuration, for example, in a case where the cholesteric liquid crystal layer is applied to a screen that projects circularly polarized light, it is possible to further reduce the image leakage to the back surface of the screen and further improve the brightness of the image.

Hereinafter, an embodiment of the cholesteric liquid crystal layer having a high reflectance and a wide reflection band and capable of giving transmitted light having a high circular polarization degree with respect to an incidence ray from an oblique direction will be described with reference to FIG. 13 and FIG. 14.

FIG. 13 shows a schematic cross-sectional diagram conceptually showing the alignment state of the liquid crystal compound in the cholesteric liquid crystal layer.

In a cholesteric liquid crystal layer 102 shown in FIG. 13, a pair of surfaces (103, 104) of the cholesteric liquid crystal layer 102 parallel to the substrate 10 may be referred to as main planes.

In a vertical cross section of the main plane of the cholesteric liquid crystal layer 102 shown in FIG. 13, the liquid crystal compound 14 is aligned with its molecular axis 16 tilted with respect to the substrate surface 10*a*.

As shown in FIG. 13, in the cholesteric liquid crystal layer 102, a helical axis $C_2$ derived from the cholesteric liquid crystalline phase is tilted with respect to the substrate surface 10*a*, since the liquid crystal compound 14 has the above-mentioned alignment. In addition, a reflection surface $T_2$ of the cholesteric liquid crystal layer 102 is tilted with respect to the substrate surface 10*a*, and therefore in a case where the cross section of the cholesteric liquid crystal layer 102 shown in FIG. 13 is observed by SEM, a striped pattern is observed in which an arrangement direction in which bright portions and dark portions are alternately arranged is tilted with respect to the substrate surface 10*a*. The angle formed by the arrangement direction and the substrate surface 10*a* is, for example, 86° or less and more preferably 80° or less. The lower limit value thereof is not particularly limited and is, for example, 1° or more.

In the cholesteric liquid crystal layer 102, the helical axis direction $C_2$ derived from the cholesteric liquid crystalline phase is not parallel to the above-mentioned arrangement direction in which the bright portions and the dark portions are alternately arranged, which is observed by SEM, and is not perpendicular to the reflection surface $T_2$.

The term "not parallel" as used herein is intended to mean that the angle formed by the helical axis direction $C_2$ and the above-mentioned arrangement direction is not 0°. The angle formed by the helical axis direction $C_2$ derived from the cholesteric liquid crystalline phase and the above-mentioned arrangement direction is preferably 3° or more and more preferably 18° or more. In addition, the term "not perpendicular" as used herein is intended to mean that the angle formed by the helical axis direction $C_2$ and the reflection surface $T_2$ is not 90°, in which it is preferably 87° or less, more preferably 80° or less, and still more preferably 72° or less.

In general, the helical axis direction $C_2$ derived from the cholesteric liquid crystalline phase is parallel to the incident direction of light in a case where the observed phase difference is smallest in a case where the light is applied from the main plane 103 of the cholesteric liquid crystal layer 102.

That is, in the cholesteric liquid crystal layer 102, the incident direction of light in a case where the observed phase difference is smallest in a case where the light is applied from the main plane 103 is not parallel to the above-mentioned arrangement direction. In addition, the incident direction of light in a case where the observed phase difference is smallest is not perpendicular to the main plane 103. The term "not perpendicular" as used herein is intended to mean that the angle formed by the above-mentioned incident direction and the main plane 103 is not 90°. The angle formed by the above-mentioned incident direction and the main plane 103 is preferably 83° or less and more preferably 60° or less.

In the cholesteric liquid crystal layer 102, the molecular axis 16 derived from the liquid crystal compound 14 is not parallel to the reflection surface $T_2$ (the angle formed by the molecular axis 16 and the reflection surface $T_2$ is not 0°).

As a result, in a case where light is incident on the main plane 103 from an oblique direction such that the reflected light is reflected in a direction normal to the main plane 103 of the cholesteric liquid crystal layer 102 shown in FIG. 13 (see FIG. 13), the reflected light reflected by the reflection surface $T_2$ has a high reflectance and a wide reflection band. In addition, the circular polarization degree of the transmitted light transmitted through the main plane 103 becomes higher. That is, the light incident from an oblique direction and the helical axis $C_2$ are more likely to be parallel to each other, and as a result, the above-mentioned effect is obtained. In particular, from the viewpoint that the above-mentioned effect is more excellent, the angle formed by the incident direction in which the phase difference is smallest in a case where the light is incident on the main plane 103 of the cholesteric liquid crystal layer 102, and the arrangement direction in which the bright portions and the dark portions are alternately arranged, which is observed by SEM, is preferably 3° or more and more preferably 18° or more. The upper limit value of such an angle is not particularly limited and is, for example, 90°.

The angle formed by the helical axis $C_2$ and the reflection surface $T_2$ can be controlled by the tilt angle of the liquid crystal compound 14. The cholesteric liquid crystal layer 102 shown in FIG. 13 is an embodiment in which the molecular axis 16 derived from the liquid crystal compound 14 is tilted with respect to the reflection surface $T_2$, and the cholesteric liquid crystal layer 202 shown in FIG. 14 is an embodiment in which the reflection surface $T_2$ is tilted with respect to the molecular axis 16 derived from the liquid crystal compound 14.

In a case of reflecting the light in a front direction or in a narrower angle direction than that of the incidence ray, it is preferable to tilt the molecular axis 16 derived from the liquid crystal compound 14 with respect to the reflection surface $T_2$ as shown in FIG. 13. On the other hand, in a case of reflecting the light in a wider angle direction than that of the incidence ray, it is preferable to tilt the reflection surface $T_2$ with respect to the molecular axis 16 derived from the liquid crystal compound 14 as shown in FIG. 14. It should be noted that the case of reflecting the light in a narrower angle direction than that of the incidence ray is intended to mean a case where the light is reflected at an angle smaller than $\theta_A$ in a case where the angle formed by the normal direction of the main plane of the cholesteric liquid crystal layer and the incident direction of light is $\theta_A$. That is, the case of reflecting the light in a narrower angle direction than that of the incidence ray is intended to mean a case in which the reflection direction of light is closer to the normal direction of the main plane of the cholesteric liquid crystal layer than to the incidence direction of light. In addition, the case of reflecting the light in a wider angle direction than that of the incidence ray is intended to mean a case of reflecting the light at an angle larger than $\theta_A$. That is, the case of reflecting the light in a wider angle direction than that of the incidence ray is intended to mean a case in which the reflection direction of light is more distant from the incidence direction of light in the normal direction of the main plane of the cholesteric liquid crystal layer.

That is, according to one aspect of the production method of the present invention, for example, it is possible to optionally set the helical axis of the cholesteric liquid crystal layer according to the incidence angle of light obliquely incident on the main plane of the cholesteric liquid crystal layer such that the reflected light is reflected in a direction normal to the main plane (see FIG. 13). The angle formed by the incidence angle of light and the helical axis is preferably 0 to 33° and more preferably 0 to 10°.

On the other hand, in a case of the cholesteric liquid crystal layer 32 shown in FIG. 2, the molecular axis 16 derived from the liquid crystal compound 14 is parallel to the reflection surface $T_1$. In addition, the helical axis $C_1$ derived from the cholesteric liquid crystalline phase is perpendicular to the reflection surface $T_1$. Therefore, in a case where light is incident on the main plane 33 from an oblique direction such that the reflected light is reflected in a direction normal to the main plane of the cholesteric liquid crystal layer 32 shown in FIG. 2 (see FIG. 2), upon comparing the cholesteric liquid crystal layer 32 with the cholesteric liquid crystal layer 102, since the angle formed by the incident direction of light incident from an oblique direction and the helical axis $C_1$ is large, the reflected light reflected by the reflection surface $T_1$ and the transmitted light transmitted through the main plane 33 are more affected by the phase difference caused by the liquid crystal compound 14 in the cholesteric liquid crystal layer 32.

The cholesteric liquid crystal layer is a layer showing selective reflection properties with respect to light in a predetermined wavelength range. The cholesteric liquid crystal layer functions as a circularly polarized selective reflective layer that selectively reflects either the dextrorotatory circularly polarized light or the levorotatory circularly polarized light in the selective reflection wavelength range and transmits the other sense circularly polarized light. A film including one or two or more cholesteric liquid crystal layers can be used for various purposes. In a film including two or more layers of a cholesteric liquid crystal layer, the senses of circularly polarized light reflected by the cholesteric liquid crystal layers may be the same or opposite to each other depending on the application. In addition, the center wavelengths of selective reflection of the cholesteric liquid crystal layers, which will be described later, may be the same as or different from each other depending on the application.

In the present specification, the term "sense" for circularly polarized light means dextrorotatory circularly polarized light or levorotatory circularly polarized light. The sense of circularly polarized light is defined such that, in a case where light is viewed as it proceeds toward an observer and in a case where the distal end of the electric field vector rotates clockwise as time increases, the sense is dextrorotatory circularly polarized light, and in a case where it rotates counterclockwise, the sense is levorotatory circularly polarized light. In the present specification, the term "sense" may be used for the twisted direction of the helix of the cholesteric liquid crystal. Selective reflection by the cholesteric liquid crystal reflects dextrorotatory circularly polarized light and transmits levorotatory circularly polarized light in a case where the twisted direction (sense) of the helix of the cholesteric liquid crystal is right-handed, whereas it reflects levorotatory circularly polarized light and transmits dextrorotatory circularly polarized light in a case where the sense is left-handed.

For example, a film including a cholesteric liquid crystal layer exhibiting selective reflection properties in the visible light wavelength range (wavelength of 400 to 750 nm) can be used as a screen for projected image display and a half mirror. In addition, by controlling the reflection wavelength band, such a film can be used as a filter that improves the color purity of display light of a color filter or a display (for example, see JP2003-294948A).

In addition, the cholesteric liquid crystal layer can be used for various purposes such as a polarizing element, a reflective film, an anti-reflection film, a viewing angle compensating film, holography, and an alignment film, which are constituent elements of an optical element.

Hereinafter, the application as a projected image display member which is a particularly preferred application will be described.

By the above-mentioned function of the cholesteric liquid crystal layer, a projected image can be formed by reflecting circularly polarized light of either sense at the wavelength showing selective reflection among the projected light. The projected image may be visually recognized as such by being displayed on the surface of the projected image display member or may be a virtual image which appears to float above the projected image display member as viewed from an observer.

The center wavelength λ of the selective reflection depends on the pitch P of the helical structure (=the period of the helix) in a cholesteric liquid crystalline phase and follows the relationship of the average refractive index n of the cholesteric liquid crystal layer and $\lambda = n \times P$. Here, the center wavelength λ of the selective reflection of the cholesteric liquid crystal layer means a wavelength at the center position of the reflection peak of a circularly polarized reflection spectrum measured from the normal direction of the cholesteric liquid crystal layer. As can be seen from the above Expression, the center wavelength of the selective reflection can be adjusted by adjusting the pitch of the helical structure. Since the pitch of the cholesteric liquid crystalline phase depends on the type of the chiral agent or the addition concentration thereof, a desired pitch can be obtained by adjusting these factors. As a method for measuring sense or pitch of helix, methods described in "Easy Steps in Liquid Crystal Chemistry Experiment" p 46, edited by The Japanese Liquid Crystal Society, Sigma Publishing, published in 2007, and "Liquid Crystal Handbook" p 196, Editorial Committee of Liquid Crystal Handbook, Maruzen can be used.

In addition, a projected image display member capable of displaying full color projected images can be produced by producing and laminating cholesteric liquid crystal layers having an apparent center wavelength of the selective reflection in the red light wavelength range, the green light wavelength range, and the blue light wavelength range, respectively.

By adjusting the center wavelength of the selective reflection of each cholesteric liquid crystal layer according to the emission wavelength range of the light source used for projection and the mode of use of the projected image display member, a clear projected image can be displayed with high efficiency of light utilization. In particular, by adjusting the center wavelengths of the selective reflection of the cholesteric liquid crystal layer respectively according to the light emission wavelength range of the light source used for projection or the like, a clear color projected image can be displayed with high efficiency of light utilization.

In addition, for example, in a case where the projected image display member is configured to be transmissive to light in the visible light region, a half mirror that can be used as a combiner for a head-up display can be obtained. The projected image display half mirror can display the image projected from the projector so as to be visible, and in a case where the projected image display half mirror is observed from the same surface side where the image is displayed, the information or scenery on the opposite surface side can be observed at the same time.

[Liquid Crystal Composition]

The present invention also relates to a liquid crystal composition.

The liquid crystal composition according to the embodiment of the present invention is a liquid crystal composition including a liquid crystal compound, and two or more chiral agents, in which at least one of the chiral agents is any chiral agent selected from the group consisting of a chiral agent having a helical twisting power changed depending on irradiation with light and a chiral agent having a helical twisting power changed depending on a change of temperature, an absolute value of a weighted average helical twisting power of the chiral agent is 0.0 to 1.5 $\mu m^{-1}$, and the absolute value of the weighted average helical twisting power is 10.0 $\mu m^{-1}$ or more in a case where a light irradiation treatment, a cooling treatment, or a heating treatment is carried out on the composition layer formed from the liquid crystal composition.

Examples of the liquid crystal composition include the composition X and the composition Y described above.

The above-mentioned chiral agent X corresponds to the "chiral agent having a helical twisting power changed depending on irradiation with light" in the above-mentioned liquid crystal composition.

In addition, the above-mentioned chiral agent Y corresponds to the "chiral agent having a helical twisting power changed depending on a change of temperature" in the above-mentioned liquid crystal composition.

In addition, as described above, the liquid crystal composition preferably includes a predetermined content or more of an ionic surfactant (preferably a cationic surfactant) with respect to the content of the liquid crystal compound, and more preferably includes a predetermined content or more of an ionic surfactant (preferably a cationic surfactant) and a fluorine-based surfactant with respect to the content of the liquid crystal compound.

<Uses>

The liquid crystal composition can be applied to various uses. For example, an optically anisotropic body or a reflective layer can be formed using the liquid crystal composition. In addition, for example, in a case where the liquid crystal composition includes a liquid crystal compound having a polymerizable group, a cured product is obtained by subjecting the composition layer including the cholesterically aligned liquid crystal compound to a curing treatment (light irradiation treatment or heat treatment), and the cured product can be suitably applied to an optically anisotropic body or a reflective layer.

In addition, the optically anisotropic body is intended to refer to a substance which has optical anisotropy.

In addition, the reflective layer is as described above.

EXAMPLES

Hereinafter, the present invention will be described in more detail with reference to Examples. The materials, the used amount, the ratio, the contents of a treatment, and the procedures of a treatment described in Examples below may be suitably modified without departing from the spirit of the present invention. Accordingly, the scope of the present invention should not be limitatively interpreted by Examples described below.

[Various Components]

Hereinafter, first, various components used in Examples and Comparative Examples will be described.

<Surfactant (Ionic Surfactant)>

(Compound AA-1)

The compound AA-1 used was the compound AA-1 described in JP 2012-208397A.

AA-1

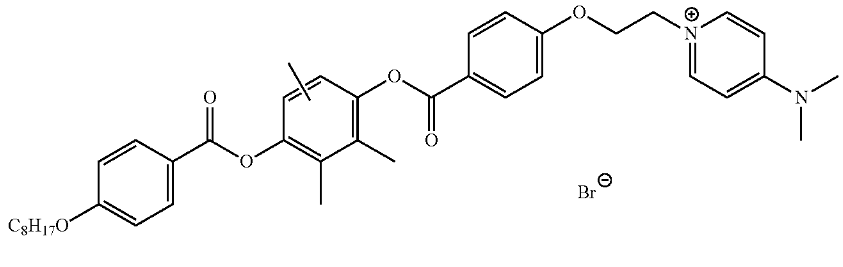

<Surfactant (Fluorine-Based Surfactant)>

The following compound B-1 to compound B-3 were used as the fluorine-based surfactant.

The compound B-1 and compound B-2 used were synthesized according to the following synthetic procedure.

(Synthesis of Compound B-1)

The compound B-1 was obtained by polymerizing 2.5 g of FAAC-6 (manufactured by Unimatec Co., Ltd.) and 2.5 g of butyl acrylate (manufactured by Wako Pure Chemical Industries, Ltd.) by a conventional radical polymerization method.

(Synthesis of Compound B-2)

The compound B-2 was obtained by polymerizing 2.5 g of FAAC-6 (manufactured by Unimatec Co., Ltd.) and 2.5 g of acrylic acid (manufactured by Wako Pure Chemical Industries, Ltd.) by a conventional radical polymerization method.

(Compound B-3)

The surfactant B-3 is a compound described in JP5774518B and has the following structure.

B-3

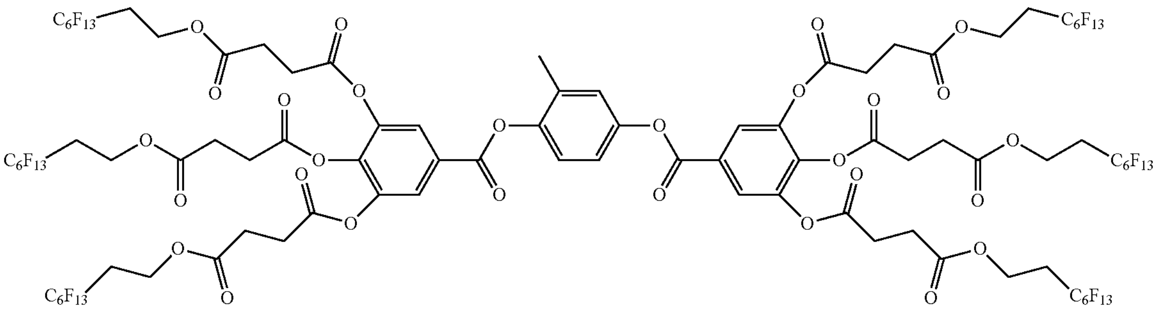

<Chiral Agent A>

<Synthesis of Compound CD-1>

The compound CD-1 was synthesized by a general method according to the following synthetic procedure.

The compound CD-1 is a chiral agent whose helical direction is left-handed and whose helical twisting power is not changed depending on a change of temperature or irradiation with light.

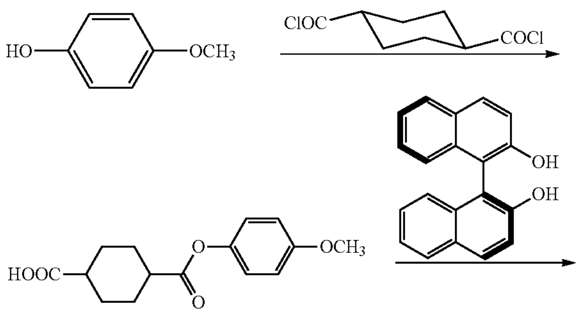

-continued

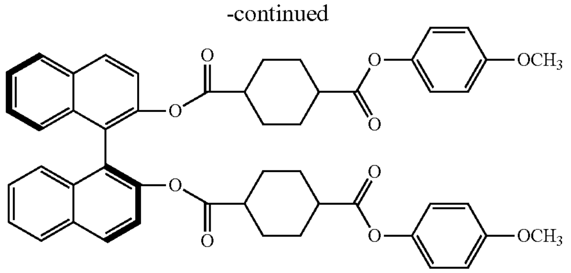

CD-1

(Synthesis of Compound CD-2)

The following compound CD-2 used was synthesized according to JP2002-338575A.

The compound CD-2 is a chiral agent whose helical direction is right-handed and whose helical twisting power is changed depending on irradiation with light (which corresponds to the chiral agent X).

CD-2

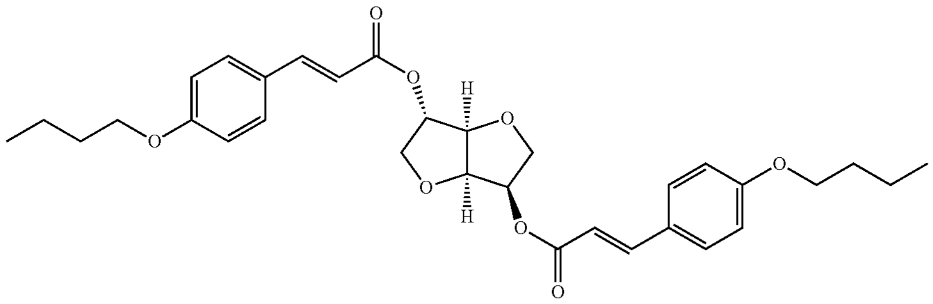

(Synthesis of Compound CD-3)

The compound CD-3 was synthesized according to the following synthetic procedure.

The compound CD-3 is a chiral agent whose helical direction is right-handed and whose helical twisting power is changed depending on a change of temperature (which corresponds to the chiral agent Y).

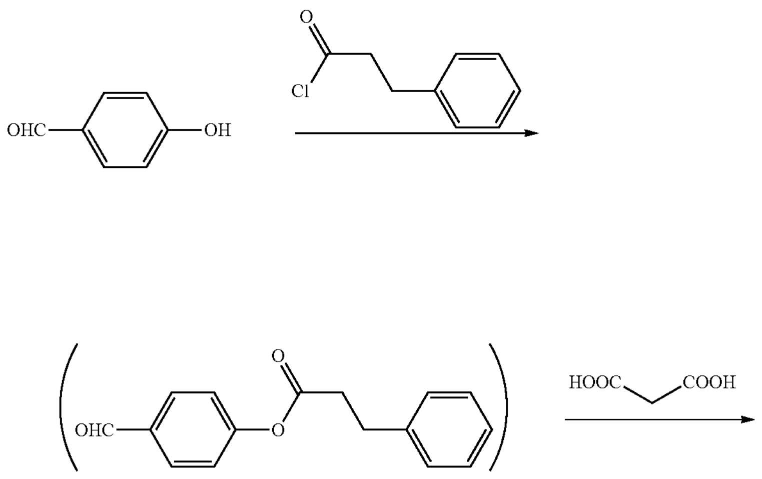

Intermediate 1

-continued

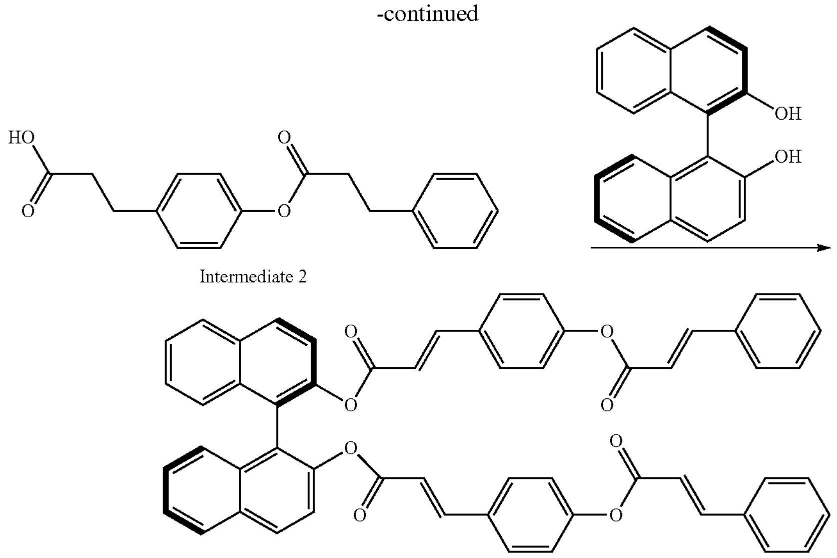

CD-3

«Synthesis of Intermediate 2»

53.31 g of parahydroxybenzaldehyde (manufactured by Wako Pure Chemical Industries, Ltd.), 153 mL of N-methyl-2-pyrrolidone (NMP, manufactured by Wako Pure Chemical Industries, Ltd.), and 72.40 g of potassium carbonate (manufactured by Wako Pure Chemical Industries, Ltd.) were placed in a 2 L three-neck flask to which 80.00 g of cinnamoyl chloride (manufactured by Tokyo Chemical Industry Co., Ltd.) was then further added, and the reaction solution was reacted at 40 °C for 2 hours. Subsequently, 500 mL of ethyl acetate (manufactured by Wako Pure Chemical Industries, Ltd.) and 300 mL of water were added to the reaction solution, the resulting reaction solution was stirred at 40 °C for 15 minutes, the aqueous phase was removed, and an ethyl acetate solution of an intermediate 1 was obtained.

Subsequently, 68.1 g of malonic acid (manufactured by Wako Pure Chemical Industries, Ltd.) and 17.6 mL of pyridine (manufactured by Wako Pure Chemical Industries, Ltd.) were added to the ethyl acetate solution of the intermediate 1 which was then reacted for 3 hours while distilling off ethyl acetate at 100 °C under a nitrogen stream. Next, 60 mL of methanol (manufactured by Wako Pure Chemical Industries, Ltd.) and 400 mL of water were added to the obtained product, and the resulting solid was collected by filtration and blast dried at 40 °C for 12 hours to obtain an intermediate 2 (123 g, yield: 96%).

«Synthesis of Compound CD-3»

100 g of the intermediate 2, 600 mL of acetonitrile (manufactured by Wako Pure Chemical Industries, Ltd.), and 400 mL of dimethylacetamide (manufactured by Wako Pure Chemical Industries, Ltd.) were placed in a 2 L three-neck flask to which 42.23 g of thionyl chloride (manufactured by Wako Pure Chemical Industries, Ltd.) was then further added, and the reaction solution was reacted at 60 °C for 1 hour. Subsequently, the reaction solution was cooled to 5 °C, 47.7 g of (R)-binaphthol (manufactured by Kanto Chemical Co., Inc.) and 134.1 g of pyridine (manufactured by Wako Pure Chemical Industries, Ltd.) were added to the reaction solution, and the reaction solution was reacted at 40 °C for 5 hours. Next, 600 mL of methanol (manufactured by Wako Pure Chemical Industries, Ltd.) and 1000 mL of water were added to the reaction solution, and the resulting solid was collected by filtration and blast dried at 40 °C for 12 hours to obtain a compound CD-3 (100 g, yield: 72%).

(Synthesis of Compound CD-4)

The following compound CD-4 used was synthesized according to JP2002-338575A.

The compound CD-4 is a chiral agent whose helical direction is right-handed and whose helical twisting power is changed depending on irradiation with light (which corresponds to the chiral agent X).

CD-4

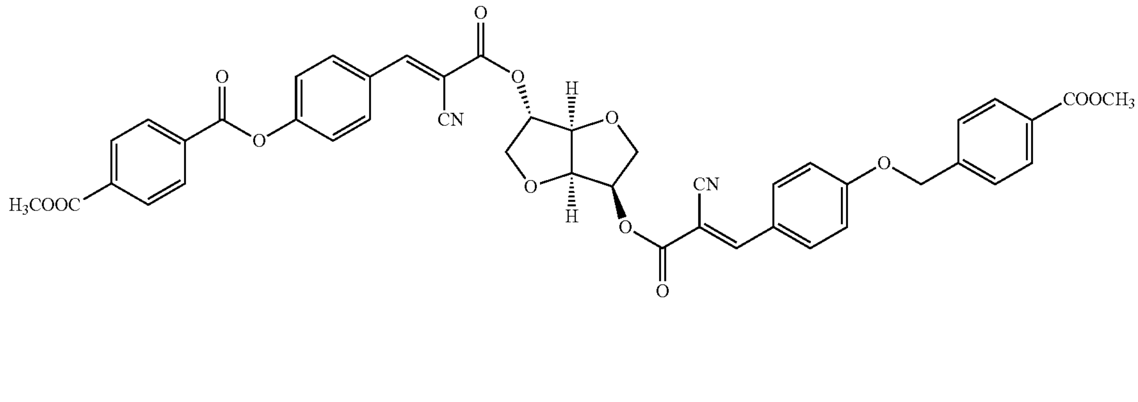

Example 1

<Production of Composition Layer Satisfying Condition 2 (Corresponding to Step 1A)>

(Preparation of Sample Solution)

A sample solution having the following composition was prepared.

Liquid crystal compound LC-1 represented by the following structure 100 parts by mass
Compound AA-1 1.0 part by mass
Compound B-1 0.1 parts by mass
Compound CD-1 5.0 parts by mass
Compound CD-2 5.0 parts by mass
Initiator PM-758 (manufactured by Nippon Kayaku Co., Ltd.) 0.20 parts by mass
Solvent (methyl ethyl ketone (MEK)/cyclohexanone=90/10 (mass ratio)) an amount that makes a solute concentration 30% by mass

LC-1

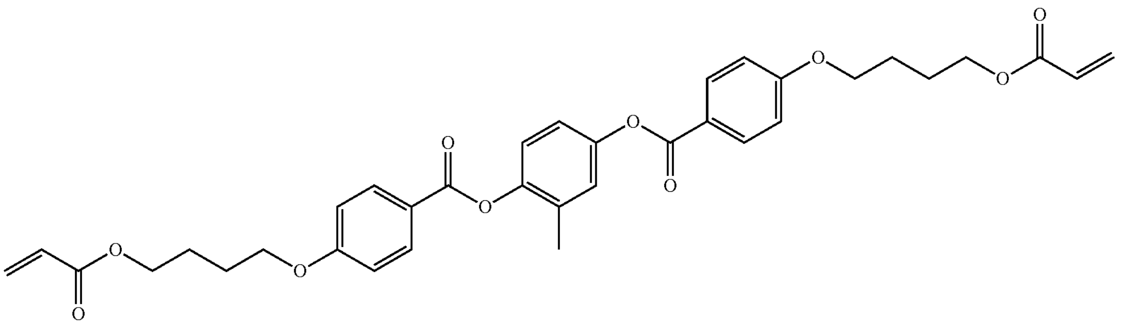

(Measurement of Weighted Average Helical Twisting Power)

After the solvent of the sample solution was distilled off, the helical pitch was measured by a trial wedge method (Liquid Crystal Handbook, published by Maruzen, pp. 196 to 197), and the helical twisting power was calculated from Expression (1A).

The helical twisting power calculated by the above-mentioned method also matches the weighted average helical twisting power obtained from Expression (1C).

(Production of Composition Layer Satisfying Condition 2)

Then, a glass substrate coated with polyvinyl alcohol ("PVA203", manufactured by Kuraray Co., Ltd.) was subjected to a rubbing treatment to produce a substrate with an alignment film. 30 μL of the sample solution was spin-coated on the rubbing-treated surface of this alignment film under the conditions of a rotation speed of 1000 rpm for 10 seconds, followed by aging at 90 °C for 1 minute to form a composition layer.

«Confirmation of Alignment State»

The obtained composition layer was observed by a polarizing microscope under crossed nicols conditions and therefore it was confirmed that the extinction position coincided with the rubbing direction and the liquid crystal compound was aligned parallel to the rubbing direction.

Furthermore, the tilt angle of the molecular axis derived from the liquid crystal compound on both surfaces of the composition layer with respect to the substrate surface was measured using an AxoScan (manufactured by Axometrics, Inc.).

<Production of Cholesteric Liquid Crystal Layer>

The composition layer containing the liquid crystal compound that is hybrid-aligned with respect to the substrate surface, obtained in the step 1A above, was UV-irradiated with 302 nm light from a light source (2UV transilluminator, manufactured by UVP, Inc.) at an irradiation intensity of 3 mW/cm$^2$ for 180 seconds to bring the liquid crystal compound in the composition layer into a state of a cholesteric liquid crystalline phase (corresponding to the step 2A).

Subsequently, the composition layer after the ultraviolet irradiation was subjected to a curing treatment by irradiation with ultraviolet rays (365 nm light) at an irradiation amount of 500 mJ/cm$^2$ in a nitrogen atmosphere at 25 °C, thereby obtaining a cholesteric liquid crystal layer obtained by fixing the cholesteric liquid crystalline phase (cholesteric liquid crystal layer in which the cholesteric alignment state was fixed) (curing treatment step (corresponding to the step 3)).

(Measurement of Transmittance)

As a result of measuring the transmittance, it was found that the obtained cholesteric liquid crystal layer selectively reflected light having a wavelength of 620 nm.

(Evaluation of Reflection Anisotropy)

Figure 12:
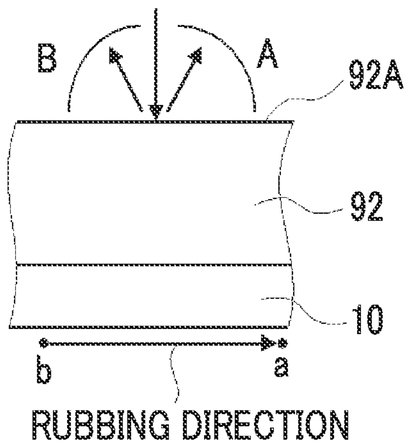
FIG. 12 is a schematic diagram in a case where a reflectance of a cholesteric liquid crystal layer produced by the production method of the present invention is measured.

Absolute reflectance measurement was carried out on the cholesteric liquid crystal layer under the conditions of wavelength 450 to 850 nm, incidence angle 0°, and detection angle 10 to 80° in steps of 10° (specifically, as shown in FIG. 12, with respect to a measurement surface 92A of a cholesteric liquid crystal layer 92 formed on the substrate 10, the absolute reflectance measurement was carried out under the conditions of wavelength 450 to 850 nm, incidence angle 0°, and detection angle 10 to 80° in steps of 10°). At this time, as shown in FIG. 12, the maximum values of the absolute reflectance were calculated for a case (B) in which the detection angle is tilted in a start point direction of rubbing (start point b in FIG. 12) and a case (A) in which the detection angle is tilted in an end point direction (end point a in FIG. 12) in the section of "(Production of composition layer satisfying condition 2)", and the larger one was taken as Y0 and the smaller one was taken as Y180. Then, the reflection ratio was obtained from Expression (1) to evaluate the reflection anisotropy. The results are shown in Table 1.

$$\text{Reflection ratio}=(Y0)/(Y180) \quad \text{Expression (1):}$$

«Evaluation Standards»

"A": The reflection ratio is 5 or more.

"B": The reflection ratio is 3 or more and less than 5.

"C": The reflection ratio is 2 or more and less than 3.

"D": The reflection ratio is less than 2.

(Evaluation of Haze)

The haze value was measured with a haze meter (NDH4000, manufactured by Tokyo Denshoku Co., Ltd.) and evaluated according to the following evaluation standards.

«Evaluation Standards»

"A": The haze value is less than 3.0.

"B": The haze value is 3.0 or more and less than 4.0.

"C": The haze value is 4.0 or more and less than 5.0.

"D": The haze value is 5.0 or more.

(SEM Evaluation of Cross Section)

As a result of cross-sectional SEM observation of the obtained cholesteric liquid crystal layer of Example 1, a striped pattern in which bright lines and dark lines derived from the cholesteric liquid crystalline phase of the cholesteric liquid crystal were alternately arranged was observed, and it was observed that the arrangement direction of the bright lines and the dark lines was tilted by about 70° in one direction with respect to the substrate surface. That is, it was confirmed that the reflection surface was not parallel to the substrate surface. It is considered that the reflection surface is tilted by about 20° with respect to the substrate surface.

Examples 2 to 14 and 16 to 18

Cholesteric liquid crystal layers were formed, and then the reflection anisotropy, haze, and cross-sectional SEM thereof were evaluated in the same manner as in Example 1, except that the addition amount of surfactant and the type and addition amount of chiral agent were changed to the addition amounts and types shown in Table 1, respectively. The results are shown in Table 1.

Example 15

A cholesteric liquid crystal layer was formed, and then the reflection anisotropy, haze, and cross-sectional SEM thereof were evaluated in the same manner as in Example 1, except that the addition amount of surfactant and the type and addition amount of chiral agent were changed to the addition amounts and types shown in Table 1, respectively and the production method was changed to the following conditions. The results are shown in Table 1.

<Production of Composition Layer Satisfying Condition 2 (Corresponding to Step 1B)>

A glass substrate coated with polyvinyl alcohol ("PVA203", manufactured by Kuraray Co., Ltd.) was subjected to a rubbing treatment to produce a substrate with an alignment film. 30 μL of the sample solution was spin-coated on the rubbing-treated surface of this alignment film under the conditions of a rotation speed of 1000 rpm for 10 seconds, followed by aging at 130 °C for 1 minute to form a composition layer.

«Confirmation of Alignment State»

The obtained composition layer was observed by a polarizing microscope under crossed nicols conditions and therefore it was confirmed that the extinction position coincided with the rubbing direction and the liquid crystal molecules were aligned parallel to the rubbing.

Furthermore, the tilt angle of the molecular axis derived from the liquid crystal compound on both surfaces of the composition layer with respect to the substrate surface was measured using an AxoScan (manufactured by Axometrics, Inc.).

<Production of Cholesteric Liquid Crystal Layer>

The composition layer containing the liquid crystal compound that is hybrid-aligned with respect to the substrate surface, obtained in the step 1B above, was cooled to 30 °C to bring the liquid crystal compound in the composition layer into a state of a cholesteric liquid crystalline phase (corresponding to the step 2B).

Subsequently, the composition layer after cooling was subjected to a curing treatment by irradiation with ultraviolet rays (365 nm light) at an irradiation amount of 500 mJ/$cm^2$ in a nitrogen atmosphere, thereby obtaining a layer obtained by fixing the cholesteric liquid crystalline phase (curing treatment step (corresponding to the step 3)).

(SEM Evaluation of Cross Section)

As a result of cross-sectional SEM observation of the obtained cholesteric liquid crystal layer of Example 15, a striped pattern in which bright lines and dark lines derived from the cholesteric liquid crystalline phase of the cholesteric liquid crystal were alternately arranged was observed, and it was observed that the arrangement direction of the bright lines and the dark lines was tilted by about 70° with respect to the substrate surface. In other words, it was observed that the bright lines and dark lines of the cholesteric liquid crystal were tilted by 20° in one direction with respect to the substrate surface. Furthermore, the angle coincided with the tilt angle of the reflection surface calculated from the measurement of reflection anisotropy. That is, it was confirmed that the reflection surface was not parallel to the substrate surface.

Comparative Example 1 and Comparative Example 2

Cholesteric liquid crystal layers were formed, and then the reflection anisotropy, haze, and cross-sectional SEM thereof were evaluated in the same manner as in Example 1, except that the content of surfactant and the type and the content of chiral agent were changed to the contents and types shown in Table 1. The results are shown in Table 1.

In Table 1 below, in a case where the tilt angle on the substrate-side surface and the tilt angle on the air-side surface are equal, the liquid crystal layer is uniaxially aligned, which corresponds to the condition 1, and in a case where the tilt angle on the substrate-side surface and the tilt angle on the air-side surface are different, the liquid crystal layer is hybrid-aligned, which corresponds to the condition 2.

In addition, in Table 1 below, "–" in the reflection anisotropy evaluation column of Example 16 is intended to mean that the reflection anisotropy could not be observed on the reflection surface of the cholesteric liquid crystal layer (corresponding to the measurement surface 92A in FIG. 12). As a result of cross-sectional SEM observation of the cholesteric liquid crystal layer obtained in Example 16, a striped pattern in which bright lines and dark lines derived from the cholesteric liquid crystalline phase of the cholesteric liquid crystal were alternately arranged was observed, and it was observed that the arrangement direction of the bright lines and the dark lines was 0° with respect to the substrate surface. That is, the reflection surface of the cholesteric liquid crystal layer obtained in Example 16 is perpendicular to the substrate surface.

TABLE 1

| | Surfactant (ionic surfactant) | | Surfactant (fluorine-based surfactant) | | Chiral agent whose helical twisting power is not changed | | Chiral agent whose helical twisting power is changed | | Step 1 Absolute value of weighted average helical |
|---|---|---|---|---|---|---|---|---|---|
| | Type | Addition amount (parts by mass) | Type | Addition amount (parts by mass) | Type | Addition amount (parts by mass) | Type | Addition amount (parts by mass) | twisting power in composition layer [μm$^{-1}$] |
| Example 1 | AA-1 | 1.0 | B-1 | 0.1 | CD-1 | 5.00 | CD-2 | 5.00 | 0.0 |
| Example 2 | — | — | B-1 | 0.1 | CD-1 | 5.00 | CD-2 | 5.00 | 0.0 |
| Example 3 | AA-1 | 3.0 | B-1 | 0.1 | CD-1 | 5.00 | CD-2 | 5.00 | 0.0 |
| Example 4 | AA-1 | 1.0 | — | — | CD-1 | 5.00 | CD-2 | 5.00 | 0.0 |
| Example 5 | AA-1 | 1.0 | B-2 | 0.1 | CD-1 | 5.00 | CD-2 | 5.00 | 0.0 |
| Example 6 | — | — | B-2 | 0.1 | CD-1 | 5.00 | CD-2 | 5.00 | 0.0 |
| Example 7 | AA-1 | 1.0 | B-1 | 0.1 | CD-1 | 4.92 | CD-2 | 5.00 | 0.5 |
| Example 8 | AA-1 | 1.0 | B-1 | 0.1 | CD-1 | 4.90 | CD-2 | 5.00 | 0.6 |
| Example 9 | AA-1 | 1.0 | B-1 | 0.1 | CD-1 | 5.00 | CD-2 | 4.90 | 0.6 |
| Example 10 | AA-1 | 1.0 | B-1 | 0.1 | CD-1 | 4.80 | CD-2 | 5.00 | 1.3 |
| Example 11 | AA-1 | 1.0 | B-1 | 0.1 | CD-1 | 5.00 | CD-2 | 4.80 | 1.3 |
| Example 12 | AA-1 | 1.0 | B-1 | 0.1 | CD-1 | 4.77 | CD-2 | 5.00 | 1.5 |
| Example 13 | AA-1 | 1.0 | B-1 | 0.1 | CD-1 | 4.70 | CD-2 | 5.00 | 1.9 |
| Example 14 | AA-1 | 1.0 | B-1 | 0.1 | CD-1 | 5.00 | CD-2 | 4.70 | 1.9 |
| Example 15 | AA-1 | 1.0 | B-1 | 0.1 | CD-1 | 2.00 | CD-3 | 5.00 | 0.0 |
| Example 16 | AA-1 | 3.0 | B-2 | 1.0 | CD-1 | 5.00 | CD-2 | 5.00 | 0.0 |
| Example 17 | AA-1 | 0.2 | B-1 | 0.1 | CD-1 | 5.00 | CD-2 | 5.00 | 0 0 |
| Example 18 | AA-1 | 0.2 | — | — | CD-1 | 5.00 | CD-2 | 5.00 | 0.0 |
| Comparative Example 1 | AA-1 | 1.0 | B-1 | 0.1 | CD-1 | 4.00 | — | — | 62 |
| Comparative Example 2 | AA-1 | 1.0 | B-1 | 0.1 | — | — | CD-2 | 4.00 | 62 |

| | Step 1 | | | | Evaluation | | | |
|---|---|---|---|---|---|---|---|---|
| | Tilt angle [°] of molecular axis derived from liquid crystal compound with respect to substrate surface on substrate-side surface of composition layer | Tilt angle [°] of molecular axis derived from liquid crystal compound with respect to substrate surface on surface of composition layer opposite to substrate | Alignment method | Step 2 Absolute value of weighted average helical twisting power in composition layer [μm$^{-1}$] | Reflection anisotropy | Haze | Tilt angle [°] of reflection surface with respect to substrate surface | Tilt angle [°] of arrangement direction of bright-dark line with respect to substrate surface in cross-sectional SEM |
| Example 1 | 60 | 0 | Condition 2 | 26 | A | A | 20 | 70 |
| Example 2 | 5 | 0 | Condition 2 | 26 | B | B | 10 | 80 |
| Example 3 | 90 | 20 | Condition 2 | 26 | A | B | 40 | 50 |
| Example 4 | 60 | 40 | Condition 2 | 26 | B | B | 20 | 70 |
| Example 5 | 60 | 60 | Condition 1 | 26 | C | C | 30 | 60 |
| Example 6 | 5 | 60 | Condition 2 | 26 | B | C | 30 | 60 |
| Example 7 | 60 | 0 | Condition 2 | 26 | A | B | 20 | 70 |
| Example 8 | 60 | 0 | Condition 2 | 26 | B | B | 20 | 70 |
| Example 9 | 60 | 0 | Condition 2 | 26 | B | B | 20 | 70 |
| Example 10 | 60 | 0 | Condition 2 | 25 | B | C | 20 | 70 |
| Example 11 | 60 | 0 | Condition 2 | 27 | B | C | 20 | 70 |
| Example 12 | 60 | 0 | Condition 2 | 25 | B | C | 20 | 80 |
| Example 13 | 60 | 0 | Condition 2 | 25 | C | C | 10 | 80 |
| Example 14 | 60 | 0 | Condition 2 | 27 | C | C | 10 | 80 |
| Example 15 | 60 | 0 | Condition 2 | 27 | B | B | 20 | 70 |
| Example 16 | 90 | 90 | Condition 3 | 26 | — | A | 90 | 0 |
| Example 17 | 40 | 0 | Condition 2 | 26 | A | A | 10 | 80 |
| Example 18 | 40 | 40 | Condition 1 | 26 | C | C | 20 | 70 |
| Comparative Example 1 | Not measurable | Not measurable | — | 62 | D | D | 0 | 90 |
| Comparative Example 2 | Not measurable | Not measurable | — | 10 | D | D | 0 | 90 |

From the comparison between Examples and Comparative Examples in Table 1, it can be seen that the reflection surface of the obtained cholesteric liquid crystal layer is not parallel to the substrate surface through the step 1.

In addition, in particular, in a case where the composition layer obtained in the step 1 is a composition layer satisfying the condition 1 or the condition 2, it can be seen that the obtained cholesteric liquid crystal layer has excellent reflection anisotropy (in a case of the composition layer satisfying the condition 3 (Example 16), since the reflection surface of the cholesteric liquid crystal layer obtained in Example 16 is perpendicular to the substrate surface, the condition 1 and the condition 2 are superior in the reflection anisotropy on the measurement surface). For Comparative Example 1 and Comparative Example 2, in the composition layer obtained in the step 1, the helix of the liquid crystal compound was induced, and the tilt angle of the molecular axis derived from the liquid crystal compound with respect to the substrate surface could not be measured.

In addition, from the comparison of Example 1, Example 4, Example 5, Example 17, and Example 18, it can be seen that, in step 1, the composition layer satisfying the condition 2 is more excellent in reflection anisotropy than the composition layer satisfying the condition 1.

In addition, from the comparison of Examples 1 to 6, it can be seen that the angles of the molecular axes derived from the liquid crystal compound with respect to the substrate surface have appropriate points on the substrate-side surface of the composition layer satisfying the condition 1 or the condition 2 and the surface of the composition layer opposite to the substrate. In a case where the liquid crystal composition further includes an ionic surfactant and a fluorine-based surfactant, the angle of the molecular axis derived from the liquid crystal compound with respect to the substrate surface can be easily adjusted to a predetermined value, and from the comparison of Example 1, Example 2, and Example 4, it is apparent that the haze is also excellent because the alignment with more uniform azimuthal angle is obtained in the step 1.

In addition, in Examples 7 to 14 in which the amount ratio of the chiral agent was changed with respect to Example 1, it can be seen that the obtained cholesteric liquid crystal layer has excellent reflection anisotropy in a case where the absolute value of the weighted average helical twisting power in the composition layer satisfying the condition 1 or the condition 2 obtained in the step 1 was smaller (in a case where the absolute value of the weighted average helical twisting power is preferably 0.0 to 1.5 and more preferably 0.0 to 0.5).

Further, from Example 15, it can be seen that a cholesteric liquid crystal layer exhibiting similar reflection anisotropy can be obtained even in a case where the helical twisting power of the chiral agent is changed depending on a change of temperature.

Example 19

<Production of Composition Layer Satisfying Condition 2 (Corresponding to Step 1A)>

(Preparation of Sample Solution)

A sample solution having the following composition was prepared.

Liquid crystalline compound LC-1 represented by the following structure 100 parts by mass Surfactant AA-1 0.5 parts by mass Surfactant B-3 0.2 parts by mass Compound CD-1 5.0 parts by mass Compound CD-4 5.6 parts by mass Initiator IRG-907 (manufactured by BASF SE) 1.5 parts by mass Solvent (methyl ethyl ketone (MEK)/cyclohexanone=90/10 (mass ratio)) an amount that makes a solute concentration 30% by mass

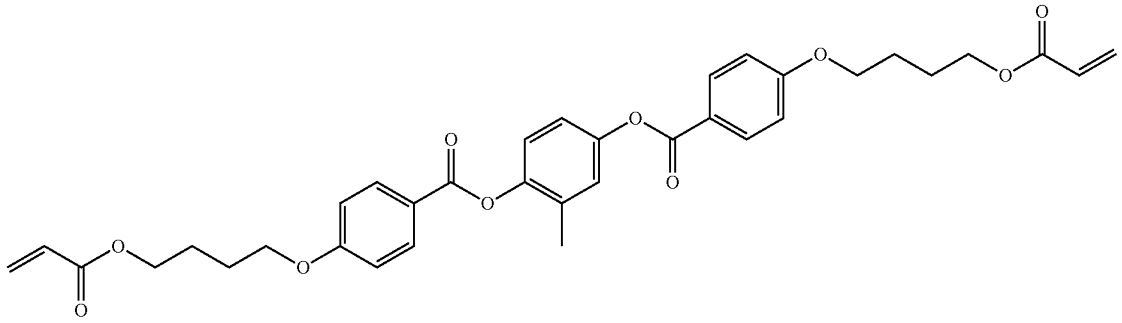

LC-1

(Measurement of Weighted Average Helical Twisting Power)

The weighted average helical twisting power was obtained in the same manner as in Example 1.

(Production of Composition Layer Satisfying Condition 2)

Next, a triacetylcellulose (TAC) substrate coated with polyvinyl alcohol ("PVA108", manufactured by Kuraray Co., Ltd.) was subjected to a rubbing treatment to produce a substrate with an alignment film. 30 μL of the above sample solution was bar-coated (Bar No. #6) on the rubbing-treated surface of this alignment film, followed by aging at 90 °C for 1 minute to form a composition layer.

«Confirmation of Alignment State»

The alignment state was confirmed in the same manner as in Example 1.

<Production of Cholesteric Liquid Crystal Layer>

The composition layer containing the liquid crystal compound that is hybrid-aligned with respect to the substrate surface, obtained in the step 1A above, was UV-irradiated with 365 nm light from a light source (2UV transilluminator, manufactured by UVP, Inc.) at an irradiation intensity of 3 $mW/cm^2$ and at 30 °C for 180 seconds to bring the liquid crystal compound in the composition layer into a state of a cholesteric liquid crystalline phase (corresponding to the step 2A).

Subsequently, the composition layer after the ultraviolet irradiation was subjected to a curing treatment by irradiation with UV (ultraviolet rays) at an irradiation amount of 500 $mJ/cm^2$ in a nitrogen atmosphere at 30 °C, thereby obtaining a cholesteric liquid crystal layer obtained by fixing the cholesteric liquid crystalline phase (cholesteric liquid crystal layer in which the cholesteric alignment state was fixed) (curing treatment step (corresponding to the step 3)).

(Measurement of Transmittance)

As a result of measuring the transmittance, it was found that the obtained cholesteric liquid crystal layer selectively reflected light having a wavelength of 620 nm.

(Evaluation of Reflection Anisotropy)

Absolute reflectance measurement was carried out on the cholesteric liquid crystal layer under the conditions of wavelength 450 to 850 nm, incidence angle 0°, and detection angle 10 to 80° in steps of 10° (specifically, as shown in FIG. 12, with respect to a measurement surface 92A of a cholesteric liquid crystal layer 92 formed on the substrate 10, the absolute reflectance measurement was carried out under the conditions of wavelength 450 to 850 nm, incidence angle 0°, and detection angle 10 to 80° in steps of 10°). At this time, as shown in FIG. 12, the maximum values of the absolute reflectance were calculated for a case (B) in which the detection angle is tilted in a start point direction of rubbing (start point b in FIG. 12) and a case (A) in which the detection angle is tilted in an end point direction (end point a in FIG. 12) in the section of "(Production of composition layer satisfying condition 2)", and the larger one was taken as Y0 and the smaller one was taken as Y180.

Next, the reflection ratio was calculated from Expression (2), and the reflectance anisotropy was evaluated as "present" in a case where the reflection ratio was 2 or more, and the reflectance anisotropy was evaluated as "absent" in a case where the reflection ratio was less than 2.

$$\text{Reflection ratio}=(Y0)/(Y180) \qquad \text{Expression (2):}$$

(Measurement of Phase Difference and Incidence Angle at which the Phase Difference is Smallest)

The phase difference of the cholesteric liquid crystal layer in a case where the main plane of the cholesteric liquid crystal layer was tilted was measured at $\lambda$=800 nm using AxoScan. The tilt angle at which the phase difference is smallest was 30° with respect to the main plane.

(SEM Evaluation of Cross Section)

As a result of cross-sectional SEM observation of the cholesteric liquid crystal layer obtained in Example 19, a striped pattern in which bright lines and dark lines derived from the cholesteric liquid crystalline phase of the cholesteric liquid crystal were alternately arranged was observed, and it was observed that the arrangement direction of the bright lines and the dark lines was tilted by 78° with respect to the substrate surface. In other words, it was observed that the bright lines and dark lines of the cholesteric liquid crystal were tilted by 12° in one direction with respect to the substrate surface. Furthermore, the angle coincided with the tilt angle of the reflection surface calculated from the measurement of reflection anisotropy.

That is, it was confirmed that the reflection surface was not parallel to the substrate surface.

(Evaluation of Circular Polarization Degree and Reflectance)

Light of 400 to 800 nm was incident on the cholesteric liquid crystal layer from an incidence angle of 40°, and the circular polarization degree of transmitted light and the reflection half-width of reflected light at a wavelength at which the cholesteric liquid crystal layer exhibits the maximum reflectance were measured and evaluated.

(1) Circular Polarization Degree

"A": The circular polarization degree is 98% or more.

"B": The circular polarization degree is 95% or more and less than 98%.

"C": The circular polarization degree is less than 95%.

(2) Reflection Half-Width of Reflected Light

"A": The reflection half-width is 50 nm or more.

"B": The reflection half-width is 40 nm or more and less than 50 nm.

"C": The reflection half-width is less than 40 nm.

Examples 20 to 24

Film formation and evaluation were carried out in the same manner as in Example 1, except that the amount of the ionic surfactant was changed according to Table 2. The results are shown in Table 2.

Comparative Example 3

Film formation was carried out by the method described in "Example 1" of JP2006-317656A, and evaluation was carried out in the same manner as in Example 19.

Table 2 is shown below.

Note that Examples 19 to 24 have the same composition as in Example 1, except that the content of the surfactant (ionic surfactant) and the type of the chiral agent are different.

In addition, in the step 1 of Examples 19 to 24, the "absolute value of the weighted average helical twisting power ($\mu m^{-1}$) in the composition layer" is 0.0, the "tilt angle (°) of the molecular axis derived from the liquid crystal compound with respect to the substrate surface on the surface of the composition layer opposite to the substrate" is 0°, and the "alignment method" is the condition 2.

In addition, the "absolute value ($\mu m^{-1}$) of the weighted average helical twisting power in the composition layer" in the step 2 of Examples 19 to 24 is 26.

TABLE 2

| | Surfactant (ionic surfactant) | | Tilt angle [°] of molecular axis derived from liquid crystal compound with respect to substrate surface on substrate-side surface of composition layer | Tilt angle [°] of arrangement direction of bright-dark line with respect to substrate surface in cross-sectional SEM | Tilt angle [°] of reflection surface with respect to substrate surface | Angle [°] at which phase difference is smallest | Angle [°] formed by incidence direction of light at which phase difference is smallest and arrangement direction of bright-dark line in cross-sectional SEM | Evaluation | | |
|---|---|---|---|---|---|---|---|---|---|---|
| | Type | Addition amount (parts by mass) | | | | | | Reflection anisotropy | Half width of reflected light | Circular polarization degree |
| Example 19 | AA-1 | 0.5 | 60 | 78 | 12 | 30 | 18 | Present | A | A |
| Example 20 | AA-1 | 0.2 | 40 | 82 | 8 | 20 | 12 | Present | B | B |
| Example 21 | AA-1 | 0.1 | 20 | 83 | 7 | 13 | 6 | Present | B | B |
| Example 22 | AA-1 | 0.05 | 10 | 86 | 4 | 7 | 3 | Present | B | B |
| Example 23 | AA-1 | 1.0 | 90 | 75 | 15 | 40 | 25 | Present | A | A |
| Example 24 | AA-1 | 0.00 | 5.0 | 87 | 3 | 3 | 0 | Present | C | C |
| Comparative Example 3 | Method described in Example 1 of JP2006-317656A | | | | | | | Absent | C | C |

From the comparison of Examples 19 to 23 with Example 24, it was confirmed that the reflectance is high and the reflection band is wide in a case where the cholesteric liquid crystal layer has a reflection surface tilted with respect to the substrate, and the incident direction in which the phase difference is smallest in a case where light is incident on the main plane of the cholesteric liquid crystal layer is not parallel to the arrangement direction of the bright-dark lines in the cross-sectional SEM. In addition, it was also confirmed that the circular polarization degree of the transmitted light transmitted from the main plane of the cholesteric liquid crystal layer was higher. The cholesteric liquid crystal layer of Example 24 corresponds to a case where the cholesteric liquid crystal layer has a reflection surface tilted with respect to the substrate, and the incident direction in which the phase difference is smallest in a case where light is incident on the main plane of the cholesteric liquid crystal layer is parallel to the arrangement direction of the bright-dark lines in the cross-sectional SEM.

In addition, from the comparison of Examples 19 to 23, it was confirmed that the effect was more excellent particularly in a case where the angle formed by the arrangement direction and the incident direction in which the phase difference was smallest in a case where light was incident on the main plane of the cholesteric liquid crystal layer was 18° or more.

In addition, from the comparison of Examples 19 to 23, it was confirmed that, in a case where the content of the ionic surfactant in the liquid crystal composition is 0.3 parts by mass or more with respect to 100 parts by mass of the liquid crystal compound, the obtained cholesteric liquid crystal layer is such that the incident direction in which the phase difference is smallest in a case where light is incident on the main plane of the cholesteric liquid crystal layer and the arrangement direction of the bright-dark lines in the cross-sectional SEM are more not parallel, and therefore the reflectance is higher and the reflection band is wider. In addition, it was also confirmed that the circular polarization degree of the transmitted light transmitted from the main plane of the cholesteric liquid crystal layer was higher.

EXPLANATION OF REFERENCES

10: substrate
10*a*: substrate surface
12: composition layer
14: liquid crystal compound
16: molecular axis
$\theta_1$: angle
$C_1$, $C_2$: helical axis
$T_1$, $T_2$: reflection surface
$R_1$: thickness direction
$T_{11}$: temperature at which alignment treatment of liquid crystal compound is carried out
in step 1
$T_{12}$: temperature at which cooling treatment of step 2 is carried out
A, B, C: region
32, 42, 62, 82, 92, 102, 202: cholesteric liquid crystal layer
44, 64, 84: bright portion
46, 66, 86: dark portion
50: light source (projector)
52, 72: projection screen
$L_1$, $L_3$: cholesteric reflected light
P: arrangement direction
92A: measurement surface

What is claimed is:

1. A cholesteric liquid crystal layer having a pair of main planes, the cholesteric liquid crystal layer comprising a liquid crystal compound or a polymer of a liquid crystal compound having a polymerizable group,
wherein an arrangement direction of bright portions and dark portions derived from a cholesteric liquid crystalline phase observed under a scanning electron microscope in a cross section perpendicular to the main plane, is tilted with respect to the main plane, and
an incident direction of light, in which a phase difference is smallest in a case where light is incident on the main plane, is not perpendicular to the main plane and is not parallel to the arrangement direction.

2. The cholesteric liquid crystal layer according to claim 1,
wherein an angle formed by the incident direction that minimizes the phase difference and the arrangement direction is 3° or more.

3. An optically anisotropic body comprising:
the cholesteric liquid crystal layer according to claim 1.

4. A reflective layer comprising:
the cholesteric liquid crystal layer according to claim 1.

5. A cholesteric liquid crystal layer having a pair of main planes, the cholesteric liquid crystal layer comprising a liquid crystal compound or a polymer of a liquid crystal compound having a polymerizable group, wherein an arrangement direction of bright portions and dark portions derived from a cholesteric liquid crystalline phase observed under a scanning electron microscope in a cross section perpendicular to the main plane, is tilted with respect to the main plane, an incident direction of light, in which a phase difference is smallest in a case where light is incident on the main plane, is not perpendicular to the main plane and is not parallel to the arrangement direction, and a molecular axis derived from the liquid crystal compound or a molecular axis derived from the polymer is not parallel to a reflection surface.

* * * * *